US008266119B2

(12) United States Patent
Murata et al.

(10) Patent No.: US 8,266,119 B2
(45) Date of Patent: Sep. 11, 2012

(54) CONTENTS MANAGEMENT SYSTEM, IMAGE PROCESSING DEVICE IN CONTENTS MANAGEMENT SYSTEM, AND LINK INFORMATION GENERATING METHOD OF IMAGE PROCESSING DEVICE

(75) Inventors: Norihiko Murata, Kanagawa (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 742 days.

(21) Appl. No.: 12/121,904

(22) Filed: May 16, 2008

(65) Prior Publication Data

US 2008/0294649 A1 Nov. 27, 2008

(30) Foreign Application Priority Data

May 23, 2007 (JP) .................................. 2007-137221

(51) Int. Cl.
*G06F 7/00* (2006.01)
*G06F 17/00* (2006.01)
(52) U.S. Cl. ......................................................... 707/694
(58) Field of Classification Search .................. 707/694
See application file for complete search history.

(56) References Cited

U.S. PATENT DOCUMENTS

2005/0142528 A1* 6/2005 Veselova et al. .......... 434/307 R
2006/0284981 A1* 12/2006 Erol et al. .................. 348/207.1

FOREIGN PATENT DOCUMENTS

| JP | 2002-354452 | 12/2002 |
|---|---|---|
| JP | 2003-37677 | 2/2003 |
| JP | 3548900 | 4/2004 |
| JP | 2005-4638 | 1/2005 |
| JP | 2005-72811 | 3/2005 |

OTHER PUBLICATIONS

Jun. 26, 2012 Japanese office action of the Japanese Patent Office for Japanese patent application No. 2007-137221.

* cited by examiner

*Primary Examiner* — Robert Beausoliel, Jr.
*Assistant Examiner* — Nicholas Allen
(74) *Attorney, Agent, or Firm* — Cooper & Dunham LLP

(57) ABSTRACT

A disclosed contents management system includes a management server for managing contents and an information processing device for performing a process on the contents, which are connected to a network. The management server includes a supplying unit for supplying the contents to the information processing device in response to a request from the information processing device. The information processing device includes an acquiring unit for acquiring reproduction starting point information of the contents, a generating unit for generating, based on the reproduction starting point information acquired by the acquiring unit, link information for accessing the contents, and a storing unit for temporarily storing, in a region of a memory, the link information generated by the generating unit in association with information indicating content of the contents, when a pasting unit pastes the link information onto document data being edited. The contents are accessed based on the link information pasted onto the document data.

15 Claims, 36 Drawing Sheets

FIG.1

1. Copy link
When the Copy button of the link information generating program is pressed, a URL to the meeting data reproduction page corresponding to the time of pressing the button (reproduction starting point) is copied to a clipboard together with information indicating the content of the video data of the meeting corresponding to the time of pressing the button.

2. Paste link
Paste the link, which has been copied to the clipboard, onto document data in an application such as Microsoft Office, e-mail software, or text editor.

3. Click link
When the pasted link is clicked, the video data reproduction page of the meeting is opened, and the video data are reproduced starting from the scene at which the Copy button was clicked.

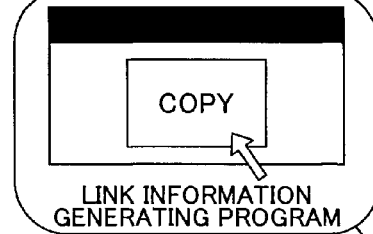
LINK INFORMATION GENERATING PROGRAM

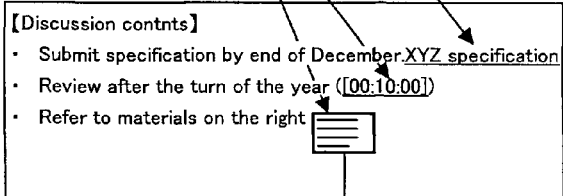
[Discussion contnts]
- Submit specification by end of December.XYZ specification
- Review after the turn of the year ([00:10:00])
- Refer to materials on the right

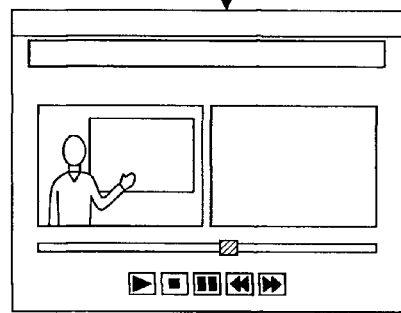
REPRODUCTION PAGE OF VIDEO DATA OF MEETING

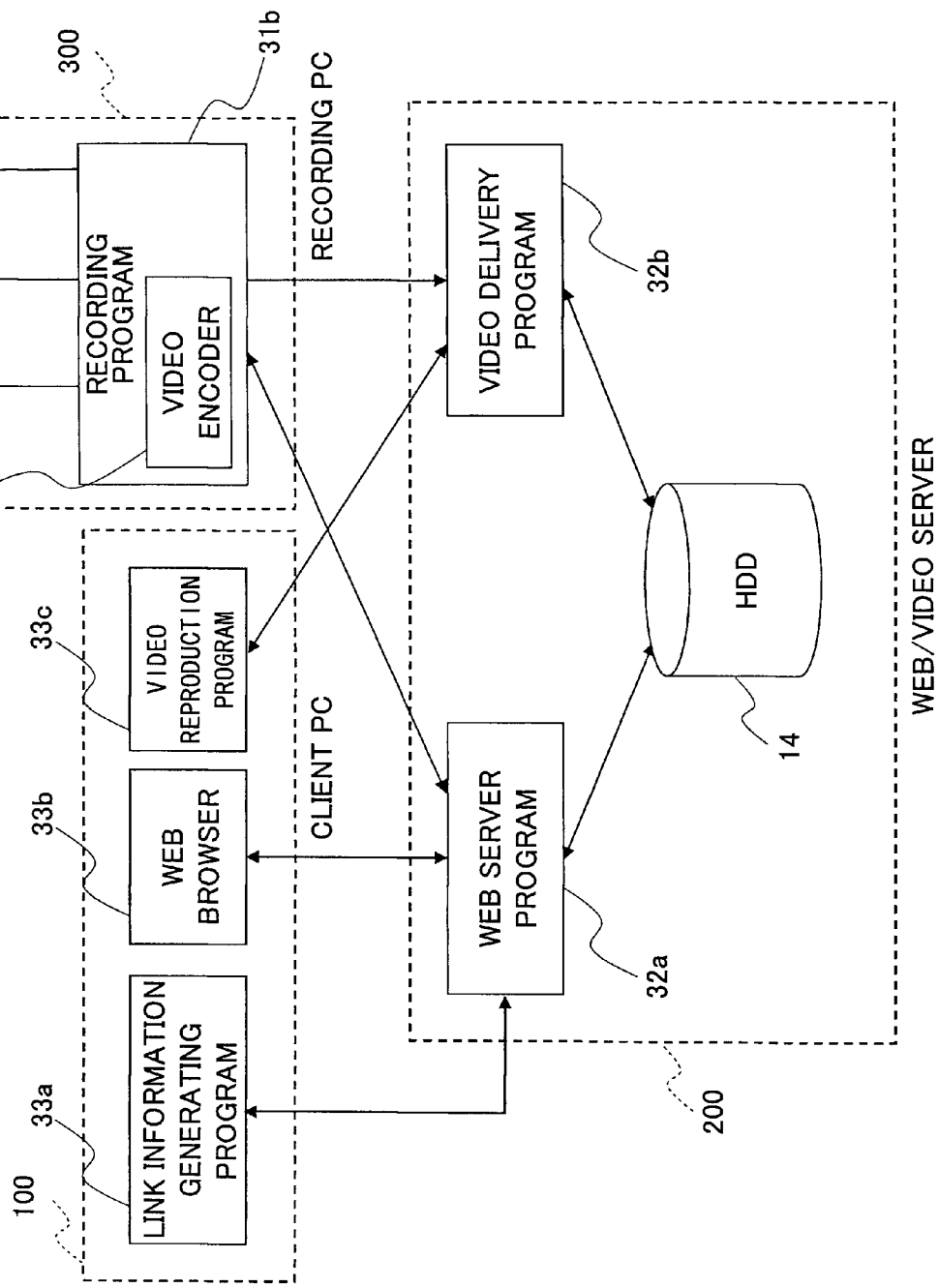

FIG.12

|  | START BUTTON | STOP BUTTON | × BUTTON |
|---|---|---|---|
| CURRENTLY STOPPED | VALID | INVALID | VALID |
| CURRENTLY RECORDING | INVALID | VALID | INVALID |

FIG.14

42 sWebServerPath = http://videoserver.abc.com

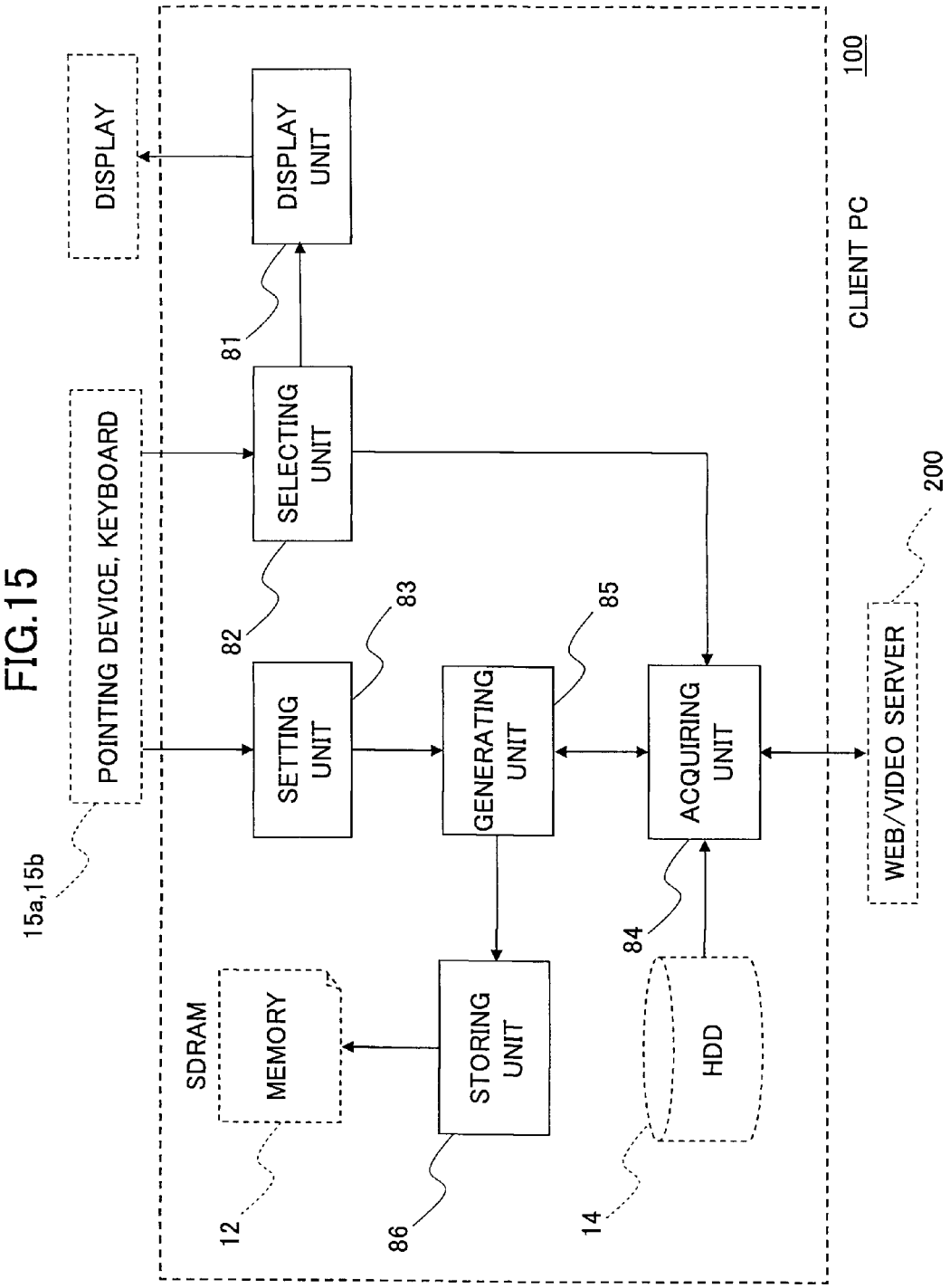

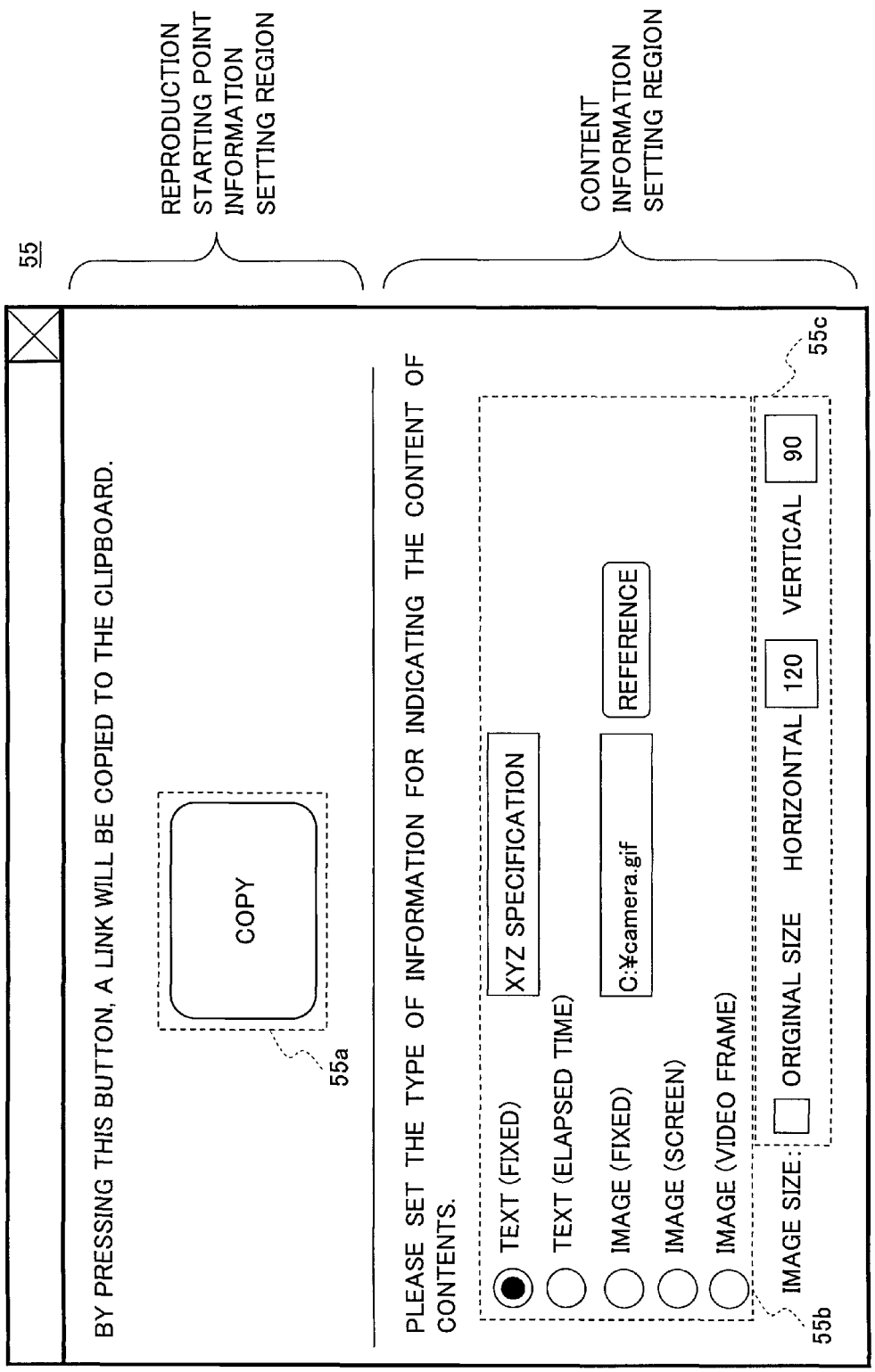

FIG.18A

```
Version:1.0
StartHTML:00000097
EndHTML:00000340
StartFragment:00000224
EndFragment:00000303
<!DOCTYPE HTML PUBLIC "-//W3C//DTD HTML 4.0 Transitional//EN">
<html lang=ja>
<head>
</head>
<body>
<!--StartFragment-->
<a href="http://videoserver.abc.com/play?recid=1234&sec=600">
[00:10:00]
</a>
<!--EndFragment-->
</body>
</html>
```

```
Version:1.0
StartHTML:00000097
EndHTML:00000423
StartFragment:00000224
EndFragment:00000386
<!DOCTYPE HTML PUBLIC "-//W3C//DTD HTML 4.0 Transitional//EN">
<html lang=ja>
<head>
</head>
<body>
<!--StartFragment-->
<a href="http://videoserver.abc.com/play?recid=1234&sec=1200">
<img width=120 height=90 src="http://videoserver.abc.com/getscreen?recid=1234&sec=1200">
</a>
<!--EndFragment-->
</body>
</html>
```

43

43b

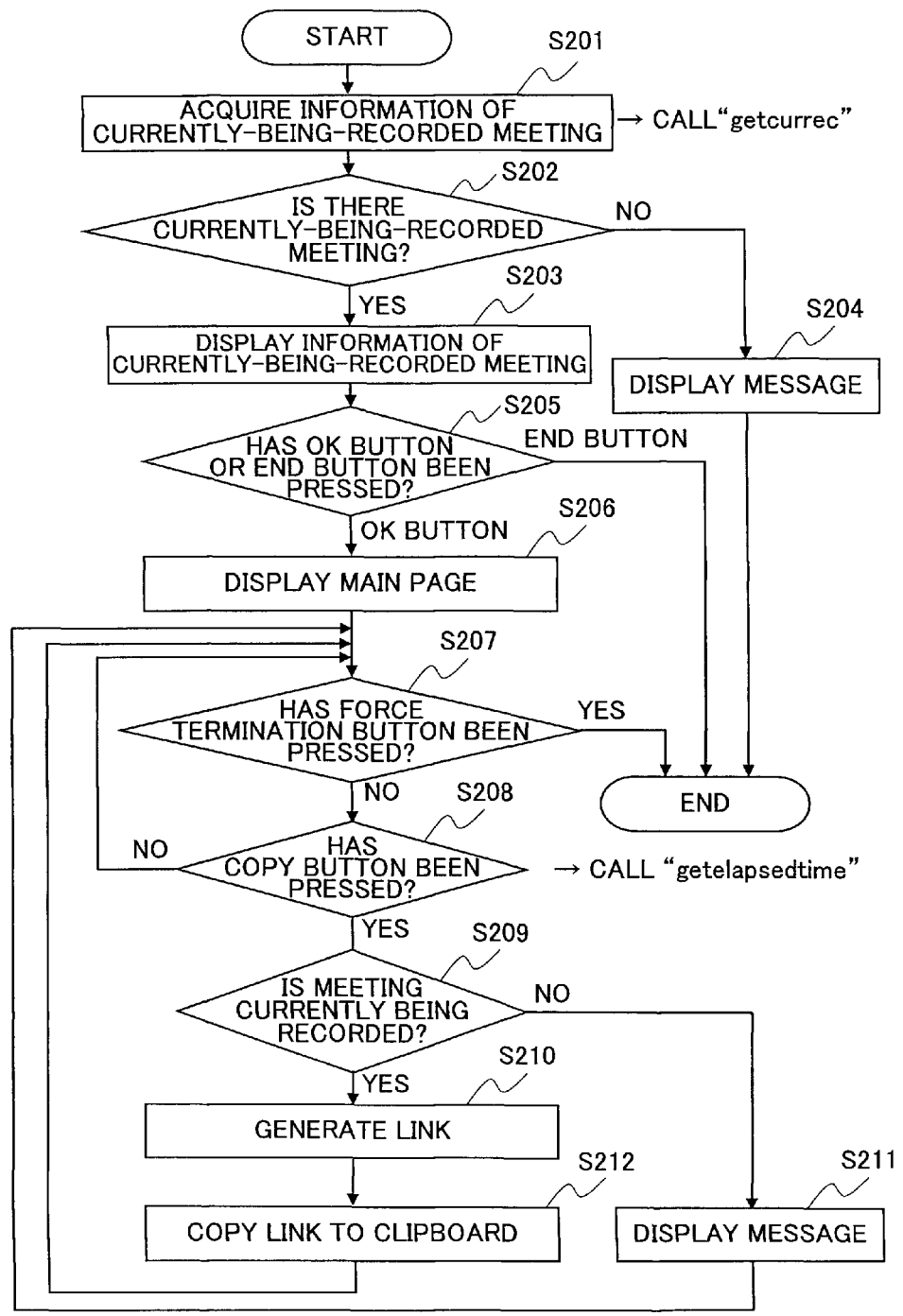

[Discussion contnts]
- Submit specification by end of December. XYZ specification ([00:10:00]) — 43a
- Review after the turn of the year
- Refer to materials on the right — 43b

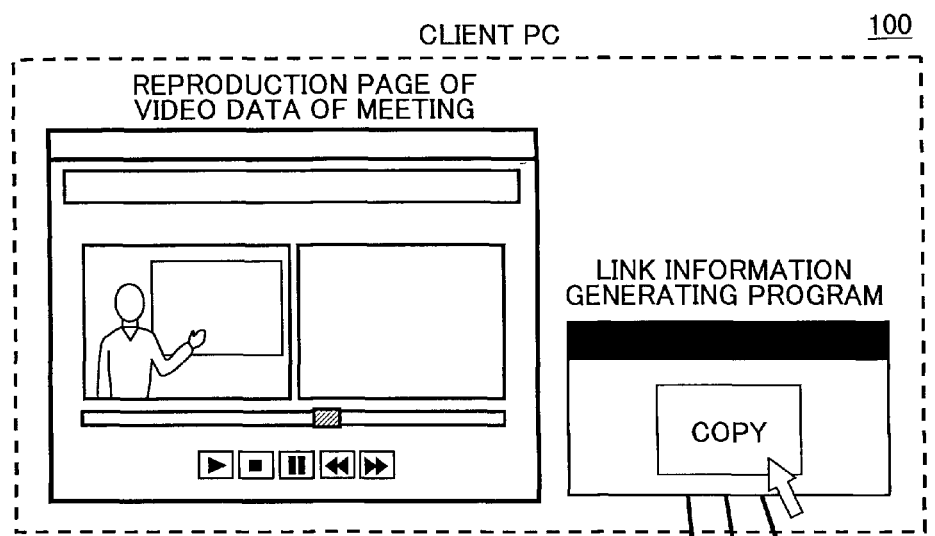

1. Copy link
When the Copy button of the link information generating program is pressed while the user is watching the reproduction page of video data of a meeting, a URL to the meeting data reproduction page corresponding to the time of pressing the button (reproduction starting point) is copied to a clipboard together with information indicating the content of the video data of the meeting corresponding to the time of pressing the button.

2. Paste link

3. Click link

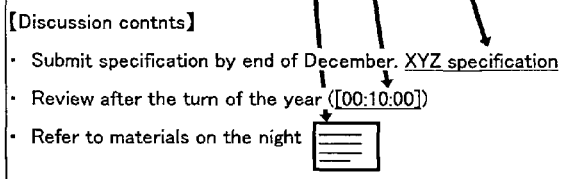

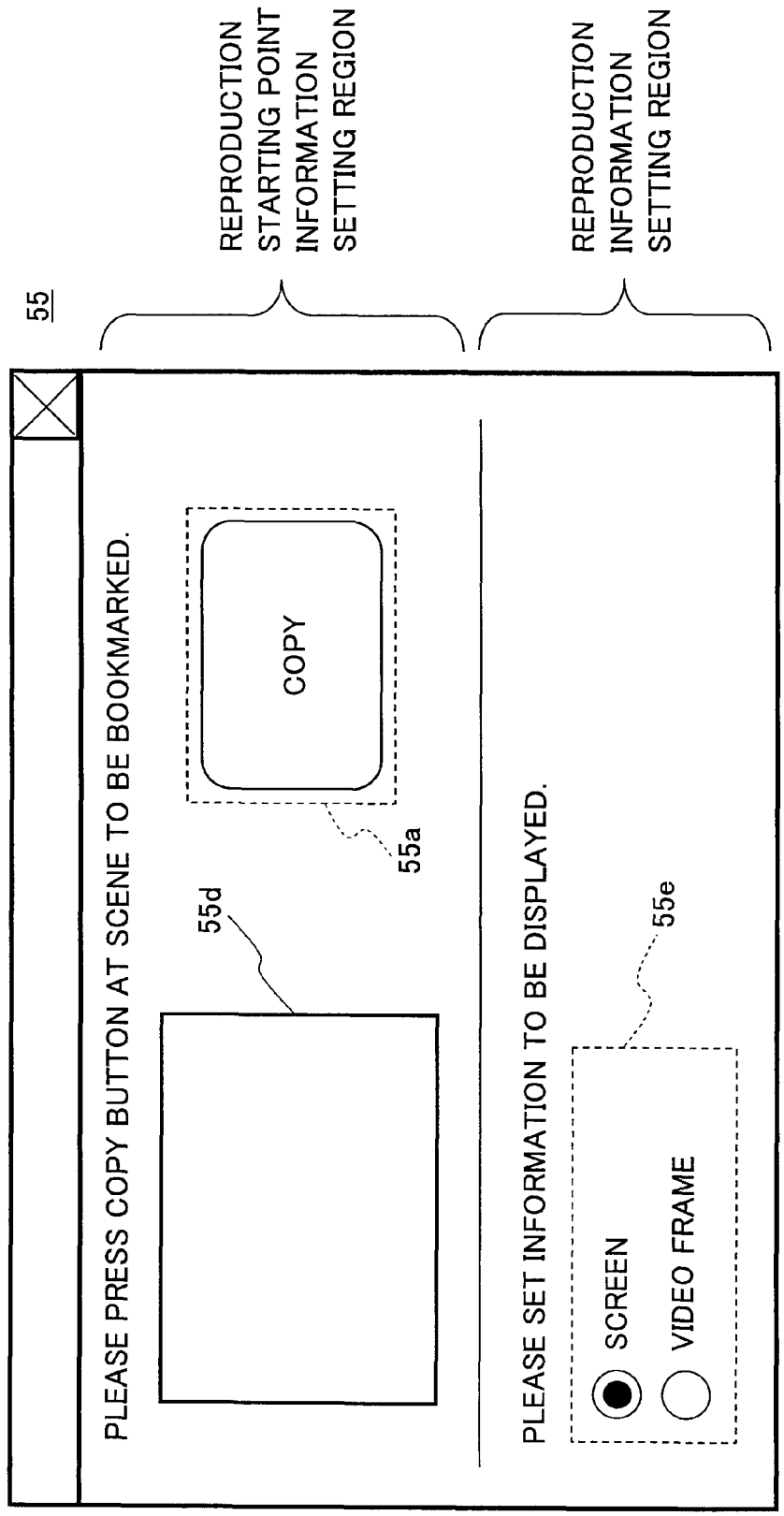

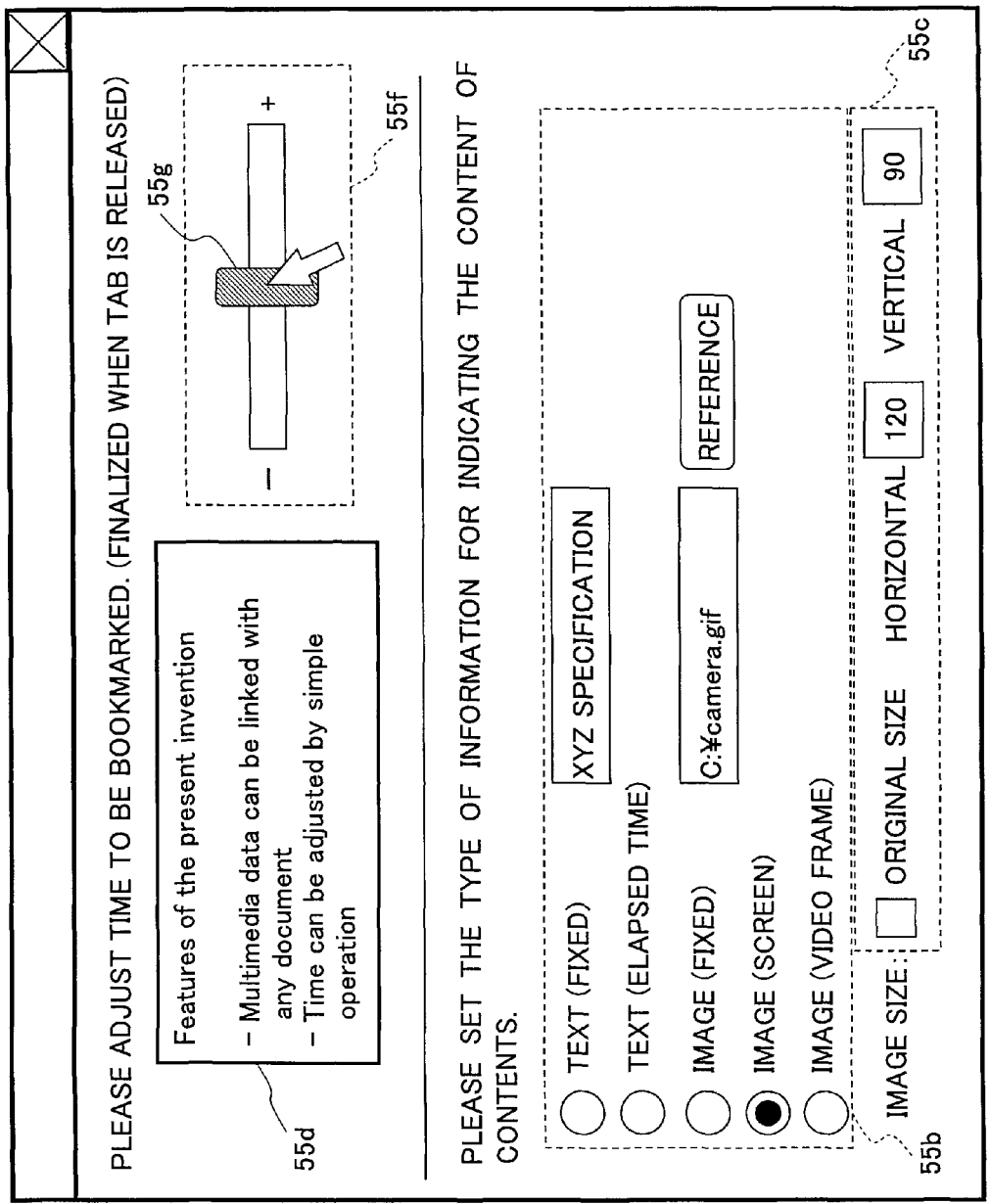

FIG.30

```
Version:1.0
StartHTML:00000097
EndHTML:00000423
StartFragment:00000224
EndFragment:00000386
<!DOCTYPE HTML PUBLIC "-//W3C//DTD HTML 4.0 Transitional//EN">
<html lang=ja>
<head>
</head>
<body>
<!--StartFragment-->
<a href="http://videoserver.abc.com/play?recid=1234&sec=1140">
<img width=120 height=90 src="http://videoserver.abc.com/getscreen?recid=1234&sec=1140">
</a>
<!--EndFragment-->
</body>
</html>
```

43

43b

CLIENT PC 100

DVD-ROM

INTERNET

DOWNLOAD

100 CLIENT PC

CONTENTS MANAGEMENT SYSTEM, IMAGE PROCESSING DEVICE IN CONTENTS MANAGEMENT SYSTEM, AND LINK INFORMATION GENERATING METHOD OF IMAGE PROCESSING DEVICE

BACKGROUND

1. Technical Field

This disclosure relates to a contents management system for managing contents by associating multimedia contents such as audio/video information with a document that is viewed and edited by the user on a daily basis.

2. Description of the Related Art

In recent years and continuing, the development of electronic communication technology has facilitated the operation of interfacing consumer electronic products such as audio/video equipment and PCs (Personal Computers) and delivering high-volume data to a client PC via a telecommunication line (e.g., a network). In such a technical background, there are commercialized products and study examples for capturing video data with a camera and recording the video data in a PC, and delivering the video data to a client PC via the Internet.

Among these examples, there is a system that is attracting attention, which is for accumulating the captured multimedia data in a DB (database) and delivering live data or on-demand data according to a user's request. With this type of system, it is possible to automatically create accurate meeting minutes including information that is not usually written down, such as the decision making process, detailed descriptions, facial expressions of the attendants, and vocal tones of the attendants. Under normal circumstances, the person who is taking notes during a meeting may loose concentration, which may lead to inaccuracies in the minutes. Furthermore, there may be inconsistencies in the understanding and recognition of the contents of the minutes among the people concerned (including those absent from the meeting). However, this system prevents such disadvantages. As a result, it is assumed that the intellectual productivity of the meeting can be enhanced with this proposed system.

However, the problem with recorded audio/video information is that when the user desires to search for a particular recorded scene, there are no search keys other than the time. Thus, it is not easy to search for a scene, as a list of scenes cannot be provided. For example, even when the meeting has been video-recorded, the user needs to search for a part (recorded scene) that he desires to view in the recorded data without any search keys. This may require an enormously long time depending on the recorded time, considering the number of frames included in a single set of video data.

Patent document 1 discloses an invention for solving the above problem with a device having the following technical feature. That is, multimedia information is managed based on time information indicating the association between plural media storage information elements in terms of time. This makes it possible to search for a first media storage information element which is relatively easy to find, and then reproduce a second media storage information element corresponding to the time information of the first media storage information element, thereby enhancing searching efficiency.

Patent document 2 discloses an invention for solving the above problem with a system having the following technical feature. This system includes a device for recording scenes of a lecture presentation or a meeting as contents data of video/ audio information. The system also includes a device with which a user can input/specify important scenes which the user needs to review later on as key information, during the course of recording the scenes. Pattern information is obtained by encoding the key information (a time stamp indicating a position in the contents data/URL (Uniform Resource Locator)). The pattern information is printed on a paper medium. The pattern information printed on the paper medium is read with an input device such as a barcode scanner or a digital camera. In this manner, it is possible to access the contents data recorded when the key information was input.

Patent Document 1: Japanese Patent No. 3548900

Patent Document 2: Japanese Laid-Open Patent Application No. 2005-72811

However, with the conventional technology described in patent document 1, the user is required to find the data in which the meeting is recorded, before using the time information to search for a part of the video which the user desires to view. That is, the user is required to search, on his own, the recorded data that includes the scene which he desires to view. Accordingly, the user needs to specify search conditions (e.g., the date of recording, the name of the meeting, attendants, an agenda keyword) in order to search for the recorded data that he desires to view, which is time-consuming for the user. Furthermore, the more data items recorded, the more time will be required to search for the desired data item.

As for the conventional technology described in patent document 2, unless the user is using the dedicated tool or application on a daily basis, it is difficult to utilize the recorded data. Furthermore, in order to transmit the recorded information to a third party or to share the recorded information with a third party, it is necessary to deliver the dedicated tool/application to the corresponding third party.

Under practical circumstances, users organize and share information by creating documents on a daily basis with the use of applications and systems such as a text editor, a word processor, a blog system, and a CMS (Contents Management System), and storing such documents in a storage device such as a local PC or an HDD (Hard Disk Drive) in a server. Under such practical circumstances, multimedia contents, which are recorded to be efficiently utilized later on, are stored separately from document data that are viewed/edited by the user on a daily basis. Thus, the recorded multimedia data are not efficiently utilized by users.

BREIF SUMMARY

In an aspect of this disclosure, there are provided a contents management system, an image processing device, and a link information generating method, with which a user can efficiently utilize multimedia contents from document data that are viewed/edited by the user on a daily basis.

In an aspect of this disclosure, there are provided a contents management system including a management server configured to manage contents; and an information processing device configured to perform a predetermined process on the contents, wherein the management server and the information processing device are connected to a network; the management server includes a supplying unit configured to supply the contents managed by the management server to the information processing device according to a request from the information processing device to access the contents; the information processing device includes an acquiring unit configured to acquire reproduction starting point information of the contents according to an instruction to acquire the reproduction starting point information indicating a reproduction starting point of the contents, a generating unit configured to generate, based on the reproduction starting point information acquired by the acquiring unit, link information for accessing the contents, and a storing unit configured to store, in a predetermined region of a memory included in the information processing device used for temporarily storing information to be pasted onto document data, the link information generated by the generating unit in association with contents content information indicating content of the contents to be accessed from the link information, when a pasting unit performs a pasting operation of pasting the link information onto the document data being edited; and the contents managed by the management server are accessed based on the link information pasted onto the document data by the pasting unit.

In another aspect, there is provided an information processing device including a pasting unit configured to perform a pasting operation of pasting, onto document data being edited, link information for accessing contents managed by a management server; an acquiring unit configured to acquire reproduction starting point information of the contents according to an instruction to acquire the reproduction starting point information indicating a reproduction starting point of the contents; a generating unit configured to generate the link information based on the reproduction starting point information acquired by the acquiring unit; and a storing unit configured to store, in a predetermined region of a memory included in the information processing device used for temporarily storing information to be pasted onto the document data, the link information generated by the generating unit in association with contents content information indicating content of the contents to be accessed from the link information, when the pasting unit performs the pasting operation of pasting the link information onto the document data being edited.

In another aspect, there is provided a link information generating method performed in an information processing device configured to paste, onto document data being edited, link information for accessing contents managed by a management server, and access the contents managed by the management server based on the pasted link information, the link information generating method including an acquiring step of acquiring reproduction starting point information of the contents according to an instruction to acquire the reproduction starting point information indicating a reproduction starting point of the contents; a generating step of generating the link information for accessing the contents based on the reproduction starting point information acquired in the acquiring step; and a storing step of storing, in a predetermined region of a memory included in the information processing device used for temporarily storing information to be pasted onto the document data, the link information generated in the generating step in association with contents content information indicating content of the contents to be accessed from the link information, when pasting the link information onto the document data being edited.

In another aspect, a contents management system, an image processing device, and a link information generating method are provided, with which a user can efficiently utilize multimedia contents from document data that are viewed/edited by the user on a daily basis.

BRIEF DESCRIPTION OF THE DRAWINGS

The aforementioned and other aspects, features and advantages will become more apparent from the following detailed description when read in conjunction with the accompanying drawings, in which:

FIG. 1 illustrates a case of viewing a currently-being-held meeting with a contents management system according to a first embodiment of the present invention;

FIG. 5 illustrates a software configuration of the contents management system according to the first embodiment of the present invention;

FIG. 12 indicates an example of statuses of recording operation control buttons according to the first embodiment of the present invention, as to whether each UI function is valid/invalid during recording;

FIG. 14 illustrates the data configuration of a setting file regarding the destination (Web/video server (management server)) for supplying the multimedia contents stored in the client PC (information processing device) according to the first embodiment of the present invention;

FIG. 15 illustrates an example of a unit for realizing the link information generating function of the client PC (information processing device) according to the first embodiment of the present invention;

FIG. 17 illustrates an example of a UI page for setting information necessary for generating link information according to the first embodiment of the present invention;

FIGS. 18A and 18B illustrate examples of data configurations of clipboard data according to the first embodiment of the present invention;

FIG. 19 is a flowchart of an example (performed while a meeting is being held) of processing procedures of the link information generating function (function realized by the link information generating program) of the client PC (information processing device) according to the first embodiment of the present invention;

FIG. 22 illustrates a case of reproducing video data of a meeting held in the past with the contents management system according to the first embodiment of the present invention;

FIG. 27 illustrates an example of a UI page according to the second embodiment of the present invention for setting information necessary for generating link information;

FIG. 28 illustrates an example of a UI page according to the second embodiment of the present invention for changing the reproduction starting point;

FIG. 30 illustrates a data structure of generated link information (when a screen image is associated) according to the second embodiment of the present invention;

DETAILED DESCRIPTION OF THE PREFERRED EMBODIMENTS

Figure 2:
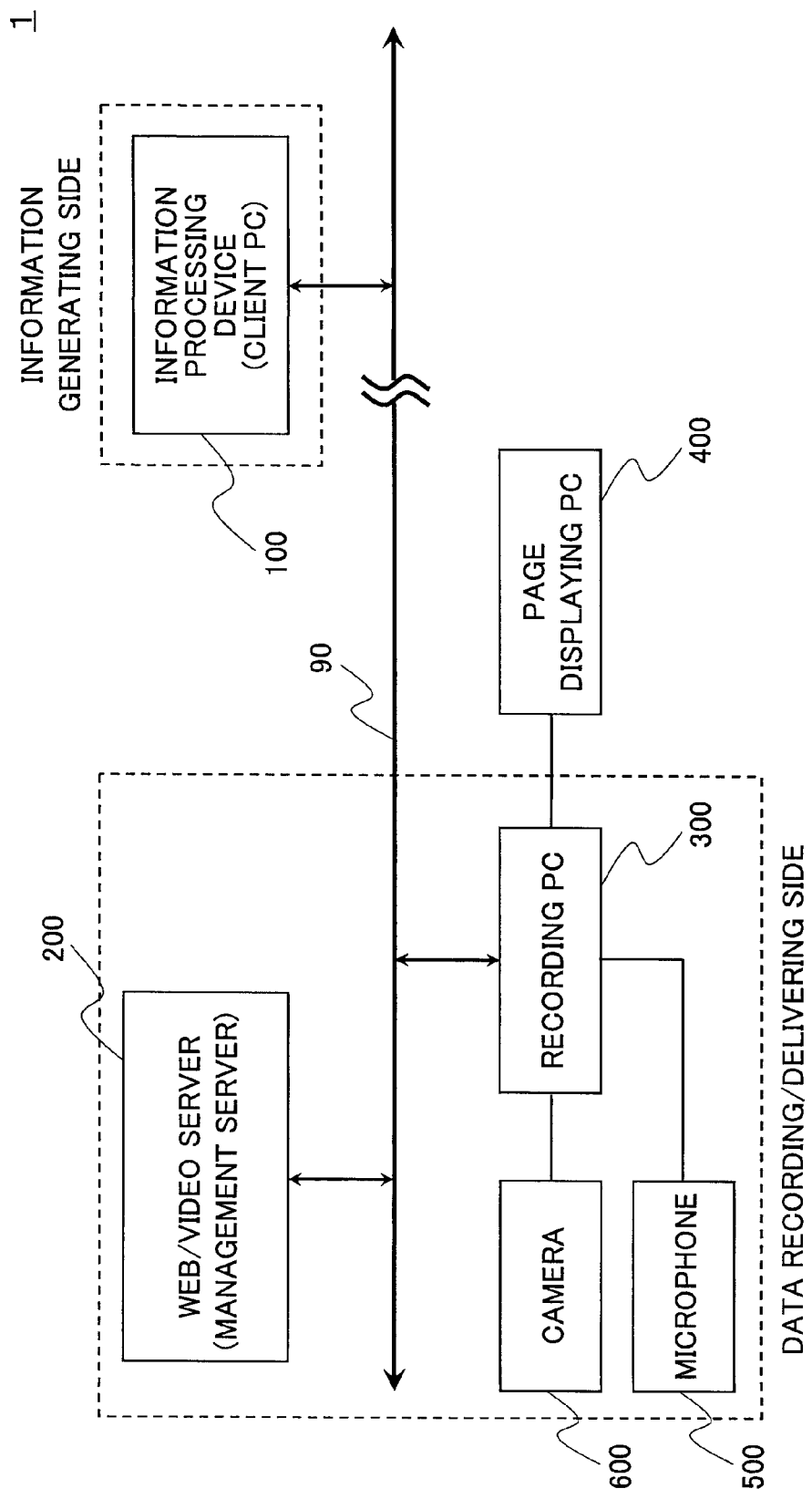
FIG. 2 illustrates an example of a system configuration of the contents management system according to the first embodiment of the present invention.

A description is given, with reference to the accompanying drawings, of an embodiment of the present invention. In the embodiments described below, the multimedia contents correspond to recorded data obtained by recording a meeting. The same embodiments are also applicable to a contents management system for a recording target other than a meeting, such as a lecture presentation, a seminar, a news gathering, or an interview.

[[First Embodiment]]

<Usage Example of Contents Management System (While Viewing a Currently-being-held Meeting)>

First, with reference to FIG. 1, a description is given on an example of how a contents management system according to an embodiment of the present invention is used in a user's environment, in a case of viewing a currently-being-held meeting.

FIG. 1 illustrates a case of viewing a currently-being-held meeting with a contents management system according to a first embodiment of the present invention.

The contents management system according to the present embodiment is used as described below in (1) through (3) in a user's environment in the case of viewing a currently-being-held meeting.

(1) Copy Link Information

First, each of those attending the meeting and remotely viewing the meeting via a meeting viewing screen (hereinafter, "user") starts up a link information generation program in advance, in a client PC (information processing apparatus) owned by the user her/himself. During the course of the meeting, when there is a scene that the user desires to review later on, the user clicks, with a mouse, a [Copy] button of the link information generation program that has been started up. Accordingly, a URL of a page for reproducing video data of the meeting, which includes the time of the particular scene as a parameter, and information (content information of the contents) that clearly and directly indicates the particular scene, are copied (temporarily stored) as link information in a predetermined region (clipboard) in the memory of the client PC (information processing apparatus).

(2) Paste Link Information

Next, the link information, which has been copied (temporarily stored) in a predetermined region (clipboard) in the memory, is pasted onto a document that is being created/edited with the use of an application or a system that is frequently used by the user on a daily basis such as Microsoft Office (registered trademark), CMS, and text editor.

(3) Click Link

As a result, by clicking the link information pasted onto the document, a page for reproducing the video data obtained by recording the meeting is automatically started up, and the video data of the meeting are reproduced starting from the time when the [Copy] button was clicked in (1).

In this manner, in the contents management system according to the present embodiment, the user pastes the link information of the multimedia contents including reproduction start point information onto document data which are edited by the user. Accordingly, the document data and the multimedia contents can be easily associated with each other, thereby realizing a "contents management function" in which the user can efficiently utilize multimedia contents from document data that are viewed/edited by the user on a daily basis.

<System Configuration of Contents Management System>

Next, with reference to FIG. 2, a description is given of the configuration of the contents management system according to the present embodiment realizing the functions described with reference to FIG. 1.

FIG. 2 illustrates an example of the system configuration of a contents management system 1 according to the first embodiment of the present invention.

For example, if the contents management system 1 according to the present embodiment were to be used in a situation of a meeting, the contents management system 1 would include a recording PC 300 that is permanently installed in a meeting room for recording audio/video information of a currently-being-held meeting, a Web/video server (management server) 200 for delivering audio/video information of a recorded meeting, and a client PC (information processing device) 100 for viewing/listening to the delivered audio/video information of the meeting, which are connected, in a wired or wireless manner, to a network (data communications network) 90 such as a LAN (Local Area Network) or a WAN (Wide Area Network).

The recording PC 300 is a recording terminal for converting video signals from a camera 600 and audio signals from a microphone 500 into digital signals. Furthermore, the recording PC 300 intermittently acquires video/audio data that are compressed by a video compression algorithm and page signals sent from a page displaying PC 400 which is used for displaying a page on a screen during a presentation. Furthermore, the recording PC 300 also records still image data compressed by a still image compression algorithm, and sends the recorded data to the Web/video server (management server) 200 via the network 90.

The Web/video server (management server) 200 is for managing multimedia contents, and includes a Web server function and a video server function. In response to a process request received from the client PC (information processing device) 100 via a Web browser, the Web server function sends the request results to the client PC (information processing device) 100 in a format of character strings or HTML (HyperText Markup Language). The video server function is for storing multimedia contents such as audio/video information of the meeting recorded by the recording PC 300, and delivering the data in response to a delivery request from the client PC (information processing device) 100.

The client PC (information processing device) 100 is a user terminal for viewing/listening to audio/video information of the meeting delivered from the Web/video server (management server) 200 in response to a delivery request, and for generating link information of the audio/video information while viewing/listening to the audio/video information, and pasting the generated link information onto document data that are being created and edited.

According to the above-described configuration, in the contents management system 1 according to the present embodiment, video data obtained by recording the meeting can be easily accessed from document data of a user, as in the usage example described with reference to FIG. 1, thereby realizing a "contents management function" with which the user can efficiently utilize multimedia contents.

<Hardware Configuration of Web/Video Server and Client PC>

Figure 3:
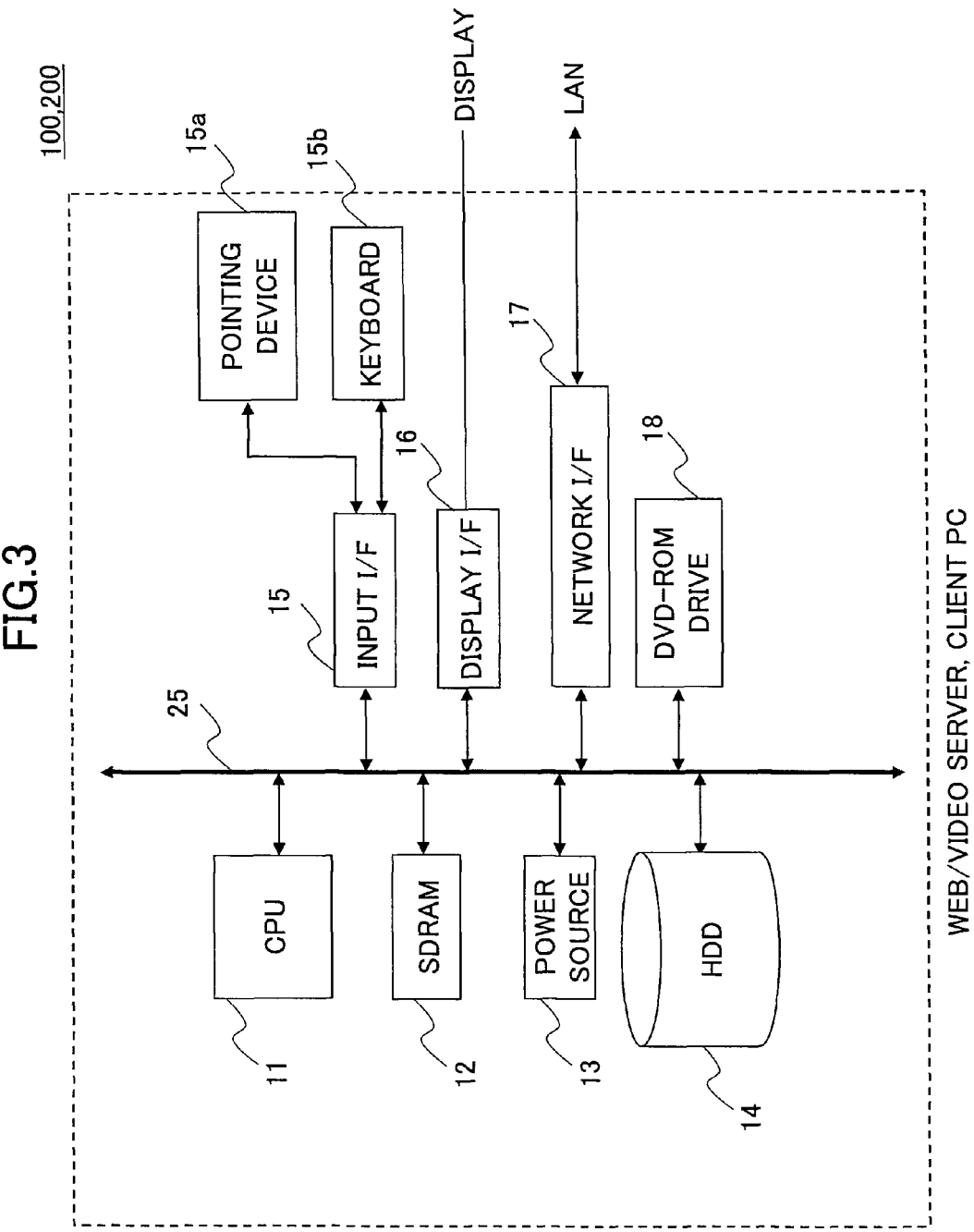
FIG. 3 illustrates an example of a hardware configuration of a Web/video server (management server) and a client PC (information processing device) according to the first embodiment of the present invention.

Next, with reference to FIG. 3, a description is given of a hardware configuration of the Web/video server (management server) 200 and the client PC (information processing device) 100 for realizing the "contents management function" of the contents management system 1 according to the first embodiment of the present invention.

FIG. 3 illustrates an example of a hardware configuration of the Web/video server (management server) 200 and the client PC (information processing device) 100 according to the first embodiment of the present invention.

The Web/video server (management server) 200 and the client PC (information processing device) 100 according to the present embodiment are information processing apparatuses that have the same hardware configuration, as shown in FIG. 3.

Thus, in the description of the hardware configuration given below, the client PC (information processing device) 100 is taken as an example, and a description of the hardware configuration of the Web/video server (management server) 200 is omitted.

Furthermore, the page displaying PC 400, which is used for displaying materials such as presentation materials and operation reports with an image displaying device (not shown) such as a projector or a large screen display, includes a display output terminal (D-Sub, DVI (Digital Visual Interface), etc.) for sending page output signals to the recording PC 300. Otherwise, the page displaying PC 400 has the same hardware configuration as the Web/video server (management server) 200 and the client PC (information processing device) 100, and therefore a description thereof is omitted.

As shown in FIG. 3, the client PC (information processing device) 100 according to the present embodiment includes a CPU (Central Processing Unit) 11, a SDRAM (Synchronous Dynamic Random Access Memory) 12, a power source 13, a HDD (Hard Disk Drive) 14, an input I/F 15, a display I/F 16, a network I/F 17, and a DVD (Digital Versatile Disc)-ROM (Read Only Memory) drive 18, which are interconnected via a bus 25.

The CPU 11 is a processing unit for executing various programs stored in the HDD 14 and for controlling the client PC (information processing device) 100.

The SDRAM 12 is a memory device used as a temporary storage region when a program is being executed and a region for loading a program to be executed by the CPU 11.

The power source 13 is for taking electric power supplied from a commercial power source into the client PC (information processing device) 100.

The HDD 14 is a storage device for storing the OS (Operating System) which is the basic software and various application programs (e.g., a link information generating program) together with related data.

The input I/F 15 is a hardware interface (I/F) for exchanging data between various input devices including a pointing device 15a such as a mouse and a keyboard 15b, and the client PC (information processing device) 100.

The display I/F 16 is connected to a display device (e.g., a CRT (Cathode Ray Tube) or an LCD (Liquid Crystal Display)) by a connection cable. The display I/F 16 is a hardware interface (I/F) for exchanging data between the display device and the client PC (information processing device) 100.

The network I/F 17 is a hardware interface (I/F) for exchanging data between the Web/video server (management server) 200 and the client PC (information processing device) 100 which are connected to the network 90.

The DVD-ROM drive 18 is a data reading device for reading programs and data written in a DVD-ROM.

In the client PC (information processing device) 100 according to the present embodiment, a program (e.g., a link information generating program), which is installed in the client PC (information processing device) 100 via the DVD-ROM drive 18 or the network I/F 17 and stored in the HDD 14, is loaded in a working area of the SDRAM 12, and the loaded program is executed by the CPU 11 to control the client PC (information processing device) 100, thereby realizing functions (e.g., link information generating function) of the client PC (information processing device) 100.

<Hardware Configuration of Recording PC>

Figure 4:
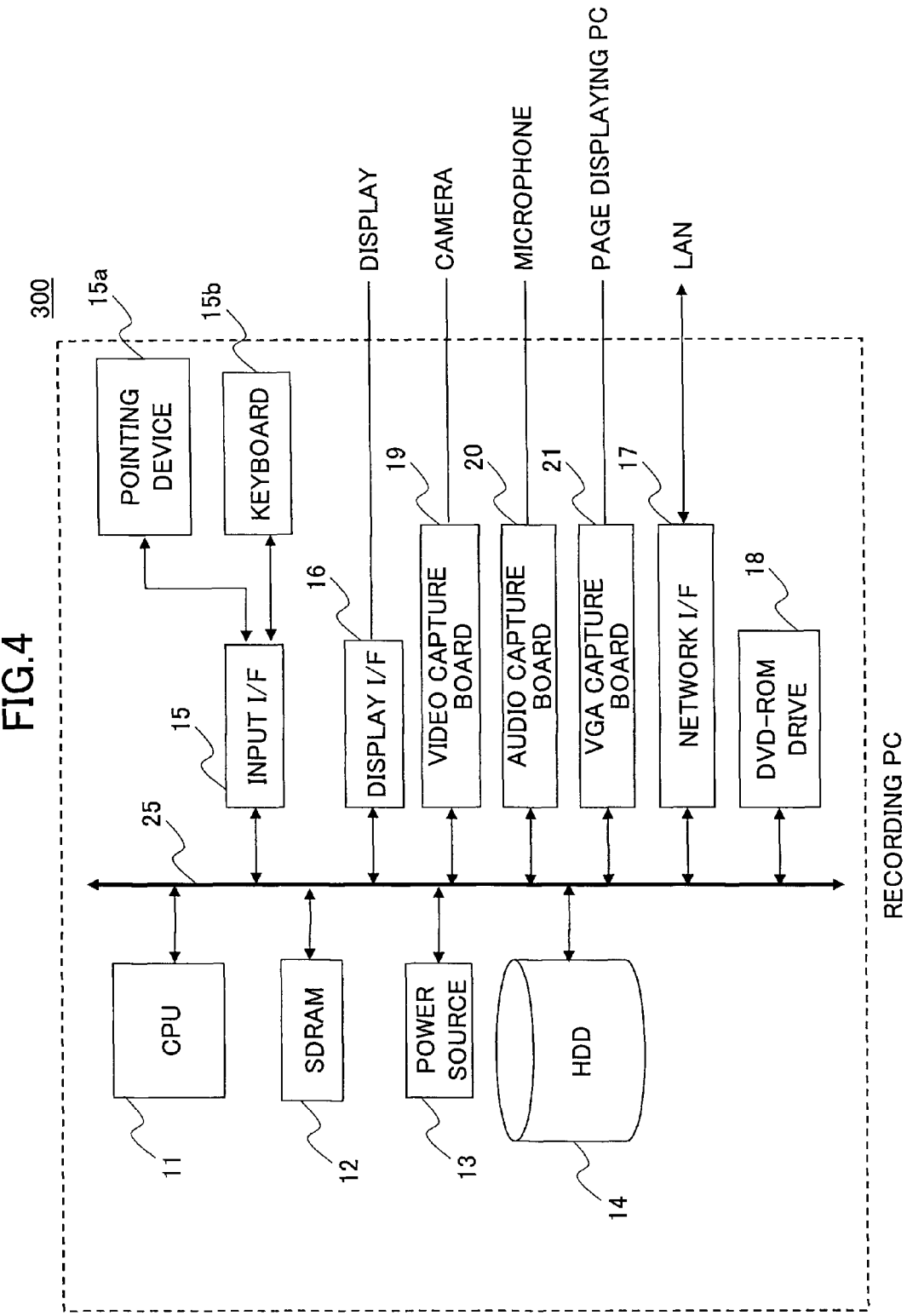
FIG. 4 illustrates a hardware configuration of a recording PC (information processing device) according to the first embodiment of the present invention.

Next, with reference to FIG. 4, a description is given of a hardware configuration of the recording PC 300 for realizing the "contents management function" of the contents management system 1 according to the present embodiment.

As shown in FIG. 4, the recording PC 300 according to the present embodiment includes the CPU 11, the SDRAM 12, the power source 13, the HDD 14, the input I/F 15, the display I/F 16, the network I/F 17, the DVD-ROM drive 18, a video capture board 19, an audio capture board 20, and a VGA (Video Graphics Array) capture board 21, which are interconnected via the bus 25.

The recording PC 300 according to the present embodiment includes the video capture board 19, the audio capture board 20, and the VGA (Video Graphics Array) capture board 21. Otherwise, the recording PC 300 includes the same hardware components as the client PC (information processing device) 100, the Web/video server (management server) 200, and the page displaying PC 400 described with reference to FIG. 3. Therefore, the same hardware elements are denoted by the same reference numbers, and are not further described.

The video capture board 19 is connected to the camera 600 by a connection cable. The video capture board 19 is for taking video signals from the camera 600 into the recording PC 300.

The audio capture board 20 is connected to the microphone 500 by a connection cable. The audio capture board 20 is for taking audio signals from the microphone 500 into the recording PC 300.

The VGA capture board 21 is connected, by a connection cable, to a display output terminal of the page displaying PC 400 which is for displaying meeting materials on a screen. The VGA capture board 21 is for taking page output signals from the page displaying PC 400 into the recording PC 300.

In the recording PC 300 according to the present embodiment, a recording program that has been installed in the recording PC 300 via the DVD-ROM drive 18 or the network I/F 17 and stored in the HDD 14 is loaded in the working area of the SDRAM 12, and the loaded program is executed by the CPU 11 to control the recording PC 300, thereby realizing a function of the recording PC 300 for recording the audio/video information.

<Software Configuration of Contents Management System>

Next, with reference to FIGS. 5 through 11, a description is given on the software used for controlling the hardware described with reference to FIGS. 3 and 4 to realize the "contents management function" of the contents management system 1 according to the present embodiment.

FIG. 5 illustrates a software configuration of the contents management system 1 according to the first embodiment of the present invention.

As shown in FIG. 5, the contents management system 1 according to the present embodiment includes a video encoder 31a and a recording program 31b included in the recording PC 300, a Web server program 32a and a video delivery program 32b included in the Web/video server (management server) 200, and a link information generating program 33a, a Web browser 33b, and a video reproduction program 33c included in the client PC (information processing device) 100.

The software configuration shown in FIG. 5 can be formed by installing each of the programs in the client PC (information processing device) 100, the Web/video server (management server) 200, and the recording PC 300.

A description is given below of the software configuration and the function of each device.

<<Recording PC>>

In the recording PC 300 according to the present embodiment, the following programs are installed and stored in the HDD 14 of the recording PC 300.

Basic software (OS):
    Microsoft Windows XP (registered trademark) Professional Video encoder 31a:
    Microsoft Windows Media Encoder (registered trademark)

Recording program 31b:
    A description of the recording program 31b is given with reference to FIGS. 10 through 12 at <Processing procedures of recording function of recording PC>

<<Web/Video Server>>

In the Web/video server (management server) 200 according to the present embodiment, the following programs are installed and stored in the HDD 14 of the Web/video server (management server) 200.

Basic software (OS):
    Microsoft Windows Server 2003 (registered trademark) Standard Edition Web server program 32a
    In the present embodiment, servlets are used. In this example, a Java (registered trademark) program that is converted into a module (a component) to be executed in the Web server is referred to as a servlet.
    Furthermore, Apache Tomcat (registered trademark) is used as the Web server and the servlet container. In this example, software for operating the servlet is referred to as a servlet container.

Video delivery program 32b
    Windows Media Services (registered trademark)

In the following, a description is given of the Web server program 32a and the video delivery program 32b.

<<<Web Server Program>>>

The Web server program 32a includes a group of servlets for performing various processes in accordance with a request from the client PC (information processing device) 100 or the recording PC 300, such as generating a character string or HTML page data and sending the generated data to the client PC (information processing device) 100, or acquiring/updating data managed by the Web/video server (management server) 200.

The video delivery program 32b performs a process in response to a request by receiving input parameters to be input to the servlet, as a query character string or a post parameter.

For example, the following URL is specified when a process request is made from the Web browser 33b of the client PC (information processing device) 100 to the Web server program 32a.

[Making a Process Request to the Play Servlet]
http://videoserver.abc.com/play?recid=1234&sec=600
    Web/video server address: videoserver.abc.com
    Servlet name: play
    Input parameter name: recid, sec
    Parameter value: 1234, 600

Furthermore, the following message is sent when a process request is made from the recording program 31b of the recording PC 300 to the Web server program 32a.

[Making a Process Request to an openrec Servlet]
GET/openrec?host=recorder01 HTTP/1.1
    Servlet name: openrec
    Input parameter name: host
    Parameter values: recorder01

A description is given of an overview of the function of each servlet of the Web server program 32a according to the present embodiment.

Servlet name: openrec
  Function:
    The start of recording a meeting is registered in the Web/video server (management server) 200 for the recording PC 300 having a host name (parameter name: host) specified in the input parameter, and a recording ID is returned to the calling source.
  Input:
    Host name (parameter name: host)
      Host name (mandatory) of the recording PC 300 in which the recording program operates.
  Process:
    The host name (parameter name: host) of the PC currently recording the meeting, the recording ID for identifying the video data of the meeting currently being recorded, and the recording starting date are stored. A storage destination such as a folder for storing the video data is newly created and named with the recording ID, directly under a root directory (hereinafter, "data root") of a directory structure that is constructed in the HDD 14 of the Web/video server (management server) 200.

Figure 6B:
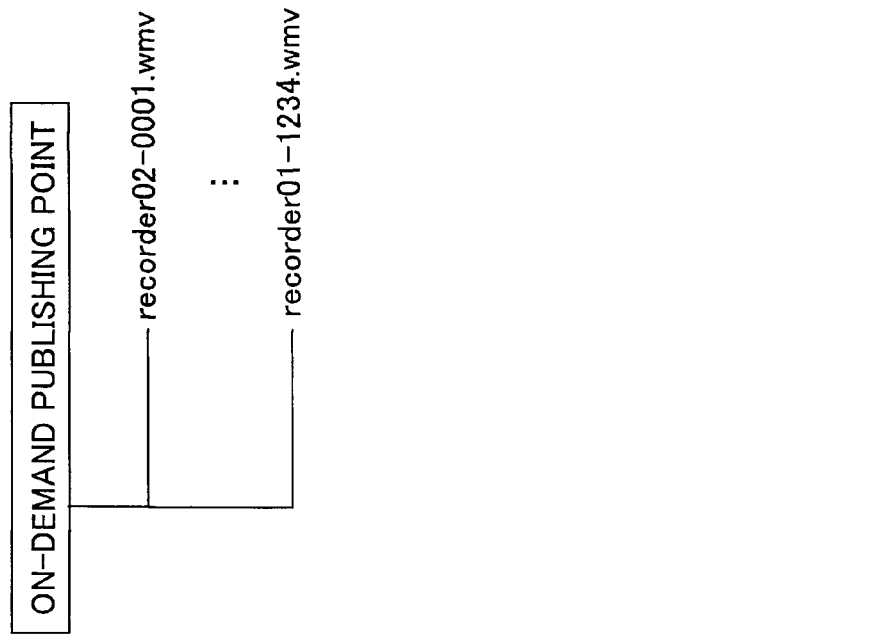
FIGS. 6A and 6B illustrate an example of the data management structure of the Web/video server (management server) according to the first embodiment of the present invention.
Figure 6A:
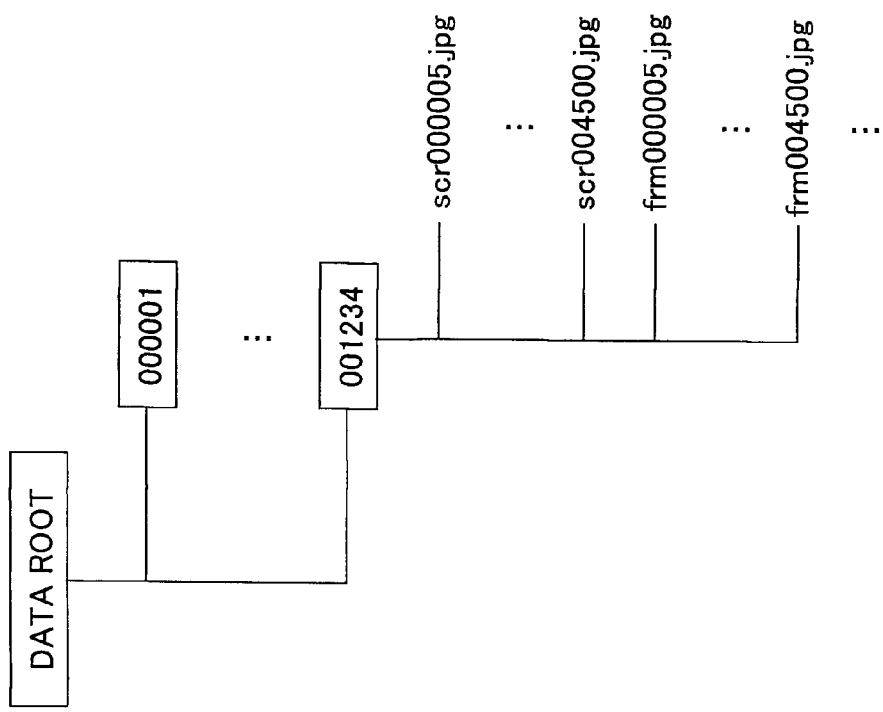

FIGS. 6A and 6B illustrate an example of the data management structure of the Web/video server (management server) 200 according to the first embodiment of the present invention.

FIG. 6A illustrates an example of using the document root folder set with Apache Tomcat (registered trademark) in the "data root" that is the storage destination of video data. Every time a new meeting starts being recorded, the openrec servlet described above creates a subfolder directly under the document root folder, naming the subfolder with the recording ID such as a six digit number "001234" shown in FIG. 6A.

Servlet name: uploadscreen
  Function:
    Receive a still image which is a page displayed on a screen by the page displaying PC 400 during a meeting (hereinafter, "screen image"), which still image is acquired by the recording program 31b described below. The screen image is stored in the HDD 14 of the Web/video server (management server) 200 with a data name for identifying the screen image.
  Input:
    Recording ID (parameter name: recid)
    Elapsed number of seconds from when the recording started (parameter name: sec)
    Screen image (parameter name: body)
  Process:
    The screen image is given a data name of, for example, "scrSSSSSS.jpg" (SSSSSS: a six digit sequence representing the elapsed number of seconds). The screen image is stored in a subfolder (a predetermined storage region in the HDD 14) having a folder name that is named with the recording ID (parameter name: recid), which is directly under the document root folder shown in FIG. 6A. A data folder that can be uniquely identified with a recording ID (parameter name: recid) such as "D:¥[data root]¥[corresponding recording ID]¥" is referred to a "predetermined storage region".

Servlet name: uploadvideoframe
  Function:
    Receive a still image representing a video frame extracted from video signals acquired by the recording program 31b described below (hereinafter, "video frame image"). The screen image is stored in the HDD 14 of the Web/video server (management server) 200 with a data name for identifying the video frame image.
  Input:
    Recording ID (parameter name: recid)
    Elapsed number of seconds from when the recording started (parameter name: sec)
    Screen image (parameter name: body)
  Process:
    The video frame image is given a data name of, for example, "formSSSSSS.jpg" (SSSSSS: a six digit sequence representing the elapsed number of seconds). The video frame image is stored in a subfolder (a predetermined storage region in the HDD 14) having a folder name that is named with the recording ID (parameter name: recid), which is directly under the document root folder shown in FIG. 6A. A data folder that can be uniquely identified with a recording ID (parameter name: recid) such as "D:¥[data root]¥[corresponding recording ID]¥" is referred to a "predetermined storage region".

Figure 7:
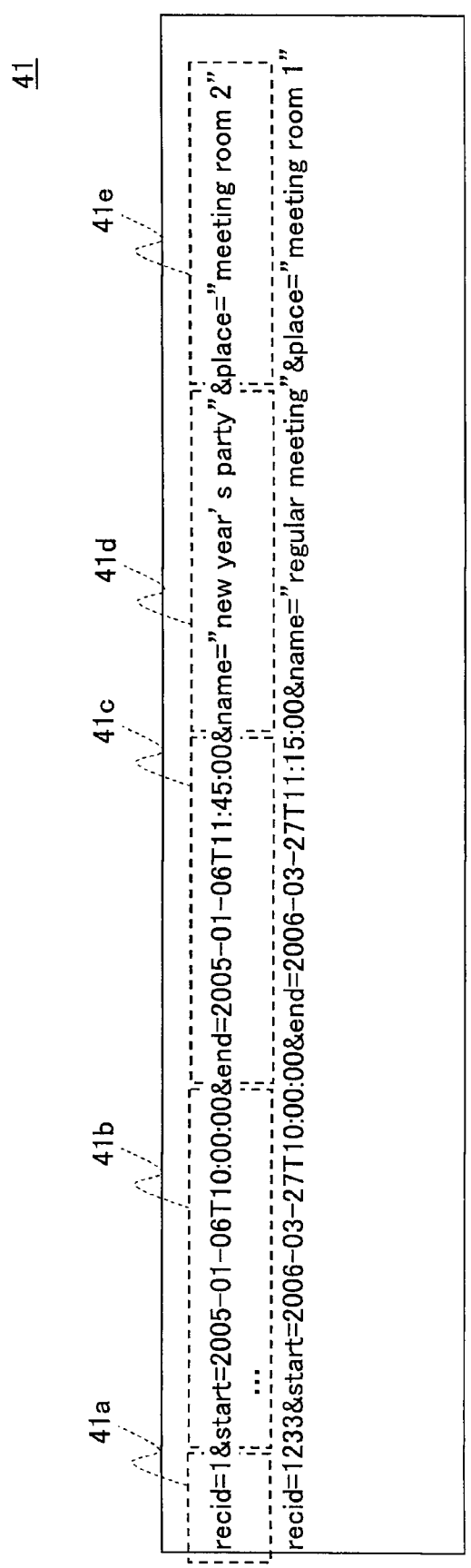
FIG. 7 illustrates an example of a data structure of a meeting list stored in the Web/video server (management server) according to the first embodiment of the present invention.

Servlet name: closerec
  Function:
    The end of recording a meeting is registered in the Web/video server (management server) 200 for the recording PC 300 having a host name (parameter name: host) specified in the input parameter, and a recording ID is returned to the calling source. The recording PC 300 having a specified host name reports to the Web/video server (management server) 200 that it has finished recording the meeting.
  Input:
    Recording ID (parameter name: recid)
    Host name (parameter name: host)
      Host name of the recording PC 300 in which the recording program operates.
  Process:
    The Web/video server (management server) 200 manages information of meetings that have been recorded and/or currently being held and recorded meetings by the recording PC 300, with the use of a meeting list 41 having a data structure as shown in FIG. 7, for example. Thus, every time a meeting ends, the data of the meeting list are updated.

FIG. 7 illustrates an example of a data structure of the meeting list 41 stored in the Web/video server (management server) 200 according to the first embodiment of the present invention.

FIG. 7 illustrates an example of the data of the meeting list 41 that are configured according to a data rule defining that the information items of the meetings that have been recorded are separated by line breaks. Furthermore, in each meeting information item, the elements are separated by "&". Specifically, the elements include a recording ID ("recid=1" shown in FIG. 7) 41a, starting time and date ("start=2005-01-06T10:00:00" shown in FIG. 7) 41b, ending time and date ("end=2005-01-06T11:45:00" shown in FIG. 7) 41c, a meeting name ("name="new year's party" shown in FIG. 7) 41d, and a place of meeting ("place="meeting room 2" shown in FIG. 7) 41e.

When the recording of a meeting ends, the above-described closerec servlet adds the ending time and date 41c to the information of the recording ID 41a, the starting time and date 41b, the meeting name 41d, and the place of meeting 41e, which have been temporarily stored in the SDRAM 12 by the openrec servlet described above when the meeting started. Furthermore, the closerec servlet adds the information 41*a* through 41*e* pertaining to the meeting that has ended to the last row of the meeting list 41.

Servlet name: getcurrec
Function:
During a currently-being-held meeting, i.e., when a closerec servlet is not yet called after an openrec servlet has been called, the host name (host name of recording PC 300) of the currently-recorded meeting registered in the Web/video server (management server) 200, and the starting time and date 41*b* and the recording ID 41*a* of the currently-being-held meeting are returned to the calling source. When there are no meetings currently being held (when there are no currently-being-recorded meetings), null characters are returned.

Servlet name: getelapsedtime
Function:
The elapsed number of seconds (sec) from when the recording started for a currently-being-held meeting that is identified based on the recording ID 41*a* (parameter name: recid) specified in the input parameter, is returned to the calling source. When it is determined from the meeting list 41 that the meeting indicated by the recording ID 41*a* has already ended, or when the recording ID 41*a* is an invalid value, null characters are returned.
Input:
recording ID 41*a* (parameter name: recid)

Servlet name: getscreen
Function:
A screen image displayed on the screen of the page displaying PC 400, which screen image is closest in terms of time to the elapsed number of seconds (parameter name: sec) from when the recording started specified in the input parameter, is extracted from video data of a currently-being-held meeting being recorded that are identified based on the recording ID 41*a* (parameter name: recid) specified in the input parameter. The extracted screen image is returned to the calling source. When the corresponding screen image cannot be acquired at the recording PC 300 because the page displaying PC 400 is not connected to the recording PC 300 while recording the meeting or for some other reason, a predetermined default still image is returned to the calling source.
Input:
recording ID 41*a* (parameter name: recid) elapsed number of seconds from when the recording started (parameter name: sec)
Output:
The image data body having MIME (Multipurpose Internet Mail Extension) type according to a specification defined by RFC2045-2049 for handling various languages, images, audio/video information in e-mails.

Servlet name: getvideoframe
Function:
A video frame that is closest in terms of time to the elapsed number of seconds (parameter name: sec) from when the recording started specified in the input parameter, is extracted from video data of a currently-being-held meeting being recorded that are identified based on the recording ID 41*a* (parameter name: recid) specified in the input parameter. The extracted video frame is returned to the calling source.
Input:
recording ID 41*a* (parameter name: recid) elapsed number of seconds from when the recording started (parameter name: sec)
Output:
The image data body having MIME type Servlet name: live
Function:
A page for live-viewing video data of a currently-being-held meeting being recorded that are identified based on the recording ID 41*a* (parameter name: recid) specified in the input parameter, is returned to the client PC (information processing device) 100 that is the calling source.
Input:
recording ID 41*a* (parameter name: recid)
Output:
a page for viewing a currently-being-held meeting as shown in an example illustrated in FIG. 8

Figure 8:
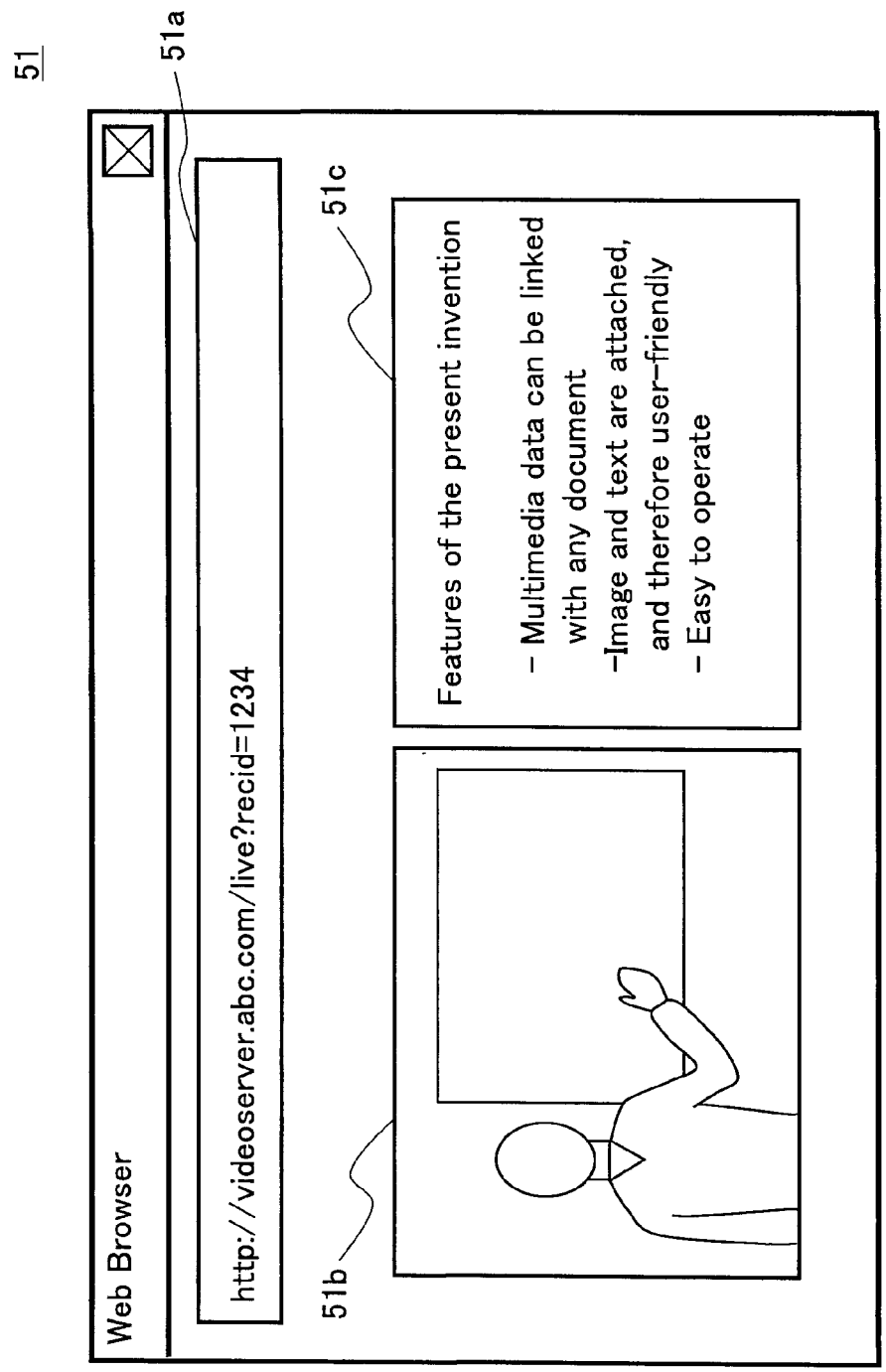
FIG. 8 illustrates an example of a display page (live meeting viewing screen) used for viewing a currently-being-held meeting according to the first embodiment of the present invention.

FIG. 8 illustrates an example of a display page (live meeting viewing screen) 51 (also referred to as a reproduction page 51) according to the first embodiment of the present invention used for viewing a currently-being-held meeting.

As shown in FIG. 8, in an address space 51*a* of the Web browser 33*b* of the client PC (information processing device) 100, a URL ("http://videoserver.abc.com/live?recid=1234" shown in FIG. 8) is specified. This URL is for delivering, from the Web/video server (management server) 200 to the client PC (information processing device) 100, a live video of a meeting for which the recording ID 41*a* ("1234" in FIG. 8) is issued when being recorded.

Furthermore, a video display region 51*b* shown in FIG. 8 is an interface for displaying video data obtained by video-recording a currently-being-held meeting with the camera 600 connected to the recording PC 300. A page display region 51*c* is an interface for displaying a screen image (still image data) currently being displayed on the screen of the page displaying PC 400 connected to the recording PC 300. The video display region 51*b* and the page display region 51*c* are updated, for example, every five seconds.

The two types of data (video data and still image data) displayed in the video display region 51*b* and the page display region 51*c* are displayed in synchronization with the elapsed time (sec) from when the recording of the meeting started and a time stamp attached to the screen image.

Servlet name: play
Function:
A page for reproducing video data of a meeting that is identified based on the recording ID 41*a* (parameter name: recid) specified in the input parameter, is returned to the client PC (information processing device) 100 that is the calling source. Accordingly, in the client PC (information processing device) 100, the video data are automatically reproduced starting from the time point of the elapsed number of seconds (parameter name: sec) specified in the input parameter.
Input:
recording ID 41*a* (parameter name: recid) elapsed number of seconds (parameter name: sec) from when the recording started
May be omitted: When omitted, it is assumed that sec=0.
Output:
a page for reproducing video data of a recorded meeting as shown in an example illustrated in FIG. 9

Figure 9:
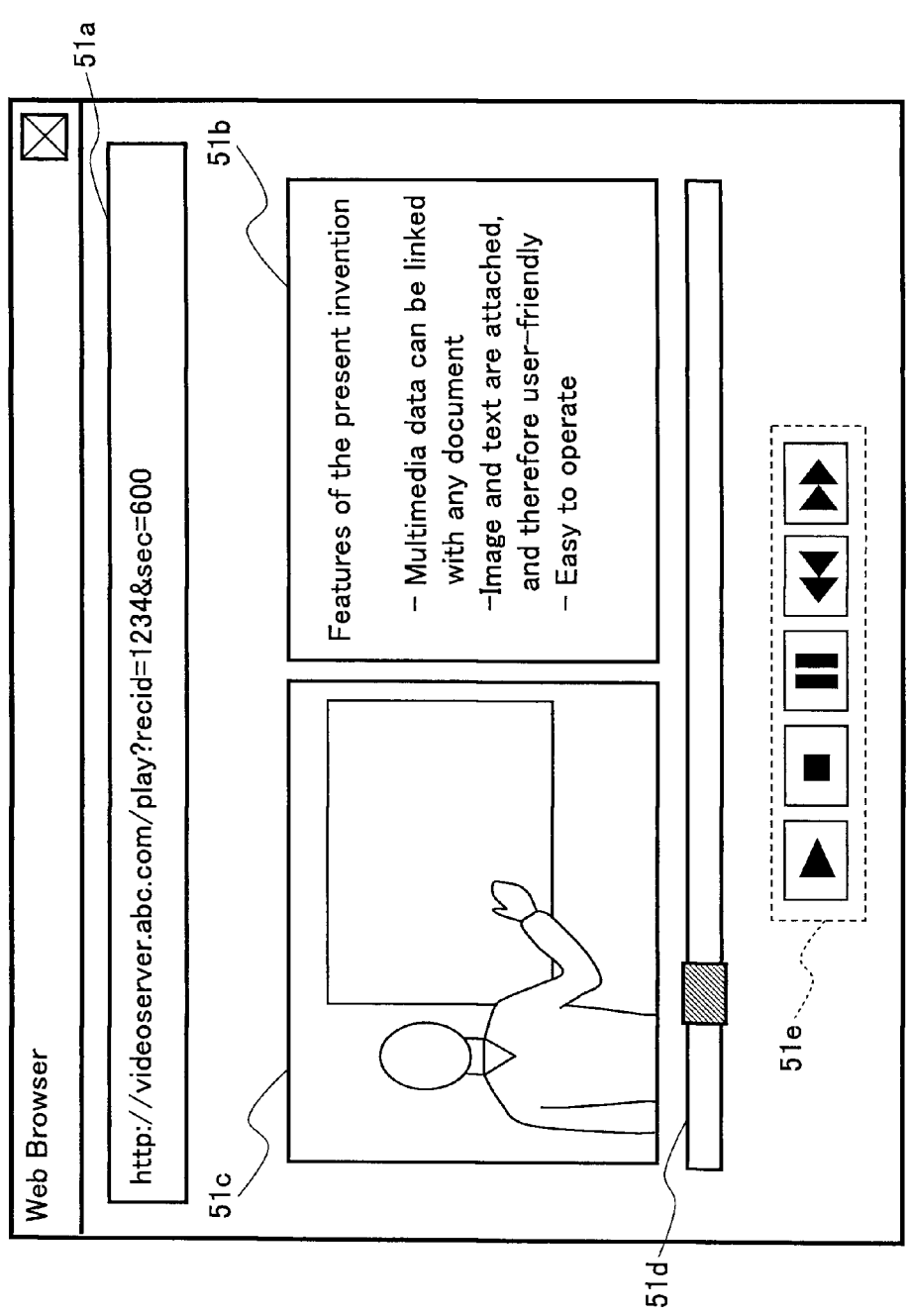
FIG. 9 illustrates an example of a display screen (video reproduction screen) used for reproducing video data obtained by recording a meeting according to the first embodiment of the present invention.

FIG. 9 illustrates an example of the display screen (video reproduction screen) 51 according to the first embodiment of the present invention used for reproducing video data obtained by recording a meeting.

The screen illustrated in FIG. 9 is returned to the Web browser 33b of the client PC (information processing device) 100 by the above-described play servlet.

As shown in FIG. 9, in the address space 51a of the Web browser 33b of the client PC (information processing device) 100, a URL ("http://videoserver.abc.com/play?recid=1234&sec=600" shown in FIG. 9) is specified. This URL is for delivering an on-demand video of a recorded meeting for which the recording ID 41a ("1234" in FIG. 9) is issued when being recorded, starting from the reproduction start point corresponding to a predetermined elapsed number of seconds from when the recording started ("600 (sec)" in FIG. 9).

The video display region 51b and the page display region 51c shown in FIG. 9 are the same as those described with reference to FIG. 8 used for viewing a currently-being-held meeting, and are thus not further described.

A seek bar 51d shown in FIG. 9 is an interface for graphically adjusting the time of the reproduction start point (elapsed time (sec) from when recording started) of the video data to be reproduced. In the present embodiment, not only the video data, but a screen image (still image data) displayed on a screen by the page displaying PC 400 is also synchronized with the elapsed time (sec) from the recording start point of the video data to be reproduced. Therefore, the screen image (still image data) changes according to the position of the tab of the seek bar 51d.

Furthermore, reproduction operation control buttons 51e, which function as a UI (User Interface) for controlling reproduction operations of the video data, include buttons for functions to reproduce, stop, pause, rewind, and fast-forward. When each button is pressed by a pointing device such as a mouse, the pressed button performs an operation corresponding to its function.

<<<Video Delivery Program>>>

The video delivery program 32b operates in association with the video encoder 31a of the recording PC 300 and the video reproduction program 33c of the client PC (information processing device) 100, and delivers the video data via the network 90.

There are two methods of delivering the video data. One method is "live delivery" of delivering a live stream and the other method is "on-demand delivery" of delivering existing contents such as a video file. "Live delivery" is performed when delivering a page for viewing a presently-being-held meeting to the client PC (information processing device) 100 with a live servlet. "On-demand delivery" is performed when delivering a page for reproducing, with the play servlet, video data that have been obtained by recording a meeting.

In the case of using "live delivery", it is necessary to set a broadcast publishing point. The video encoder 31a of the recording PC 300 is connected to the video delivery program 32b via the network 90, creates a broadcast publishing point with an arbitrary name, and sends (pushes) compressed video data to the created broadcast publishing point.

As a result, in the client PC (information processing device) 100, the following URL is input to an address space of a reproduction page for video data displayed when the video reproduction program 33c is executed. This makes it possible to view the video data that have been compressed by the video encoder 31a of the recording PC 300 connected to the client PC (information processing device) 100.

[Example of Specifying a URL of a Published Video Which the User Desires to View from a Reproduction Page for the Video Data]

rtsp://videoserver.abc.com/broadcast publishing point name

In this example, a protocol for delivering real-time audio/video information via a network such as the Internet or an intranet, is referred to as the rtsp (Real Time Streaming Protocol).

On the other hand, in the case of using "on-demand delivery", the video data of a meeting that have already been recorded are delivered, as a stream, from the Web/video server (management server) 200 which is the on-demand publishing point to the client PC (information processing device) 100.

FIG. 6B illustrates an example of a data management structure of an on-demand publishing point of the Web/video server (management server) 200.

As shown in FIG. 6B, directly under the folder specified as an on-demand publishing point, video data items ("recorder02-0001.wmv" and "recorder01-1234.wmv" shown in FIG. 6B) of all of the meetings recorded by the recording PC 300 are collectively stored.

The on-demand publishing point is set beforehand in the Web/video server (management server) 200 including the video delivery program 32b. The folder used as the on-demand publishing point (for storing the video data to be delivered on-demand) can be created in the HDD 14 of the Web/video server (management server) 200.

As a result, in the client PC (information processing device) 100, the following URL is input to an address space of a reproduction page for video data displayed when the video reproduction program 33c is executed. This makes it possible to view the video data stored in the on-demand publishing point.

[Example of Specifying a URL of a Video Which the User Desires to Reproduce from a Reproduction Page for the Video Data]

rtsp://videoserver.abc.com/video data name

<<<Client PC>>>

In the client PC (information processing device) 100 according to the present embodiment, the following program is installed and stored in the HDD 14 of the client PC (information processing device) 100.

Basic software (OS):
        Microsoft Windows XP (registered trademark) Professional
    Web browser 33b:
        Microsoft Internet Explorer (registered trademark)
    Video reproduction program 33c:
        Microsoft Windows Media Player (registered trademark)
    Link information generating program 33a:
        A description of the link information generating program 33a is given below in <main configuration of "link information generating function" of client PC> and <unit for realizing "link information generating function" of client PC> with reference to FIGS. 13 and 15 through 18.

<Processing Procedures of Recording Function of the Recording PC>

Figure 10:
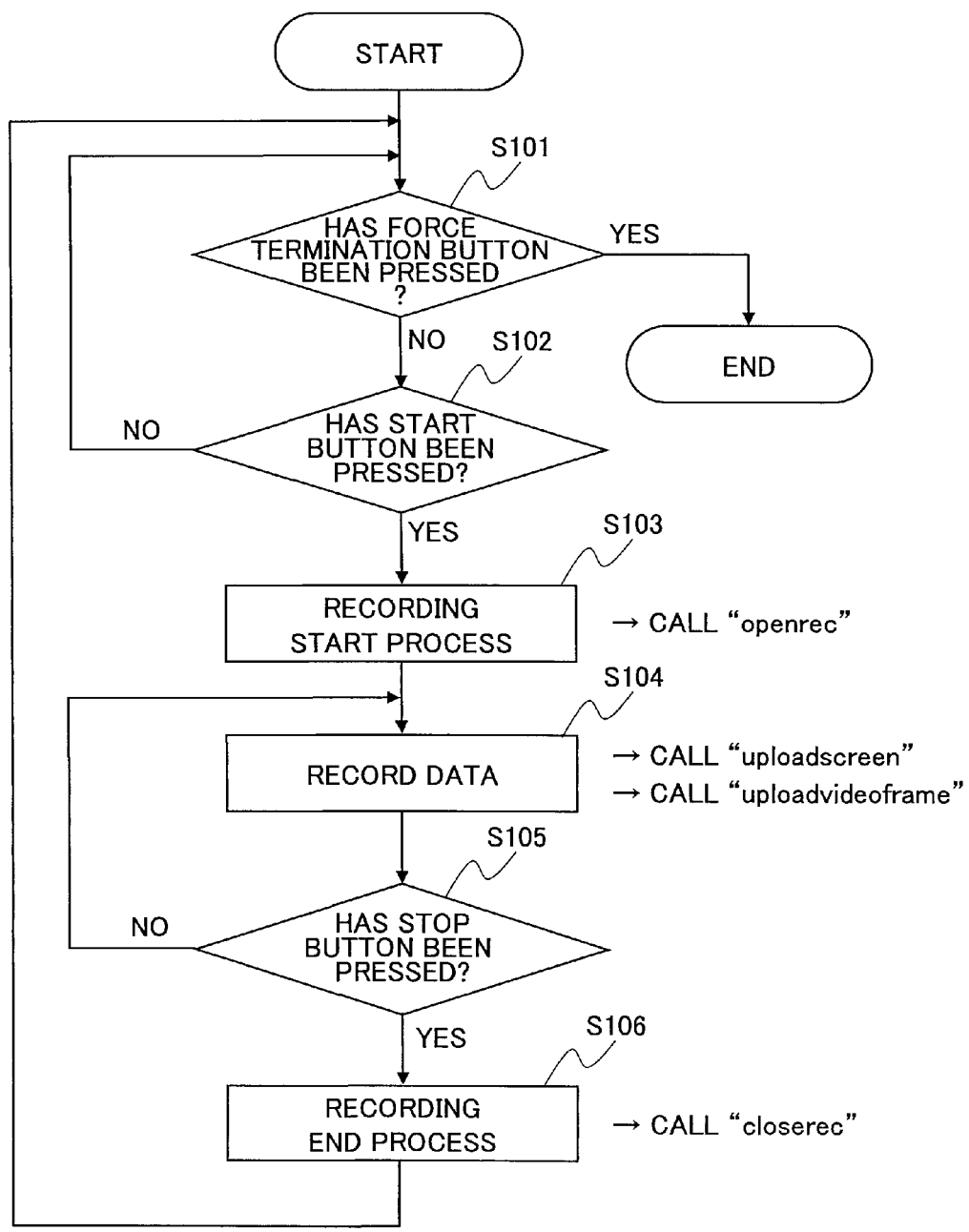
FIG. 10 is a flowchart of an example of processing procedures of a recording function (function realized by a recording program) of the recording PC according to the first embodiment of the present invention.
Figure 11:
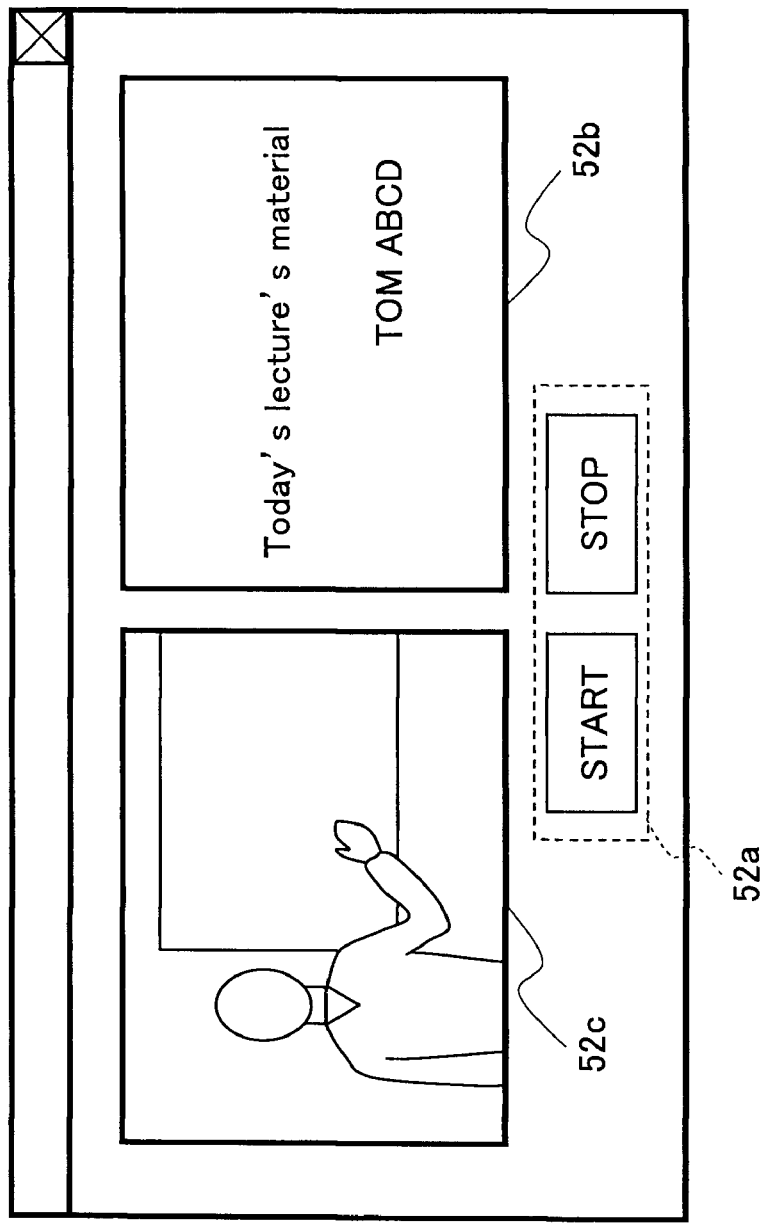
FIG. 11 is an example of a display page (recording page) displayed when recording a currently-being-held meeting according to the first embodiment of the present invention.

Next, with reference to FIGS. 10 through 12, a description is given on how multimedia contents (e.g., video data obtained by recording a currently-held meeting and presentation materials used in the meeting such as still image data and text data) managed by the Web/video server (management server) 200 are generated in the contents management system 1 according to the present embodiment.

The multimedia contents managed by the Web/video server (management server) 200 are generated by the recording program 31b of the recording PC 300.

The recording program 31b uses the video encoder 31a of the recording PC 300 to record data obtained by compressing, in a Windows Media Video (WMV) format, the video signals and audio signals input to the recording PC 300 from the camera 600 or the microphone 500, and to record page signals sent from the page displaying PC 400 as still images.

FIG. 10 is a flowchart of an example of processing procedures of the recording function (function realized by the recording program 31b) of the recording PC 300 according to the first embodiment of the present invention.

When the recording program 31b according to the present embodiment is executed by the recording PC 300, a page as shown in FIG. 11 is displayed.

FIG. 11 is an example of a display page (recording page) 52 according to the first embodiment of the present invention displayed when recording a currently-being-held meeting.

As shown in FIG. 11, the display page (recording page) 52 includes a video display region 52c for displaying video signals acquired from the camera 600, a page display region 52b for displaying page signals sent from the page displaying PC 400, and recording operation control buttons 52a, which function as a UI (User Interface) for controlling recording operations, including [Start]/[Stop] buttons to start/stop recording a meeting and a force termination button (the [x] button in the top-right corner of FIG. 11) for ending the recording program 31b.

The statuses (the status as to whether each UI function is valid/invalid during recording) of the three buttons shown in FIG. 11 are indicated in FIG. 12.

FIG. 12 indicates an example of statuses of the recording operation control buttons 52a according to the first embodiment of the present invention, as to whether each UI function is valid/invalid during recording.

When recording is not performed (stopped), the [Start] button and the force termination button (the [x] button in FIG. 11) are valid as the recording operation control buttons 52a, which can be used for giving instructions to start recording or to end the recording program 31b. At this time, the [Stop] button is invalid as the recording operation control button 52a, and thus will not function even when pressed by a pointing device such as a mouse.

Furthermore, when recording is being performed, the [Stop] button is valid as the recording operation control button 52a, which can be used for giving an instruction to stop recording. At this time, the [Start] button and the force termination button (the [x] button in FIG. 11) are invalid as the recording operation control buttons 52a, and thus will not function even when pressed by a pointing device such as a mouse.

The recording program 31b determines whether the force termination button (the [x] button in FIG. 11) of the recording operation control buttons 52a has been pressed with a pointing device such as a mouse (step S101).

When the force termination button (the [x] button in FIG. 11) has been pressed (Yes in step S101), the recording program 31b closes the display page (recording page) 52 and ends the program.

When the force termination button (the [x] button in FIG. 11) has not yet been pressed (No in step S101), the recording program 31b determines whether the [Start] button of the recording operation control buttons 52a has been pressed (step S102).

When the [Start] button has not yet been pressed (No in step S102), the process control returns to step S101.

When the [Start] button has been pressed (Yes in step S102), the recording program 31b starts recording in accordance with an instruction to start recording, and performs the "recording start process" described below (step S103).

[Report that Recording has Started to Web Server Program]

The recording program 31b calls an openrec servlet of the Web server program 32a included in the Web/video server (management server) 200, thereby reporting to the Web server program 32a that recording has started. As a result, the recording program 31b acquires a newly issued recording ID 41a in response to a process result from the openrec servlet. For example, when the recording PC 300 has a host name of "recorder01", a request message of "GET/openrec?host=recorder01 HTTP/1.1" is sent to the Web server program 32a to report that recording has been started by the recording PC 300 having the host name of "recorder01". In this example, the recording ID 41a that is returned from the openrec servlet to the recording program 31b is "1234".

[Start Compression Process]

The recording program 31b instructs the video encoder 31a used in the program to start sending (pushing) compressed video data (video data in WMV format) to the video delivery program 32b of the Web/video server (management server) 200. The recording program 31b determines the name of a broadcast publishing point to be created in the video delivery program 32b according to a rule of "name of itself-recording ID" (e.g., "1234"). That is, the broadcast publishing point will have a name of "recorder01-1234".

As a result, the video delivery program 32b starts writing the video data that have been sent (pushed) in the on-demand publishing point which is a predetermined storage region in the HDD 14 of the Web/video server (management server) 200. This file is also named according to the same rule as that of the broadcast publishing point. That is, the file name will be "recorder01-1234.wmv".

Next, the recording program 31b executes the "data recording process" described below (step S104).

[Compression of Video Signals and Audio Signals]

The recording program 31b continuously performs compression processes on the video signals and on the audio signals with the video encoder 31a, and sends (pushes) the compressed video data (video data in WMV format) to the video delivery program 32b of the Web/video server (management server) 200.

[Intermittent Recording of Page Signals]

The recording program 31b compresses the page signals sent from the page displaying PC 400 in a JPEG (Joint Photographic Experts Group) format every five seconds, for example, and records the compressed signals as still image data. Every time still image data are recorded, an uploadscreen servlet of the Web server program 32a included in the Web/video server (management server) 200 is called in a POST format. Accordingly, the still image data are uploaded to the Web/video server (management server) 200. For example, when there is an image displayed on the screen of the page displaying PC 400 that is in synchronization with a time point corresponding to ten minutes after the meeting having the recording ID 41a of "1234" has started (600 seconds later), "recid=1234&sec=600" is specified as a parameter of an uploadscreen servlet. The screen image at this point (still image data in JPEG format) is uploaded in the multipart/form-data format.

[Intermittent Recording of Frame of Video Signals]

The recording program 31b extracts a frame from video signals input from the camera 600 every five seconds, for example. The recording program 31b compresses the extracted frame in a JPEG format, and records the compressed frame as still image data. Every time the still image data are recorded, an uploadvideoframe servlet of the Web server program 32a included in the Web/video server (management server) 200 is called in a POST format. Accordingly, the still image data are uploaded to the Web/video server (management server) 200. For example, when a video image signal is extracted ten minutes (600 seconds) after starting to record a meeting having the recording ID 41a of "1234", "recid=1234&sec=600" is specified as the parameter of the uploadvideoframe servlet, and the frame image (still image data in JPEG format) at that time is uploaded in a multipart/form-data format.

Next, the recording program 31b determines whether the [Stop] button of the recording operation control buttons 52a has been pressed with a pointing device such as a mouse (step S105).

When the [Stop] button has not yet been pressed (No in step S105), the process control returns to step S104 ("data recording process").

When the [Stop] button has been pressed (Yes in step S105), the recording program 31b stops recording in accordance with an instruction to stop recording, and performs the "recording end process" described below (step S106).

[Stop Compression Process on Video Signals and Audio Signals]

The recording program 31b stops the process of compressing the video signals and audio signals continuously performed by the video encoder 31a, and the process of sending (pushing) the compressed video data (video data in WMV format) to the video delivery program 32b of the Web/video server (management server) 200. Furthermore, the recording program 31b deletes the broadcast publishing point (in the present embodiment, which is "recorder01-1234" created at the time of starting the recording.

[Stopping Intermittent Recording of Page Signals]

The recording program 31b stops the process of compressing/recording, in a JPEG format, the page signals sent from the page displaying PC 400.

[Report End of Recording to Web Server Program]

The recording program 31b calls the closerec servlet of the Web server program 32a included in the Web/video server (management server) 200, thereby reporting to the Web server program 32a that recording has ended. For example, if the recording PC 300 has a host name of "recorder01" and the recording ID 41a for identifying the meeting being recorded is "1234", a request message of "GET/closerec?host=recorder01&recid=1234 HTTP/1.1" is sent to the Web server program 32a, thereby reporting that the recording PC 300 having the host name of "recorder01" has finished recording the meeting indicated by the recording ID 41a of "1234".

Each of the servlets is called from the recording program 31b with the use of an API (Application Programming Interface) called WinInet (Wininet.dll) that is pre-installed before shipment in Microsoft Internet Explorer (registered trademark) 3.0 and onward.

Accordingly, in the contents management system 1 according to the present embodiment, the recording PC 300 converts the video signals and the audio signals input from the camera 600 and the microphone 500 into multimedia contents of an appropriate data format, so that the multimedia contents can be stored in a predetermined storage region (a folder at the on-demand publishing point) in the HDD 14 of the Web/video server (management server) 200. As a result, the stored multimedia contents can be managed.

<Main Configuration of "Link Information Generating Function" of Client PC>

The "contents managing function" of the contents management system 1 according to the present embodiment is mainly realized by a "contents storing function" of the Web/video server (management server) 200, a "data recording function" of the recording PC 300, and a "link information generating function" of the client PC (information processing device) 100.

In the following, a description is given of the configuration of the "link information generating function" of the client PC (information processing device) 100 according to an embodiment of the present invention with reference to FIGS. 13 and 14.

Figure 13:
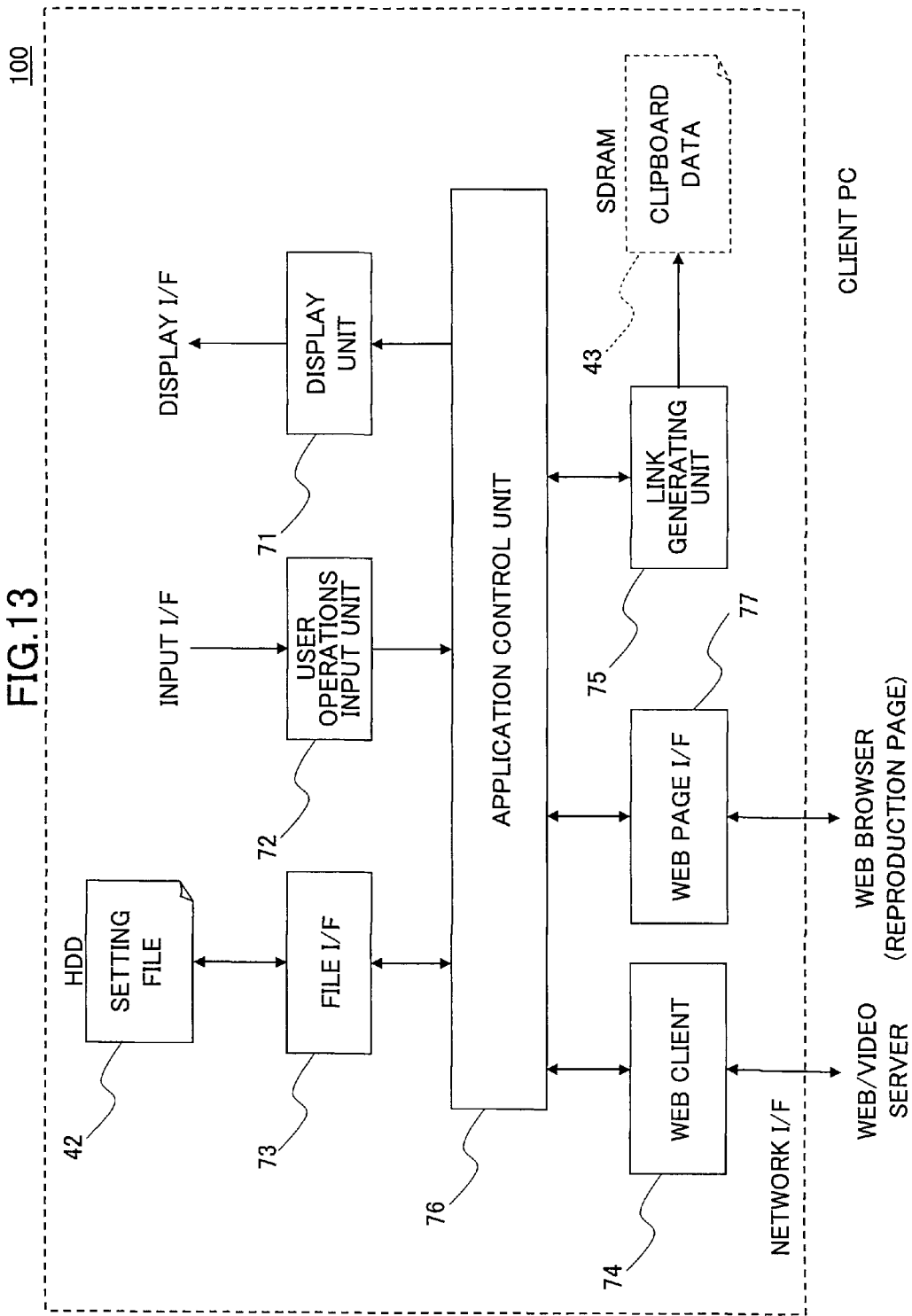
FIG. 13 illustrates an example of the configuration of a link information generating function (function realized by a link information generating program) of the client PC (information processing device) according to the first embodiment of the present invention.

FIG. 13 illustrates an example of the configuration of the link information generating function (function realized by the link information generating program 33a) of the client PC (information processing device) 100 according to the first embodiment of the present invention.

As shown in FIG. 13, the "link information generating function" of the client PC (information processing device) 100 according to the present embodiment includes a display unit 71, a user operations input unit 72, a file I/F 73, a Web client 74, a link generating unit 75, an application control unit 76, and a Web page I/F 77.

The display unit 71 displays a GUI (Graphical User Interface) such as a text box used for inputting data and operations buttons on a screen of a display device (e.g., CRT, LCD) via the display I/F 16.

The user operations input unit 72 receives input information from a keyboard or operations information from a pointing device such as a mouse from a user via the input I/F 15.

The file I/F 73 is an interface for reading data stored in the HDD 14. In the present embodiment, a setting file 42 as shown in FIG. 14 is stored in the HDD 14.

FIG. 14 illustrates the data configuration of the setting file 42 regarding the destination (Web/video server (management server) 200) for supplying the multimedia contents stored in the client PC (information processing device) 100 according to the first embodiment of the present invention.

FIG. 14 illustrates an example of the setting file 42 which is text data describing, in a format of "key=value", the setting of the destination (Web/video server (management server) 200) for supplying the multimedia contents.

As shown in FIG. 14, in the setting file 42 according to the present embodiment, a key named "sWebServerPath" has values of a scheme name (http) and a server name (videoserver.abc.com) of the server in which the Web server program 32a is installed.

The Web client 74 sends a process request to the Web server program 32a included in the Web/video server (management server) 200 and receives a response from the Web server program 32a using the communication protocol RTTP. The present embodiment is realized with the use of the above-described WinInet (Wininet.dll).

In response to an instruction from the application control unit 76, the link generating unit 75 generates a URL for requesting a play servlet of the Web server program 32a included in the Web/video server (management server) 200 to perform a process of generating the display page 51 for reproducing video data of a meeting which the user desires to reproduce among the video data items (multimedia contents) of recorded meetings. The link generating unit 75 copies (temporarily stores) this URL, together with information indicating the content of the video data which the user desires to reproduce, in a predetermined storage region (clipboard) of the SDRAM 12, as link information (HTML format) for accessing the multimedia contents.

In this example, a storage region in a memory for temporarily storing data which have been copied or cut in Windows (registered trademark) or a Mac OS, is referred to as a "clipboard". When a target character string or image is selected in the operation page and is copied or cut, the target data are held in the clipboard. When a pasting operation is performed, the data, which are held in the predetermined storage unit (clipboard) of the SDRAM 12, appear at a specified position on a page.

The application control unit 76 controls operations of the link information generating function by exchanging control commands and data with the display unit 71, the user operations input unit 72, the file I/F 73, the Web client 74, the link generating unit 75, and the Web page I/F 77.

The Web page I/F 77 lists the windows of the Web browser 33b operating in the client PC (information processing device) 100 and specifies the window including the display page 51 reproducing the video data of the meeting. Furthermore, the Web page I/F 77 acquires, from the Web browser 33b including the specified display page 51, an event sink and control values and setting values of the HTML elements on the page of the display page 51. In the present embodiment, Internet Explorer (registered trademark) is used as the Web browser 33b. Therefore, the window of the Web browser 33b can be identified among windows of other applications, by searching for a window named "IEFrame" with the use of an API provided by Microsoft. Furthermore, it is determined as to whether the video data of the meeting are reproduced in the display page 51 in the identified window of the Web browser 33b by acquiring the character string of the URL specified in the address space of the acquired window of the Web browser 33b. In the present embodiment, DCOM (Distributed Component Object Model) is used to acquire the event sink and the control values and setting values of the HTML elements on the page of Internet Explorer (registered trademark) which is the Web browser 33b.

<Unit for Realizing "Link Information Generating Function" of Client PC>

Next, with reference to FIGS. 15 through 18, a description is given of a unit for realizing the "link information generating function" of the client PC (information processing device) 100 according to the present embodiment described with reference to FIG. 13.

FIG. 15 illustrates an example of a unit for realizing the link information generating function of the client PC (information processing device) 100 according to the first embodiment of the present invention.

To realize the "link information generating function" according to the present embodiment, as shown in FIG. 15, the client PC (information processing device) 100 includes a display unit 81, a selecting unit 82, a setting unit 83, an acquiring unit 84, a generating unit 85, and a storing unit 86.

The display unit 81 displays a page having a GUI function for a user, who is facing the client PC (information processing device) 100, to use the "link information generating function".

Figure 16A:
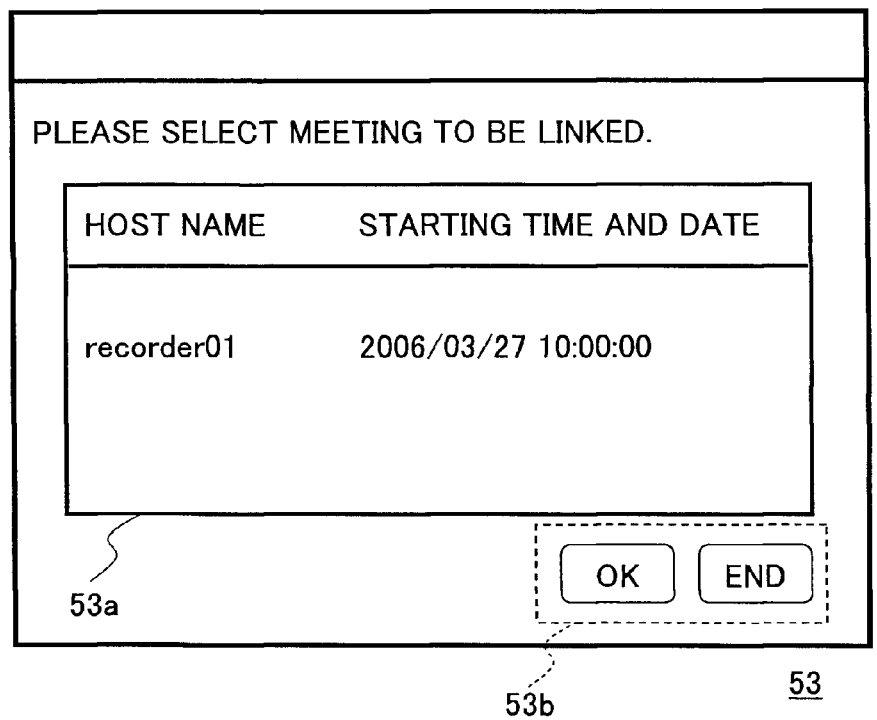
FIG. 16A illustrates an example of a UI page for selecting a currently-being-recorded meeting according to the first embodiment of the present invention.

First, when the "link information generating function" is executed in the client PC (information processing device) 100 according to the present embodiment, the display unit 81 displays a page as shown in FIG. 16A a display device (e.g., CRT, LCD) via the display I/F 16.

FIG. 16A illustrates an example of a UI page 53 according to the first embodiment of the present invention for selecting a currently-being-recorded meeting.

The example of the UI page 53 shown in FIG. 16A is for selecting the meeting for which the user desires to generate link information (the user desires to reproduce later) among currently-being-recorded meetings.

As shown in FIG. 16A, the UI page 53 displays information pertaining to a currently-being-recorded meeting. Specifically, the UI page 53 displays a meeting information displaying region 53a displaying the host name of the recording PC 300 that is recording the meeting and the starting time and date 41b of recording, and selection operation control buttons 53b which function as a UI for controlling selection operations including an [OK] button for entering a selection of a meeting and an [end] button for ending the selection operation (ending the UI page 53).

The display unit 81 acquires meeting information of meetings currently being held from the Web/video server (management server) 200.

The display unit 81 acquires meeting information of the currently-being-held meeting to be displayed in the meeting information displaying region 53a by the following method. That is, the display unit 81 calls a getcurrec servlet of the Web server program 32a included in the Web/video server (management server) 200, and acquires respective meeting information items such as the recording ID 41a and the starting time and date 41b based on information obtained from the response of the getcurrec servlet.

In the present embodiment, the getcurrec servlet is called with the following request message.

[Request to Acquire Meeting Information]
GET/getcurrec HTTP/1.1

As a result, if there is a currently-being-recorded meeting, the following character string is sent from the Web/video server (management server) 200 for each currently-being-recorded meeting.

[Response to Request to Acquire Meeting Information]
When there is a meeting indicated by the recording ID 41a of "1234" being recorded by the recording PC 300 of "recorder01", the following response is given: "host=recorder01&recid=1234&start=2006-03-27T10:00:00"

The meeting information acquired as above is temporarily stored in the SDRAM 12 of the client PC (information processing device) 100.

Figure 16B:
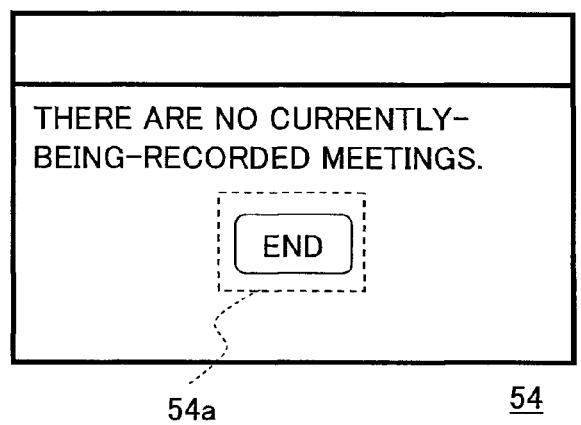
FIG. 16B illustrates an example of a display page when there are no meetings currently being recorded according to the first embodiment of the present invention.

When there are no meetings currently being recorded, the display unit 81 displays a display page 54 as shown in FIG. 16B on a display device (e.g., CRT, LCD) via the display I/F 16.

FIG. 16B illustrates an example of the display page 54 according to the first embodiment of the present invention when there are no meetings currently being recorded.

FIG. 16B illustrates an example of the display page 54 for reporting to the user that there are no currently-being-recorded meetings.

The display unit 81 determines whether there is a currently-recorded meeting by the following method. That is, the display unit 81 calls a getcurrec servlet of the Web server program 32a included in the Web/video server (management server) 200, and makes the determination depending on whether the information obtained from the response is null characters.

As shown in FIG. 16B, the display page 54 displays a message that "there are no meetings currently being recorded" and an [end] button 54a for ending the display page 54. After the user confirms the displayed message, the user presses the [end] button 54a with a pointing device such as a mouse, and ends the display page 54.

In this manner, the display unit 81 displays a page functioning as a UI on a display device (e.g., CRT, LCD) connected to the client PC (information processing device) 100 via the display I/F 16. Therefore, the display unit 81 is included in the display unit 71 shown in FIG. 13.

Referring back to FIG. 15, among the plural video data items (multimedia contents) stored and managed in the HDD 14 included in the Web/video server (management server) 200, the selecting unit 82 selects a video data item which the user desires to reproduce by making a reproduction request to the play servlet of the Web server program 32a, which request is made with the use of link information (video data to be accessed from link information). This selection is made via the UI page 53 shown in FIG. 16A displayed by the display unit 81.

In the selecting unit 82, a meeting is selected with a pointing device such as a mouse among currently-being-recorded meetings listed in the meeting information displaying region 53a of the UI page 53, which selected meeting is to be reproduced by making a reproduction request to the play servlet of the Web server program 32a, which request is made with the use of link information. Furthermore, the [OK] button of the selection operation control buttons 53b is pressed. Accordingly, based on the instruction given by this selection operation, an information item corresponding to the selected meeting is entered from among meeting information items of currently-being-recorded meetings that have been acquired by calling the getcurrec servlet in the display unit 81.

Hence, in the contents management system 1 according to the present embodiment, it is possible to select any contents item that the user desires to reproduce from among plural reproducible video data items (multimedia contents) that are recorded in the Web/video server (management server) 200.

In this manner, the selecting unit 82 realizes an interface for receiving a selection instruction from the user via the input I/F 15. Therefore, the selecting unit 82 is included in the user operations input unit 72 shown in FIG. 13.

Furthermore, in the display unit 81, when the [OK] button of the UI page 53 is pressed, a UI page 55 as shown in FIG. 17 is displayed on a display device (e.g., CRT, LCD) via the display I/F 16.

FIG. 17 illustrates an example of the UI page 55 according to the first embodiment of the present invention for setting information necessary for generating link information.

As shown in FIG. 17, the UI page 55 mainly includes a reproduction starting point information setting region and a content information setting region. The reproduction starting point information region is for setting information on the reproduction starting point of video data which the user desires to reproduce by making a reproduction request to the play servlet, which request is made with the use of link information (video data to be accessed from link information). The content information setting region is for setting the content information that clearly and directly indicates the content of the video data.

In the reproduction starting point information region, a reproduction starting point setting button 55a ([Copy] button shown in FIG. 17) is displayed for setting the reproduction starting point of the video data when a reproduction request is made to the play servlet.

Furthermore, in the content information setting region, a selection/setting space 55b and a setting space 55c are displayed. The selection/setting space 55b is for selecting/setting content information for clearly and directly indicating a scene in the video data that is reproduced by accessing the link information. The setting space 55c is for appropriately setting the vertical and horizontal size (pixels) of the image when the content information is an image.

FIG. 17 illustrates an example where the selection/setting space 55b of the content information setting region includes selection/setting items such as "text (fixed)" for selecting/setting a character string input from a text box as content information, "text (elapsed time)" for selecting/setting, as content information, a character string expressing the elapsed time from when the recording started which is the reproduction starting point of the video data, "image (fixed)" for selecting/setting, as content information, arbitrary image data such as still image data that the user have prepared beforehand, "image (screen)" for selecting/setting, as content information, a screen image to be displayed on a screen by the page displaying PC 400 to which a time stamp is attached which is close to the reproduction starting point of the video data in terms of time, and "image (video frame)" for selecting/setting, as content information, a video frame image corresponding to the reproduction starting point of the video data.

Next, a description is given of a unit for setting content information of the contents via the UI page 55 described with reference to FIG. 17.

Referring back to FIG. 15, the setting unit 83 sets the content information indicating the content of the video data which the user desires to reproduce by making a reproduction request to the play servlet of the Web server program 32a, which request is made with the use of link information. This information is set via the UI page 55 shown in FIG. 17 displayed by the display unit 81.

First, in the setting unit 83, the user selects, with a pointing device such as a mouse, one of the radio buttons corresponding to the selection items of "text (fixed)", "text (elapsed time)", "image (fixed)", "image (screen)", and "image (video frame)" included in the selection/setting space 55b of the content information setting region of the UI page 55. Accordingly, the data format of the information indicating the content of the video data (e.g., text data or image data) is set. At this time, when the text box corresponding to the selected radio button is in the selection/setting space 55b of the content information setting region of the UI page 55, and a character string is input to the text box with a keyboard, the setting unit 83 temporarily stores this character string in the SDRAM 12 of the client PC (information processing device) 100.

The following is a description of the relationship between the selection items of "text (fixed)", "text (elapsed time)", "image (fixed)", "image (screen)", and "image (video frame)" selected by the setting unit 83 and the content information of the contents set in accordance with each selection item.

Text (fixed)

When the radio button of this item is selected, the character string input to the text box (in FIG. 17, "XYZ specification") is set as the content information of the contents.

Text (elapsed time)

When the radio button of this item is selected, the time when the reproduction starting point setting button 55a ([Copy] button shown in FIG. 17) of the reproduction starting point information setting region is pressed by a pointing device such as a mouse, i.e., the determined time of the reproduction starting point of the video data, is set as the content information of the contents.

Image (fixed)

When the radio button of this item is selected, image data specified with a file path input to the text box ("C:¥camera.gif" in FIG. 17) are set as the content information of the contents. By pressing the "reference" button on the right of the text box, it is possible to graphically select the location where image data prepared beforehand by the user are stored.

Image (screen)

When the radio button of this item is selected, a screen image displayed on a screen by the page displaying PC 400 is set as the content information of the contents. Specifically, this screen image has attached a time stamp which is closest, in terms of time, to the time when the reproduction starting point setting button 55*a* ([Copy] button shown in FIG. 17) of the reproduction starting point information setting region is pressed by a pointing device such as a mouse, i.e., the determined time of the reproduction starting point of the video data.

The main body of the image data of the set screen image is acquired by the client PC (information processing device) 100 by sending, to the Web/video server (management server) 200, a request message such as "getscreen?recid=(recording ID 41*a*)&sec=(elapsed time)" for calling a getscreen servlet of the Web server program 32*a*.

Image (Video Frame)

When the radio button of this item is selected, a video frame is set as the content information of the contents. Specifically, this video frame corresponds to the time when the reproduction starting point setting button 55*a* ([Copy] button shown in FIG. 17) of the reproduction starting point information setting region is pressed by a pointing device such as a mouse, i.e., the determined time of the reproduction starting point of the video data.

The main body of the image data of the set video frame image is acquired by the client PC (information processing device) 100 by sending, to the Web/video server (management server) 200, a request message such as "getvideoframe?recid=(recording ID 41*a*)&sec=(elapsed time)" for calling a getvideoframe servlet of the Web server program 32*a* included in the Web/video server (management server) 200.

When image data are set as the content information of the contents, the vertical and horizontal sizes of the set image data are adjusted to be the size values set in the setting space 55*c* for the image size.

As shown in FIG. 17, in the setting space 55*c* of the image size, it is possible to select "original size" which is for leaving the image at its original size, or set the vertical and horizontal values of the image size (W×H pixel) with "horizontal size (H)" and "vertical size (W)".

The setting unit 83 temporarily stores content information of the contents such as the text data and image data that have been selected and set via the UI page 55 in the SDRAM 12 of the client PC (information processing device) 100.

In this manner, the setting unit 83 realizes an interface for receiving a selection/setting instruction from the user via the input I/F 15. Therefore, the setting unit 83 is included in the user operations input unit 72 shown in FIG. 13.

Referring back to FIG. 15, the acquiring unit 84 acquires reproduction starting point information indicating the reproduction starting point of the video data which the user desires to reproduce by making a reproduction request to the play servlet of the Web server program 32*a* included in the Web/video server (management server) 200, which request is made with the use of link information.

The acquiring unit 84 acquires reproduction starting point information of the video data selected with the selecting unit 82, which the user desires to reproduce by making a reproduction request to the play servlet of the Web server program 32*a* included in the Web/video server (management server) 200, which request is made with the use of link information. This information is acquired at the timing when the reproduction starting point setting button 55*a* ([Copy] button shown in FIG. 17) of the reproduction starting point information setting region in the UI page 55 shown in FIG. 17 is pressed by a pointing device such as a mouse.

For example, while the user is viewing a currently-being-recorded meeting, which has been selected with the selecting unit 82, on the display page 51 of the Web browser 33*b*, and the user comes across a scene which the user desires to reproduce later, the user presses, with a pointing device such as a mouse, the reproduction starting point setting button 55*a* ([Copy] button shown in FIG. 17) of the UI page 55, to instruct the acquiring unit 84 to acquire the reproduction starting point.

According to the instruction from the user to acquire the reproduction starting point, the acquiring unit 84 acquires the reproduction starting point information from the Web/video server (management server) 200.

The acquiring unit 84 acquires the reproduction starting point information by the following method. That is, the acquiring unit 84 calls the getelapsedtime servlet of the Web server program 32*a*, and acquires the reproduction starting point information such as the elapsed time (sec) from when recording of the meeting started based on the information obtained from the response.

In the present embodiment, the getelapsedtime servlet is called with the following request message.

[Request to Acquire Reproduction Starting Point Information]
GET/getelapsedtime?recid=1234 HTTP/1.1

As a result, the following character string indicating the elapsed time (sec) from when the recording started for the meeting identified with the recording ID 41*a* is sent from the Web/video server (management server) 200.

[Response to Request to Acquire Reproduction Starting Point Information]
When the elapsed time (sec) from when recording started is 10 minutes, the following response is given:
"set=600"

The reproduction starting point information acquired as above is temporarily stored in the SDRAM 12 of the client PC (information processing device) 100.

As described above, the acquiring unit 84 realizes a function of sending a process request to the Web server program 32*a* included in the Web/video server (management server) 200 via the network I/F 17 and receiving a response to the request from the Web server program 32*a*. Therefore, the acquiring unit 84 is included in the Web client 74 shown in FIG. 13.

Referring back to FIG. 15, the generating unit 85 generates link information (link information for later accessing video data of a recorded meeting) for making a reproduction request to the play servlet of the Web server program 32*a* included in the Web/video server (management server) 200 to reproduce the meeting selected with the selecting unit 82.

The generating unit 85 collects data necessary for forming the link information in a pre-process of generating the link information.

The generating unit 85 acquires information regarding the storage destination of the video data that are the target of the reproduction request, i.e., information regarding the destination to which the video data are supplied when a reproduction request is made.

The generating unit 85 temporarily stores, in the SDRAM 12 of the client PC (information processing device) 100, information regarding the destination (Web/video server (management server) 200) of supplying the video data obtained by recording the meeting selected with the selecting unit 82, based on the setting file 42 shown in FIG. 14 which is stored in the HDD 14 of the client PC (information processing device) 100 via the file I/F 73.

Taking as an example the setting file 42 shown in FIG. 14, the information indicating the storage destination is "http://videoserver.abc.com", which information is acquired by the generating unit 85 and temporarily stored in the SDRAM 12 of the client PC (information processing device) 100.

Next, the generating unit 85 attaches, to the information regarding the storage destination of the acquired video data, the name of the servlet to perform a reproduction process among the group of servlets of the Web server program 32a, the recording ID 41a acquired by the display unit 81, and the reproduction starting point information of the video data acquired by the acquiring unit 84. Accordingly, link information is generated, which is used for making a reproduction request to the play servlet of the Web server program 32a.

For example, when the servlet name of the Web server program 32a is "play", and the group of information items temporarily stored in the SDRAM 12 includes "http://videoserver.abc.com" which is the storage destination of the video data, "recid=1234" which is the recording ID 41a, and "sec=600" which is the reproduction starting point information, the following link information is generated.
[Generated Link Information]
http://videoserver.abc.com/play?recid=1234&sec=600

In this manner, the generating unit 85 realizes a function of generating link information. Therefore, the generating unit 85 is included in the link generating unit 75 shown in FIG. 13.

Accordingly, the contents management system 1 according to an embodiment of the present invention is capable of reproducing audio/video data from a reproduction starting point desired (instructed) by the user when the multimedia contents are accessed from link information.

Referring back to FIG. 15, the storing unit 86 associates the content information of the contents set by the setting unit 83 with the link information generated by the generating unit 85, and stores them in a predetermined storage region of the SDRAM 12 of the client PC (information processing device) 100.

A storage region in a memory such as a clipboard for temporarily storing information is referred to as the "predetermined storage region". Specifically, when document data are edited with a document creating application including copy/cut/paste functions, and an operation of pasting information is performed, the information to be pasted to the document data is temporarily stored. That is, information that has been temporarily extracted by a copy or cut operation is held in this region.

The storing unit 86 stores the following information in a predetermined storage region (clipboard) of the SDRAM 12 as clipboard data 43 (CF_HTML data) in the HTML format as shown in FIGS. 18A and 18B. That is, the storing unit 86 stores link information generated by the generating unit 85 and content information indicating the content of the video data (video data accessed with link information) which the user desires to reproduce by making a reproduction request to the play servlet of the Web server program 32a included in the Web/video server (management server) 200, which request is made with the use of link information. Accordingly, the storing unit 86 associates the link information with the content information of the contents.

FIGS. 18A and 18B illustrate examples of data configurations of the clipboard data 43 according to the first embodiment of the present invention.

FIG. 18A illustrates an example of association data 43a in which information regarding the elapsed time (sec) from when recording of the meeting started, is serving as the content information of the contents associated with link information. FIG. 18B illustrates an example of association data 43b in which a screen image displayed in a screen by the page displaying PC 400 during a meeting, is serving as the content information of the contents associated with link information.

As shown in FIGS. 18A and 18B, the storing unit 86 can associate the link information with the content information of the contents by using a HTML tag for establishing a link as shown below.
[Description of Tag for Establishing Link (in the Case of Text Data)]
<a href=(link information)>(text data indicating content of contents)</a>
[Description of Tag for Establishing Link (in the Case of Image Data)]
<a href=(link information)>
   <img width=W height=H src=(storage destination information of image data indicating content of contents)
</a>

When the storing unit 86 stores, in the SDRAM 12, the clipboard data 43 as shown in FIGS. 18A and 18B associating the link information with the content information of the contents, the storing unit 86 also stores text data and image data which are content information of the contents set by the setting unit 83.

Furthermore, when the storing unit 86 stores the clipboard data 43 in the SDRAM 12 for associating the link information with the content information of the contents, the clipboard data 43 are stored in an appropriate data format other than a HTML format, such as a text format (CF_TEXT) or a bitmap format (CF_BITMAP) in accordance with the data format of the document onto which it is to be pasted later on.

In this manner, the storing unit 86 realizes a function of storing the generated link information in a predetermined storage region in the SDRAM 12 of the client PC (information processing device) 100. Therefore, the storing unit 86 is included in the application control unit 76 shown in FIG. 13.

Accordingly, in the contents management system 1 according to an embodiment of the present invention, the clipboard data 43 are pasted onto document data being edited by a document creating application. Therefore, information requesting reproduction of multimedia contents can be embedded in the document in such a manner as to clearly and directly indicate the content of the contents without changing the document layout. This is more advantageous compared to the case of simply pasting information for requesting reproduction of multimedia contents (i.e., simply pasting the character string of a URL).

The contents management system 1 according to the present embodiment executes each unit of the client PC (information processing device) 100 described above according to the following procedures.

(Procedure 1) Acquire Reproduction Starting Point Information

In the client PC (information processing device) 100 according to the present embodiment, the acquiring unit 84 acquires reproduction starting point information of video data selected with the selecting unit 82 which the user desires to reproduce by making a reproduction request to the play servlet for performing a reproduction process of the of the Web server program 32a included in the Web/video server (management server) 200, which request is made with the use of link information. Specifically, the acquiring unit 84 acquires this information at a timing when a pointing device such as a mouse presses the reproduction starting point setting button

55a ([Copy] button shown in FIG. 17) of the reproduction starting point information setting region of the UI page 55 shown in FIG. 17.

(Procedure 2) Generation of Link Information

In the client PC (information processing device) 100 according to the present embodiment, the generating unit 85 acquires the storage destination of the video data that are the target of the reproduction request, i.e., information regarding the destination to which the video data are supplied when a reproduction request is made.

Next, in the client PC (information processing device) 100, the generating unit 85 attaches, to the information regarding the storage destination of the acquired video data, the name of the servlet to perform a reproduction process among the group of servlets of the Web server program 32a included in the Web/video server (management server) 200, the recording ID 41a acquired by the display unit 81, and the reproduction starting point information of the video data acquired by the acquiring unit 84. Accordingly, link information is generated, which is used for making a reproduction request to the play servlet that performs the reproduction process of the Web server program 32a.

(Procedure 3) Store in Memory

In the client PC (information processing device) 100 according to the present embodiment, the storing unit 86 stores, in a predetermined storage region (clipboard) of the SDRAM 12, the link information generated by the generating unit 85 and content information indicating the content of the video data for which the user desires to make a reproduction request (video data accessed from link information), as the clipboard data 43 (CF_HTML data) in the HTML format.

The client PC (information processing device) 100 according to the present embodiment sets, via the UI page 55 as shown in FIG. 17, the content information indicating the content of the video data for which a reproduction request is given to a servlet that performs the reproduction process of the Web server program 32a included in the Web/video server (management server) 200. The client PC (information processing device) 100 temporarily stores the clipboard data 43 in which the set content information of the contents is associated with the link information for making the reproduction request, in a predetermined storage region (clipboard) in the SDRAM 12. Accordingly, the link information for making a request to reproduce the video data can be easily pasted onto document data that are being edited with a document creating application which a user uses on a daily basis. Thus, the document data and the multimedia contents can be conveniently associated with each other.

By performing the above-described procedures (1) through (3) of the "link information generating function" of the client PC (information processing device) 100, the contents management system 1 according to the present embodiment realizes the function of "efficiently using multimedia contents from document data that are viewed/edited by the user on a daily basis".

<Processing Procedures of "Link Information Generating Function" of Client PC>

The above-described processing procedures of the "link information generating function" of the client PC (information processing device) 100 are described with reference to FIGS. 19 through 21.

FIG. 19 is a flowchart of an example (performed while a meeting is being held) of processing procedures of the link information generating function (function realized by link information generating program 33a) of the client PC (information processing device) 100 according to the first embodiment of the present invention.

The client PC (information processing device) 100 according to the present embodiment loads, in a memory which is the SDRAM 12, the link information generating program 33a for performing the process of the "link information generating function" stored in the HDD 14, and executes it with the CPU 11. At this time, the following processing procedures of steps S201 through S212 are executed.

The client PC (information processing device) 100 according to the present embodiment acquires information regarding a presently-being-recorded meeting from the Web/video server (management server) 200 (step S201).

In the client PC (information processing device) 100, according to a command from the application control unit 76, the Web client 74 calls the getcurrec servlet of the Web server program 32a included in the Web/video server (management server) 200, to acquire information regarding a currently-being-recorded meeting.

At this time, in the client PC (information processing device) 100, the application control unit 76 reads a value of a key (e.g., "sWebServerPath") of the setting file 42 shown in FIG. 14 stored in the HDD 14 via the file I/F 73. Accordingly, the application control unit 76 acquires a host name (e.g., "videoserver.abc.com") of the Web server program 32a from which the getcurrec servlet is to be called, and passes the acquired host name to the Web client 74.

In the client PC (information processing device) 100, based on the host message passed from the application control unit 76, the Web client 74 sends a request message such as "GET/ getcurrec HTTP/1.1" to the Web server program 32a included in the Web/video server (management server) 200.

As a result, when a meeting indicated by the recording ID 41a "1234" recorded by the recording PC 300 "recorder01" is ongoing since Mar. 27, 2006, 10:00:00, the getcurrec servlet returns a character string such as "host=recorder01&recid=1234&start=2006-03-27T10:00: 00" as the response to the request to the Web client 74 which is the calling source.

The client PC (information processing device) 100 determines whether there is a currently-being-recorded meeting based on the information of the response from the getcurrec servlet of the Web server program 32a included in the Web/ video server (management server) 200 (step S202).

In a case where the above meeting information is received as a response from the getcurrec servlet (Yes in step S202), the Web client 74 receives information of a currently-being-recorded meeting. Then, according to a command from the application control unit 76, the display unit 71 displays the UI page 53 for selecting a currently-being-recorded meeting as shown in FIG. 16A on a display device (e.g., CRT, LCD) (step S203).

In a case where null characters are received as a response from the getcurrec servlet (No in step S202), according to a command from the application control unit 76, the display unit 71 displays the display page 54 for reporting that "there are no meetings currently being recorded" as shown in FIG. 16B on a display device (e.g., CRT, LCD) (step S204).

The client PC (information processing device) 100 determines, with the user operations input unit 72, whether the [OK] button or the [end] button which are the selection operation control buttons 53b of the UI page 53 shown in FIG. 16A has been pressed by a pointing device such as a mouse (step S205).

When the user operations input unit 72 detects that the [end] button has been pressed ("[end] button" in step S205), the detection result is passed from the user operations input unit 72 to the application control unit 76, and the application control unit 76 ends the link information generating process.

When the user operations input unit 72 detects that the [OK] button has been pressed ("[OK] button" in step S205), the detection result is passed from the user operations input unit 72 to the application control unit 76, and the application control unit 76 temporarily stores, in the SDRAM 12, the recording ID 41a and the starting time and date 41b of the meeting selected by the user.

In the client PC (information processing device) 100, according to a command from the application control unit 76, the display unit 71 displays the UI page 55 including the reproduction starting point information setting region and the content information setting region as shown in FIG. 17 on a display device (e.g., CRT, LCD) (step S206).

The client PC (information processing device) 100 determines, with the user operations input unit 72, whether the force termination button of the UI page 55 shown in FIG. 17 ([x] button shown in FIG. 17) has been pressed by a pointing device such as a mouse (step S207).

When the user operations input unit 72 detects that the force termination button ([x] button shown in FIG. 17) has been pressed (Yes in step S207), the detection result is passed from the user operations input unit 72 to the application control unit 76, and the application control unit 76 ends the information generating process.

When the user operations input unit 72 has not yet detected that the force termination button ([x] button shown in FIG. 17) has been pressed (No in step S207), the user operations input unit 72 receives, via the selection/setting space 55b of the content information setting region for selecting/setting content information, content information for indicating the content of the video data of the meeting selected by the user, which content information is selected/set with the use of a pointing device such as a mouse and a keyboard. The user operations input unit 72 passes the received content information of the contents to the application control unit 76, and the application control unit 76 temporarily stores the content information in the SDRAM 12.

Next, the client PC (information processing device) 100 determines, with the user operations input unit 72, whether the reproduction starting point setting button 55a of the UI page 55 shown in FIG. 17 ([Copy] button shown in FIG. 17) has been pressed by a pointing device such as a mouse (step S208).

When the user operations input unit 72 has not yet detected that the reproduction starting point setting button 55a ([Copy] button shown in FIG. 17) has been pressed (No in step S208), the process control returns to step S207, and the user operations input unit 72 waits until it detects that the reproduction starting point setting button 55a ([Copy] button shown in FIG. 17) has been pressed. Thus, during this time, it is possible to select/set/change, via the UI page 55, the information indicating the content of the video data of the meeting selected by the user.

When the client PC (information processing device) 100 detects, with the user operations input unit 72, that the reproduction starting point setting button 55a ([Copy] button shown in FIG. 17) has been pressed (Yes in step S208), according to a command from the application control unit 76 that has received the detection result from the user operations input unit 72, the Web client 74 calls a getelapsedtime servlet of the Web server program 32a included in the Web/video server (management server) 200. Accordingly, the Web client 74 acquires the elapsed time from when recording has started for the meeting selected by the user, which meeting corresponds to the recording ID 41a that has been temporarily stored in the SDRAM 12 in step S205.

The client PC (information processing device) 100 sends, with the Web client 74, a request message such as "GET/ getelapsedtime?recid=1234 HTTP/1.1" to the Web server program 32a included in the Web/video server (management server) 200 based on the recording ID 41a temporarily stored in the SDRAM 12.

As a result, for example, when the time and date of calling the getelapsedtime servlet is Mar. 27, 2006, 10:10:00, the getelapsedtime servlet returns a character string such as "sec=600" as a response to the request to the Web client 74 which is the calling source.

At this time, the client PC (information processing device) 100 determines whether the meeting selected by the user is currently being recorded based on the information of the response from the getelapsedtime servlet of the Web server program 32a included in the Web/video server (management server) 200 (step S209).

When the above elapsed time information is received as a response from the getelapsedtime servlet (Yes in step S209), the Web client 74 receives the elapsed time information, and the link generating unit 75 performs the following procedure according to a command from the application control unit 76. That is, the link generating unit 75 attaches the following information to the information regarding the storage destination read in step S201 (e.g., "http://videoserver.abc.com") of the recorded video data of the meeting. Specifically, the name of the servlet (e.g., "play") for performing a reproduction process among the group of servlets in the Web server program 32a, the recording ID 41a acquired in step S205, and elapsed time information which is the reproduction starting point information of the video data acquired in step S208, are attached. Then, the link generating unit 75 generates link information for making a reproduction request to the servlet for performing the reproduction process of the Web server program 32a included in the Web/video server (management server) 200, and passes the generated link information to the application control unit 76 (step S210).

In the client PC (information processing device) 100, the application control unit 76 generates the clipboard data 43 in a HTML clipboard format (CF_HTML). Specifically, the clipboard data 43 associates the link information received from the link generating unit 75 with content information of the contents such as text data or image data set via the selection/setting space 55b and/or the setting space 55c of the content information setting region in the UI page 55 shown in FIG. 17. Then, the application control unit 76 stores the clipboard data 43 in a predetermined storage region (clipboard) of the SDRAM 12 (step S212). The process control returns to step S207, and the processing procedures of the link information generating process from step S207 onward are repeated.

Figure 20:
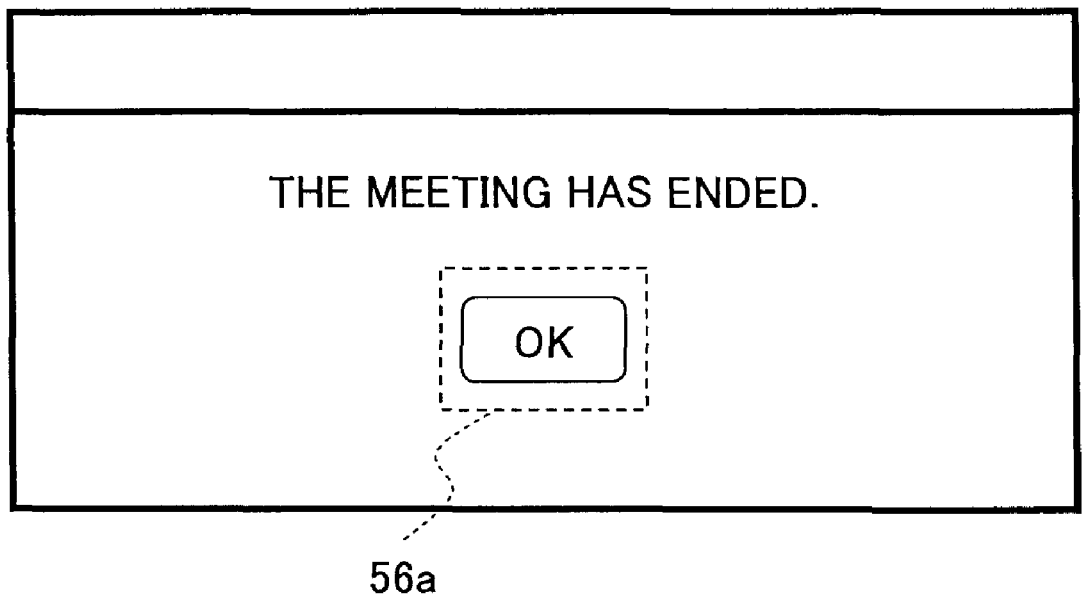
FIG. 20 illustrates an example of a display page displayed when a meeting has ended.

When null characters are returned from the getelapsedtime servlet (No in step S209), according to a command from the application control unit 76, the display unit 71 displays a display page 56 for reporting that "the meeting has ended" as shown in FIG. 20 on a display device (e.g., CRT, LCD) (step S211).

FIG. 20 illustrates an example of the display page 56 displayed when a meeting has ended.

In the client PC (information processing device) 100, when the user confirms the contents displayed in the display page 56 shown in FIG. 20, and presses an [OK] button 56a of the display page 56 with a pointing device such as a mouse, the process control returns to step S207, and the processing procedures of the link information generating process from step S207 onward are repeated.

In this manner, by performing the processing procedures of steps S201 through S212 shown in FIG. 19, the client PC (information processing device) 100 according to the present embodiment generates link information for accessing multimedia contents such as audio/video data managed as recording data. This link information is generated based on reproduction starting point information indicating the reproduction starting point of the multimedia contents specified by the user (e.g., the elapsed time and the number of frames from when recording started). When performing an operation of pasting the generated link information onto document data edited with a document creating application used by the user on a daily basis, the link information is first stored in a predetermined region (clipboard) of a memory for temporarily storing information to be pasted onto document data.

<Operation of Pasting Link Information onto Document Data>

Figure 21:
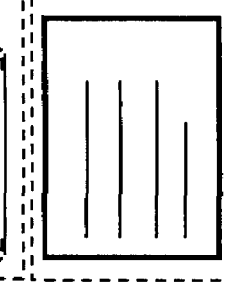
FIG. 21 is an example of document data displayed when link information according to the first embodiment of the present invention is pasted.

With reference to FIG. 21, a description is given of operations performed with the "link information generating function" of the client PC (information processing device) 100 according to the present embodiment. Specifically, the operation of pasting link information stored in a predetermined storage region (clipboard) of the SDRAM 12 onto document data being edited with a document creating application used by the user on a daily basis, and the operation of displaying the display page (reproduction page) 51 for reproducing video data from the pasted link information are described.

FIG. 21 is an example of document data 61 displayed when pasting link information according to the first embodiment of the present invention.

The client PC (information processing device) 100 according to the present embodiment includes a document creating application provided with a document editing function to copy/cut/paste information, such as a text editor, a word processor, or e-mail, which is used by the user on a daily basis.

In such an application, when the user is editing the document data 61, and the link information generating program 33a according to the present embodiment is started up, the link information of the multimedia contents which the user desires to reproduce later is stored in a predetermined recording region (clipboard) of the SDRAM 12. While the document data 61 are being edited, the "paste" function of "edit" is selected from a menu of the document creating application or the Ctrl+V keys are pressed on the keyboard. Accordingly, the link information can be easily pasted onto the document data 61, as shown in FIG. 21.

The elapsed time information in the third row and the screen image in the fourth row of FIG. 21 are obtained by pasting the clipboard data 43 shown in FIGS. 18A and 18B onto the document data 61.

Thus, the following link information is associated with the text of the elapsed time information, which is the content information of the contents, in the third row. http://videoserver.abc.com/play?recid=1234&sec=600 Furthermore, the following link information is associated with the screen image in the fourth row.fs http://videoserver.abc.com/play?recid=1234&sec=1200

As a result, when "[00:10:00]" in the document data 61 is clicked with a mouse, the reproduction page 51 for reproducing the video data of the meeting shown in FIG. 9 is displayed on a display device (e.g., CRT, LCD), and video data of a meeting indicated by the recording ID 41a "1234" are reproduced from a reproduction starting point at which 10 minutes (600 seconds) has elapsed since recording of the meeting has started.

<Usage Example of Contents Management System (when Reproducing Video Data of Meeting that has been Held in the Past)>

In the above description, in the contents management system 1 according to the present embodiment, a currently-being-held meeting is viewed. In the following, a description is given with reference to FIG. 22 of an operation performed in the contents management system 1 for reproducing video data of a meeting held in the past.

FIG. 22 illustrates a case of reproducing video data of a meeting held in the past with the contents management system 1 according to the first embodiment of the present invention.

The contents management system 1 according to the present embodiment is used as described in (1) through (3) in a user environment in the case of reproducing video data of a meeting held in the past.

(1) Copy Link Information

First, the user starts up the reproduction page 51 for reproducing the video of the meeting and the link information generating program 33a in the client PC (information processing device) 100 owned by the user. The user reproduces the video data of the meeting that has been held in the past with the reproduction page 51. While reproducing the video, when the user comes across a "scene to be reviewed later", the user clicks the [Copy] button of the link information generating program 33a which has been started up, with a mouse. Then, a URL to the reproduction page 51 of the video data of the meeting having the time of the scene as a parameter, and information that clearly and directly indicates the scene (content information of contents) are copied (temporarily stored) as link information in a predetermined region (clipboard) in a memory included in the client PC (information processing device) 100.

(2) Paste Link Information

Next, the link information, which has been copied (temporarily stored) in a predetermined region (clipboard) in the memory, is pasted onto a document that is being created/edited with the use of an application or a system that is frequently used by the user on a daily basis such as Microsoft Office (registered trademark), CMS, and text editor.

(3) Click Link

As a result, by clicking the link information pasted onto the document, the reproduction page 51 for reproducing the video data obtained by recording the meeting is automatically started up, and the video data of the meeting are reproduced starting from the time when the [Copy] button was clicked in (1).

In this manner, in the contents management system 1 according to the present embodiment, the user pastes the link information of the multimedia contents including reproduction start point information onto document data which are edited by the user. Accordingly, the document data and the multimedia contents can be easily associated with each other, thereby realizing a "contents management function" in which the user can efficiently utilize multimedia contents from document data that are viewed/edited by the user on a daily basis.

<Processing Procedures of "Link Information Generating Function" of Client PC>

Next, with reference to FIGS. 23 through 26, a description is given of processing procedures of the "link information generating function" of the client PC (information processing device) 100 according to the present embodiment when "reproducing video data of a meeting that has been held in the past".

Figure 23:
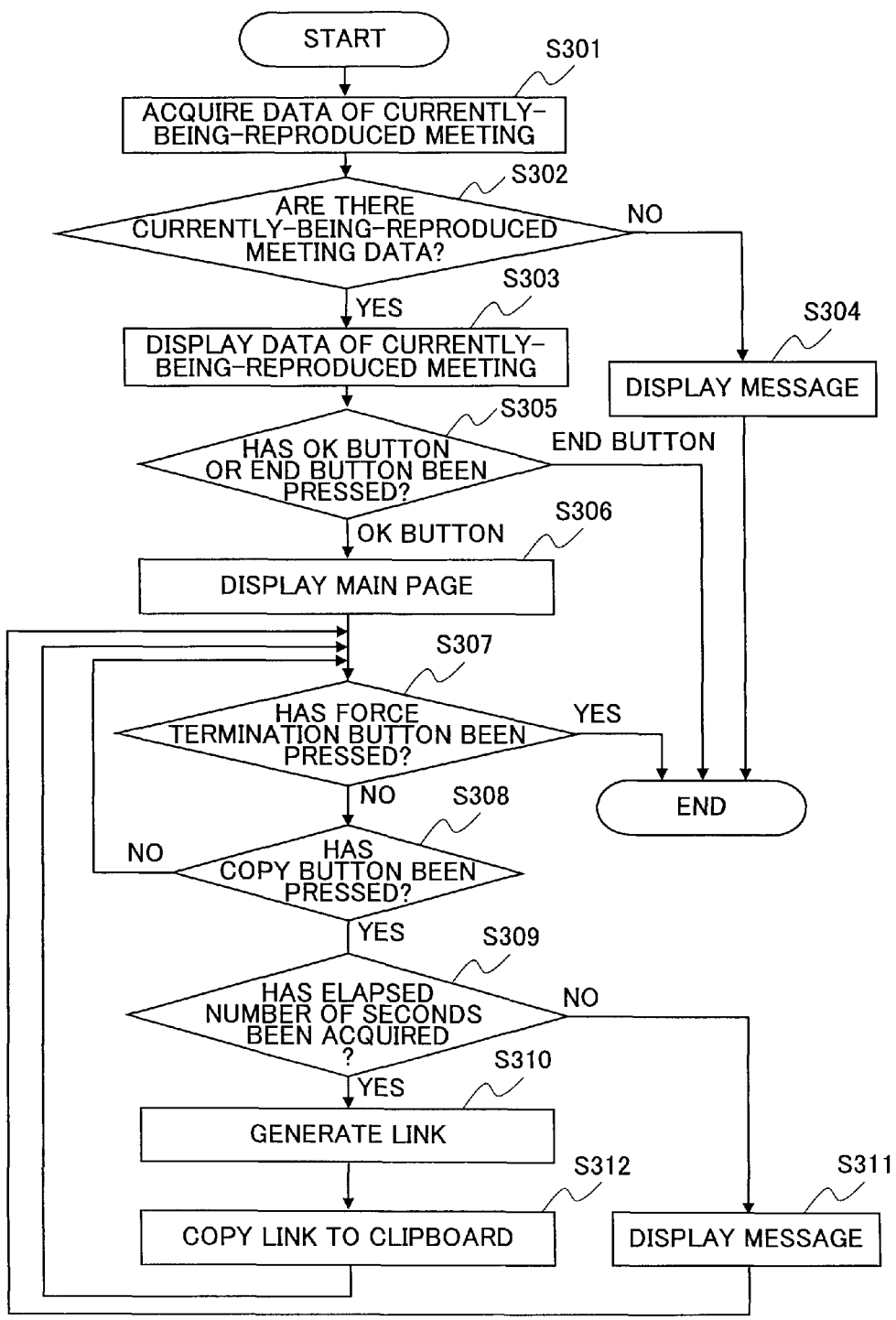
FIG. 23 is a flowchart of an example (of a case of reproducing video data of a meeting that has been held in the past) of processing procedures of a link information generating function (function realized by the link information generating program) of the client PC (information processing device) according to the first embodiment of the present invention.

FIG. 23 is a flowchart of an example (of a case of reproducing video data of a meeting that has been held in the past) of processing procedures of a link information generating function (function realized by the link information generating program 33a) of the client PC (information processing device) 100 according to the first embodiment of the present invention.

For example, the client PC (information processing device) 100 according to the present embodiment loads, in a memory which is the SDRAM 12, the link information generating program 33a for performing the process of the "link information generating function" stored in the HDD 14, and executes the link information generating program 33a with the CPU 11. At this time, the following processing procedures of steps S301 through S312 are executed.

The client PC (information processing device) 100 according to the present embodiment acquires, from the Web/video server (management server) 200, information pertaining to video data of a presently-being-reproduced meeting (step S301).

In the client PC (information processing device) 100, according to a command from the application control unit 76, the Web page I/F 77 identifies the Internet Explorer (registered trademark) currently being activated in the client PC (information processing device) 100 with the use of an API of Microsoft based on a window name called "IEFrame". Then, from the specified Internet Explorer (registered trademark), the Web page I/F 77 finds the display page 51 in which the video data of the meeting are reproduced based on a URL specified in the address space. Accordingly, the Web page I/F 77 acquires information pertaining to video data of the currently-being-reproduced meeting. The event sink of Internet Explorer (registered trademark) and the control values and setting values of the HTML elements are acquired at this stage with the use of DCOM.

The client PC (information processing device) 100 determines whether there are any currently-being-reproduced video data based on the information pertaining to the currently-being-reproduced video data of the meeting acquired by the above method (step S302).

Figure 24A:
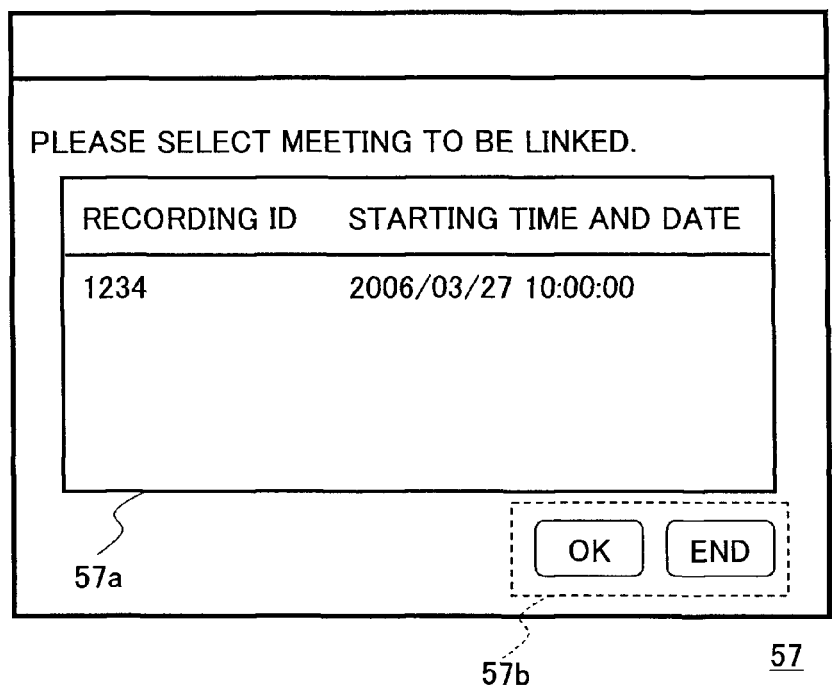
FIG. 24A illustrates an example of a UI page according to the first embodiment of the present invention for selecting video data of a meeting that has been held in the past.

When information pertaining to the currently-being-reproduced video data of the meeting has been acquired (Yes in step S302), the Web page I/F 77 receives the information of the currently-being-reproduced video data, and according to a command from the application control unit 76, the display unit 71 displays, on a display device (e.g., CRT, LCD), a UI page 57 for selecting currently-being-reproduced video data of a meeting that has been held in the past, as shown in FIG. 24A (step S303).

FIG. 24A illustrates an example of the UI page 57 according to the first embodiment of the present invention for selecting video data of a meeting that has been held in the past.

FIG. 24A illustrates an example of the UI page 57 in a case of selecting a meeting for which the user desires to generate link information (which the user desires to reproduce later) from among the meetings that are currently being reproduced.

As shown in FIG. 24A, the UI page 57 displays, as information pertaining to the currently-being-reproduced video data, a video data information display region 57a for displaying the recording ID 41a and the starting time and date 41b for identifying video data of a meeting that has been recorded, and selection operation control buttons 57b which function as a UI for controlling selection operations, including an [OK] button for entering a selection of a meeting and an [end] button for ending the selection operation (ending the UI page 57).

Figure 24B:
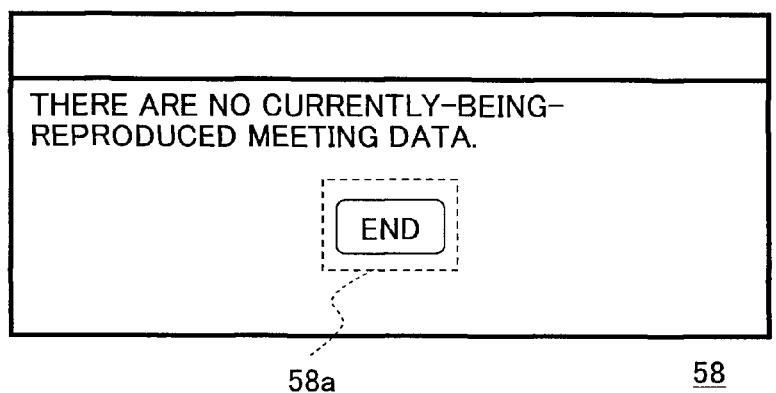
FIG. 24B illustrates an example of a display page according to the first embodiment of the present invention when there are no reproducible video data of meetings.

When information pertaining to currently-being-reproduced video data of a meeting has not been acquired (No in step S302), according to a command from the application control unit 76, the display unit 71 displays, on a display device (e.g., CRT, LCD), a display page 58 as shown in FIG. 24B, reporting that "there are no meeting data currently being reproduced" (step S304).

FIG. 24B illustrates an example of the display page 58 according to the first embodiment of the present invention when there are no reproducible video data of meetings.

FIG. 24B illustrates an example of the display page 58 for reporting to the user that there are no currently-being-reproduced meetings.

As shown in FIG. 24B, the display page 58 displays a message that "there are no meeting data currently being reproduced" and an [end] button 58a for ending the display page 58. After the user confirms the displayed message, the user presses the [end] button 58a with a pointing device such as a mouse, and ends the display page 58.

The client PC (information processing device) 100 determines, with the user operations input unit 72, whether the [OK] button or the [end] button which are the selection operation control buttons 57b of the UI page 57 shown in FIG. 24A has been pressed by a pointing device such as a mouse (step S305).

When the user operations input unit 72 detects that the [end] button has been pressed ("[end] button" in step S305), the detection result is passed from the user operations input unit 72 to the application control unit 76, and the application control unit 76 ends the link information generating process.

When the user operations input unit 72 detects that the [OK] button has been pressed ("[OK] button" in step S305), the detection result is passed from the user operations input unit 72 to the application control unit 76, and according to a command from the application control unit 76, the Web page I/F 77 starts the event sink and control operations of the reproduction page 51 for reproducing the video data of the meeting selected by the user.

Next, in the client PC (information processing device) 100, according to a command from the application control unit 76, the display unit 71 displays, on a display device (e.g., CRT, LCD), the UI page 55 having the reproduction starting point information setting region and the content information setting region as shown in FIG. 17 (step S306).

The client PC (information processing device) 100 determines, with the user operations input unit 72, whether the force termination button (the [x] button in FIG. 17) in the UI page 55 shown in FIG. 17 has been pressed with a pointing device such as a mouse (step S307).

When the user operations input unit 72 detects that the force termination button (the [x] button in FIG. 17) has been pressed (Yes in step S307), the user operations input unit 72 passes the detection result to the application control unit 76, and the application control unit 76 ends the link information generating process.

When the user operations input unit 72 has not yet detected that the force termination button (the [x] button in FIG. 17) has been pressed (No in step S307), the user operations input unit 72 receives, via the selection/setting space 55b of the content information setting region for selecting/setting content information, content information for indicating the content of the video data of the meeting selected by the user, which content information is selected/set with the use of a pointing device such as a mouse and a keyboard. The received content information of the contents is passed to the application control unit 76, and the application control unit 76 temporarily stores the content information in the SDRAM 12.

Next, the client PC (information processing device) 100 determines, with the user operations input unit 72, whether the reproduction starting point setting button 55a ([Copy] button shown in FIG. 17) of the UI page 55 shown in FIG. 17 has been pressed by a pointing device such as a mouse (step S308).

When the user operations input unit 72 has not yet detected that the reproduction starting point setting button 55a ([Copy] button shown in FIG. 17) has been pressed (No in step S308), the process control returns to step S307, and the user operations input unit 72 waits until it detects that the reproduction starting point setting button 55a ([Copy] button shown in FIG. 17) has been pressed. Thus, during this time, it is possible to select/set/change, via the UI page 55, the information indicating the content of the video data of the meeting selected by the user.

When the client PC (information processing device) 100 detects, with the user operations input unit 72, that the reproduction starting point setting button 55a ([Copy] button shown in FIG. 17) has been pressed (Yes in step S308), the Web page I/F 77 performs the following. That is, according to a command from the application control unit 76 that has received the detection result from the user operations input unit 72, the Web page I/F 77 acquires, from the display page 51 reproducing the video data for which the event sink and the control operation are executed, the elapsed time from when recording started for the meeting of the recording ID 41a selected by the user.

The client PC (information processing device) 100 acquires, with the Web page I/F 77, the currently-being-reproduced position of the video reproduction program 33c operating in the video data reproduction page 51, by using DCOM.

The client PC (information processing device) 100 determines whether the video data of the meeting selected by the user is still being reproduced, based on the elapsed time information acquired by the Web page I/F 77 (step S309).

When the Web page I/F 77 has acquired the elapsed time information by the above method (Yes in step S309), according to a command from the application control unit 76, the link generating unit 75 attaches the following information to the information (e.g., "http://videoserver.abc.com") pertaining to the storage destination of video data of a currently-reproduced meeting read in step S301. Specifically, the name of the servlet (e.g., "play") for performing a reproduction process among a group of servlets of the Web server program 32a, the recording ID 41a acquired in step S301, and the elapsed time information which is reproduction starting point information of the video data acquired in step S308, are attached. Furthermore, the link generating unit 75 generates link information for making a reproduction request to the servlet for performing the reproduction process of the Web server program 32a, and passes the generated link information to the application control unit 76 (step S310).

In the client PC (information processing device) 100, in accordance with a HTML clipboard format (CF_HTML), the application control unit 76 generates the clipboard data 43. Specifically, in the clipboard data 43, the link information received from the link generating unit 75 is associated with content information indicating the content of the contents, which content information corresponds to text data or image data set with the selection/setting space 55b and the setting space 55c of the content information setting region of the UI page 55 shown in FIG. 17. Then, the application control unit 76 stores the clipboard data 43 in a predetermined storage region (clipboard) of the SDRAM 12 (step S312). The process control returns to step S307, and the processing procedures of the link information generating process from step S307 onward are repeated.

Figure 25:
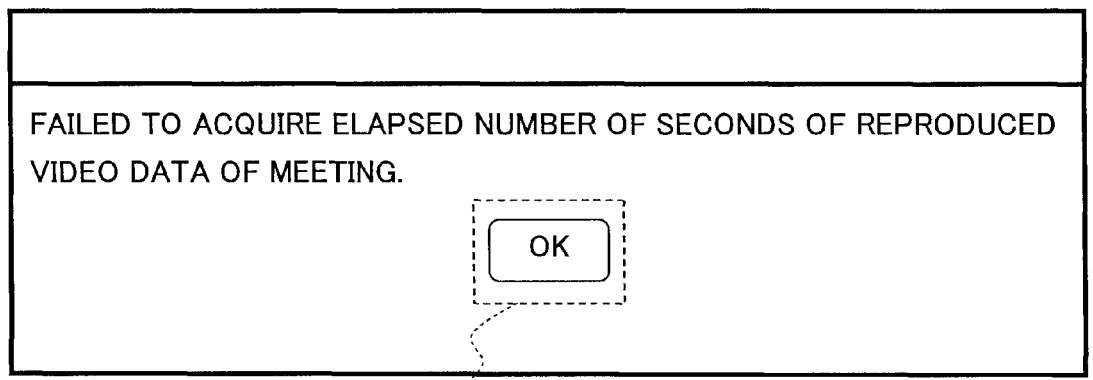
FIG. 25 illustrates an example of a display page according to the first embodiment of the present invention in a case where the client PC (information processing device) has failed to acquire the reproduction starting point information.

When the Web page I/F 77 has not acquired the elapsed time information by the above method (No in step S309), according to a command from the application control unit 76, the display unit 71 displays a display page 59 reporting "failed to acquire elapsed time information" as shown in FIG. 25, on a display device (e.g., CRT, LCD) (step S311).

FIG. 25 illustrates an example of the display page 59 according to the first embodiment of the present invention in a case where the client PC (information processing device) 100 has failed to acquire the reproduction starting point information.

In the client PC (information processing device) 100, after the user confirms the displayed contents of the display page 59 shown in FIG. 25, and the user presses an [OK] button 59a of the display page 59 with a pointing device such as a mouse, the process control returns to step S307, and the processing procedures of the link information generating process from step S307 onward are repeated.

In this manner, by performing the processing procedures of steps S301 through S312 shown in FIG. 23, the client PC (information processing device) 100 according to the present embodiment realizes the process in which "link information for accessing multimedia contents such as audio/video data managed as recorded data is generated based on reproduction starting point information (e.g., the elapsed time and the number of frames from when recording started) indicating the reproduction starting point of the multimedia contents specified by the user; and when pasting the generated link information onto document data being edited with a document creating application used by the user on a daily basis, the link information is stored in a predetermined region (clipboard) in a memory used for temporarily storing information to be pasted onto the document data".

<Summary>

As described above, according to the first embodiment of the present invention, the contents management system 1 realizes the "link information generating function" by the following processing procedures.

(Procedure 1) Acquiring Reproduction Starting Point Information

The client PC (information processing device) 100 according to the present embodiment acquires, with the acquiring unit 84, the reproduction starting point information of the video data selected with the selecting unit 82 which the user desires to reproduce by making a reproduction request to the servlet for performing a reproduction process of the Web server program 32a included in the Web/video server (management server) 200, which request is made with the use of link information. This information is acquired at a timing when the reproduction starting point setting button 55a ([Copy] button shown in FIG. 17) in the reproduction starting point information setting region of the UI page 55 shown in FIG. 17 is pressed by a pointing device such as a mouse.

(Procedure 2) Generation of Link Information

The client PC (information processing device) 100 according to the present embodiment acquires, with the generating unit 85, the storage destination of the video data which are the target of the reproduction request, i.e., the destination to which the video data are to be supplied when the reproduction request is made.

Next, in the client PC (information processing device) 100 according to the present embodiment, the generating unit 85 attaches the following information to the acquired information pertaining to the storage destination of the video data.

Specifically, the name of the servlet to perform a reproduction process among the group of servlets of the Web server program 32a included in the Web/video server (management server) 200, the recording ID 41a acquired by the display unit 81, and the reproduction starting point information of the video data acquired by the acquiring unit 84, are attached. Accordingly, link information is generated, which is for making a reproduction request to the servlet for performing the reproduction process of the Web server program 32a.

(Procedure 3) Store in Memory

In the client PC (information processing device) 100 according to the present embodiment, the storing unit 86 stores, in a predetermined storage region (clipboard) of the SDRAM 12, the link information generated by the generating unit 85 and content information indicating the content of the video data for which the user desires to make a reproduction request (video data accessed from link information), as the clipboard data 43 (CF_HTML data) in the HTML format.

The client PC (information processing device) 100 according to the present embodiment sets, via the UI page 55 as shown in FIG. 17, the content information indicating the content of the video data for which a reproduction request is given to a play servlet of the Web server program 32a included in the Web/video server (management server) 200. The client PC (information processing device) 100 temporarily stores the clipboard data 43 in which the set content information of the contents is associated with the link information for making the reproduction request, in a predetermined storage region (clipboard) in the SDRAM 12. Accordingly, the link information for making a request to reproduce the video data can be easily pasted onto document data that are being edited with a document creating application that a user uses on a daily basis. Thus, the document data and the multimedia contents can be conveniently associated with each other.

By performing the above-described procedures (1) through (3), the contents management system 1 according to the present embodiment can achieve the following. That is, link information for accessing the multimedia contents such as audio/video data managed as recorded data is generated based on reproduction starting point information (e.g., the elapsed time and the number of frames from when recording started) indicating the reproduction starting point of multimedia contents specified by a user. When pasting the generated link information onto the document data 61 being edited, the link information is stored in a predetermined region (clipboard) in a memory used for temporarily storing information to be pasted onto the document data 61. Accordingly, the link information of the multimedia contents including the reproduction starting point information can be easily pasted onto the document data 61 being edited, and the user's document data 61 can be conveniently associated with the multimedia contents managed by the Web/video server (management server) 200.

Thus, the contents management system 1 according to the present embodiment makes it possible to efficiently utilize multimedia contents from the document data 61, such as sharing the multimedia contents with a third party via the document data 61 that are viewed/edited by a user on a daily basis.

[[Second Embodiment]]

In the present embodiment, the link information generating function of the client PC (information processing device) of the contents management system includes an interface for adjusting the reproduction starting point of video data of a meeting selected by a user. Therefore, link information of multimedia contents, which information includes reproduction starting point information for reproducing the video from an appropriate scene which the user desires, can be easily pasted onto document data that are being edited. Accordingly, multimedia contents can be efficiently utilized from document data that are viewed/edited by a user on a daily basis.

The difference between the second embodiment and the first embodiment is that in the second embodiment, the link information generating function includes an "interface for adjusting the reproduction starting point" for setting the reproduction starting point of video data of a meeting selected by the user.

Thus, in the following description of the present embodiment, elements corresponding to those of the first embodiment are denoted by the same reference numbers, and are not further described. Only the elements that are different from those of the first embodiment are described with reference to FIGS. 26 through 32.

<Unit for Realizing "Link Information Generating Function" Included in Client PC>

Next, with reference to FIGS. 26 through 30, a description is given of a unit for realizing "link information generating function" included in the client PC (information processing device) 100 according to the present embodiment described with reference to FIG. 13.

Figure 26:
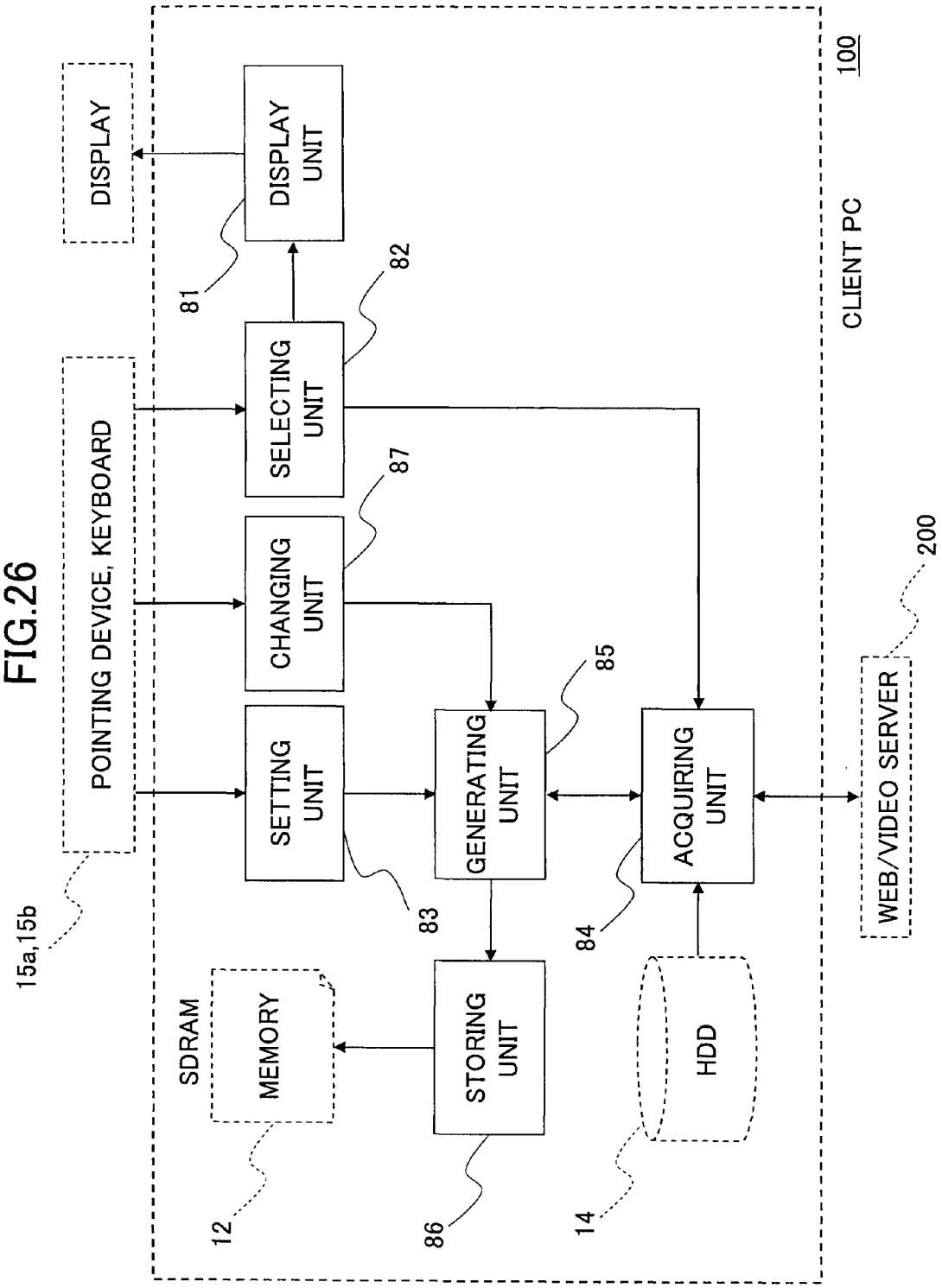
FIG. 26 illustrates an example of units included in the link information generating function included in the client PC (information processing device) according to a second embodiment of the present invention.

FIG. 26 illustrates an example of units included in the link information generating function included in the client PC (information processing device) 100 according to the second embodiment of the present invention.

To realize the "link information generating function" according to the present embodiment, the client PC (information processing device) 100 includes the display unit 81, the selecting unit 82, the setting unit 83, the acquiring unit 84, the generating unit 85, the storing unit 86, and a changing unit 87, as shown in FIG. 26.

In the following, a description is given of the display unit 81 and the changing unit 87, which are different from the first embodiment.

The display unit 81 displays a page with a GUI function which is used by a user facing the client PC (information processing device) 100 for using the "link information generating function".

When the "link information generating function" is used in the client PC (information processing device) 100 according to the present embodiment, the display unit 81 displays the UI page 53 for selecting video data of a meeting as shown in FIG. 17 on a display device (e.g., CRT, LCD) via the display I/F 16.

The user selects, with a pointing device such as a mouse, the video data of a meeting for which the user desires to generate link information with the generating unit 85, from the UI page 53 displayed on a display device (e.g., CRT, LCD).

When the user selects video data, the display unit 81 displays the UI page 55 as shown in FIG. 27 on a display device (e.g., CRT, LCD) after receiving the video data via the display I/F 16.

FIG. 27 illustrates an example of the UI page 55 according to the second embodiment of the present invention for setting information necessary for generating link information.

As shown in FIG. 27, the UI page 55 includes a reproduction starting point information setting region for setting information of a reproduction starting point of video data which the user desires to reproduce by making a reproduction request to the play servlet, which request is made with the use of link information (video data to be accessed from link information), and a reproduction information setting region for setting information to be reproduced when the changing unit 87 adjusts and sets the reproduction starting point as described below.

In the reproduction starting point information setting region, the reproduction starting point setting button 55*a* ([Copy] button shown in FIG. 27) for setting a reproduction starting point of video data for making a reproduction request to the play servlet, and a reproduction information display region 55*d* for displaying reproduction information set via the reproduction information setting region are displayed.

Furthermore, the reproduction information setting region displays a selection/setting space 55*e*, as reproduction information to be reproduced when adjusting and setting the reproduction starting point. Specifically, the selection/setting space 55*e* is for selecting/setting either one of a frame image in the video data of the meeting (an item for selecting/setting a "video frame" in FIG. 27) or a screen image displayed on a screen by the page displaying PC 400 during a meeting being held (an item for selecting/setting a "screen" in FIG. 27).

The user selects and sets reproduction information (frame image or screen image) to be reproduced when adjusting and setting the reproduction starting point with the changing unit 87 described below, from the selection/setting space 55*e* for reproduction information in the UI page 55 displayed on a display device (e.g., CRT, LCD), by selecting a radio button of the corresponding selection/setting item with a pointing device such as a mouse.

When the user selects/sets the reproduction information, and subsequently presses the reproduction starting point setting button 55*a* ([Copy] button shown in FIG. 27) while viewing the display page 51 of the Web browser 33*b*, the display unit 81 displays the UI page 55 as shown in FIG. 28 on a display device (e.g., CRT, LCD) via the display I/F 16.

FIG. 28 illustrates an example of the UI page 55 according to the second embodiment of the present invention for changing the reproduction starting point.

As shown in FIG. 28, the UI page 55 primarily displays a reproduction starting point information changing region for changing the information of the reproduction starting point of video data which the user desires to reproduce by making a reproduction request to the play servlet, which request is made with the use of link information (video data to be accessed from link information), and a content information setting region for setting content information for clearly and directly indicating the content of the video data.

The reproduction starting point information changing region includes the reproduction information display region 55*d* for displaying the reproduction information that has been selected/set with the selection/setting space 55*e* for reproduction information shown in FIG. 27, and a reproduction starting point adjusting interface 55*f* (slider control) for adjusting the reproduction starting point that has been temporarily set as the user pressed the reproduction starting point setting button 55*a* shown in FIG. 27 ([Copy] button shown in FIG. 27).

In the content information setting region, the selection/setting space 55*b* and the setting space 55*c* are displayed. The selection/setting space 55*b* is for selecting/setting content information which clearly and directly indicates a scene in the video data reproduced by accessing link information. The setting space 55*c* is for appropriately setting the horizontal and vertical size (pixels) of an image when an image is used as the content information.

FIG. 28 illustrates an example in which a slider control bar is used in the reproduction starting point adjusting interface 55*f* (slider control) of the reproduction starting point information changing region.

In this manner, the display unit 81 displays a page functioning as a UI on a display device (e.g., CRT, LCD) connected to the client PC (information processing device) 100 via the display I/F 16. Therefore, the display unit 81 is included in the display unit 71 shown in FIG. 13.

Next, a description is given of a unit for adjusting the reproduction starting point via the UI page 55 described with reference to FIG. 28.

The changing unit 87 changes, within a predetermined range, the reproduction starting point information indicating a reproduction starting point of video data of a meeting selected by a user.

The changing unit 87 uses, as a reference, the reproduction starting point temporarily set when the user pressed the reproduction starting point setting button 55*a* ([Copy] button shown in FIG. 27) of the UI page 55 shown in FIG. 27. Based on this reference, the changing unit 87 adjusts the reproduction starting point with the reproduction starting point adjusting interface 55*f* (slider control) of the UI page 55 shown in FIG. 28.

For example, the user is viewing, on the display page 51 of the Web browser 33*b*, a recorded meeting selected with the selecting unit 82. When the user comes across a scene which the user desires to reproduce later, the user instructs the acquiring unit 84 to acquire the reproduction starting point by pressing the reproduction starting point setting button 55*a* ([Copy] button shown in FIG. 27) of the UI page 55 with a pointing device such as a mouse.

In accordance with the instruction from the user to acquire the reproduction starting point, the acquiring unit 84 acquires the reproduction starting point information from the Web/video server (management server) 200.

The acquiring unit 84 acquires the reproduction starting point information by the following method. The acquiring unit 84 calls the getelapsedtime servlet of the Web server program 32*a* included in the Web/video server (management server) 200, and based on the information obtained from the response, the acquiring unit 84 acquires reproduction starting point information such as the elapsed time (sec) from when recording of the meeting started.

In the present embodiment, the getelapsedtime servlet is called with the following request message.
[Request to Acquire Reproduction Starting Point Information]
GET/getelapsedtime?recid=1234 HTTP/1.1

As a result, the following character string indicating the elapsed time (sec) from when the recording started for the meeting identified with the recording ID 41*a* is sent from the Web/video server (management server) 200.
[Response to Request to Acquire Reproduction Starting Point Information]
When the elapsed time (sec) from when recording started is 10 minutes, the following response is given:
"set=600"

The reproduction starting point information acquired as above is temporarily stored in the SDRAM 12 of the client PC (information processing device) 100.

The changing unit 87 described below with reference to FIGS. 29A and 29B uses as a reference, the reproduction starting time information (e.g., elapsed time information) acquired by the acquiring unit 84, to adjust the reproduction starting point with the reproduction starting point adjusting interface 55*f* (slider control).

Adjustment of the reproduction starting point performed by the changing unit 87 is described below with reference to FIGS. 29A and 29B.

Figure 29A:
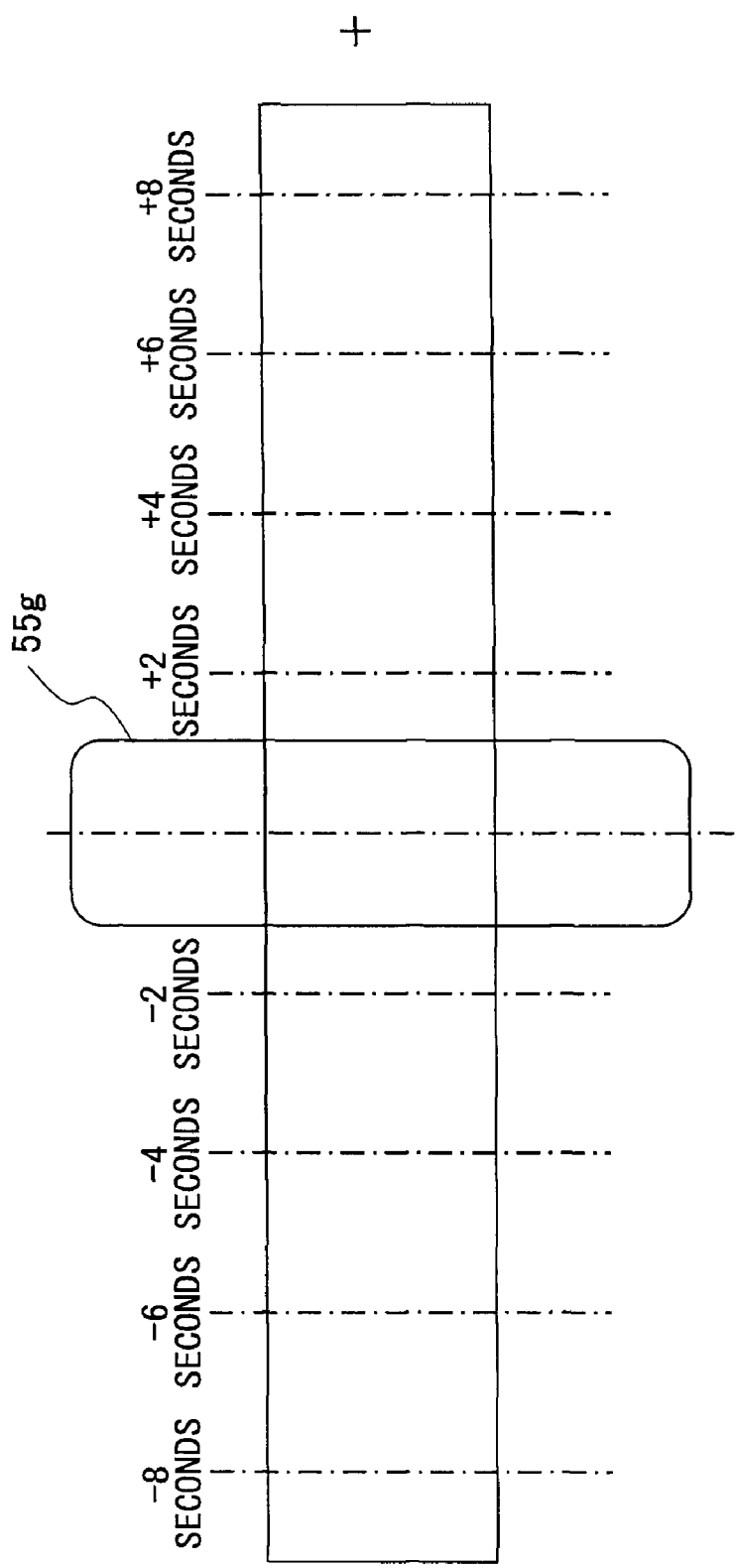
FIGS. 29A and 29B illustrate an example of a reproduction starting point adjusting interface (slider control) according to the second embodiment of the present invention.
Figure 29B:
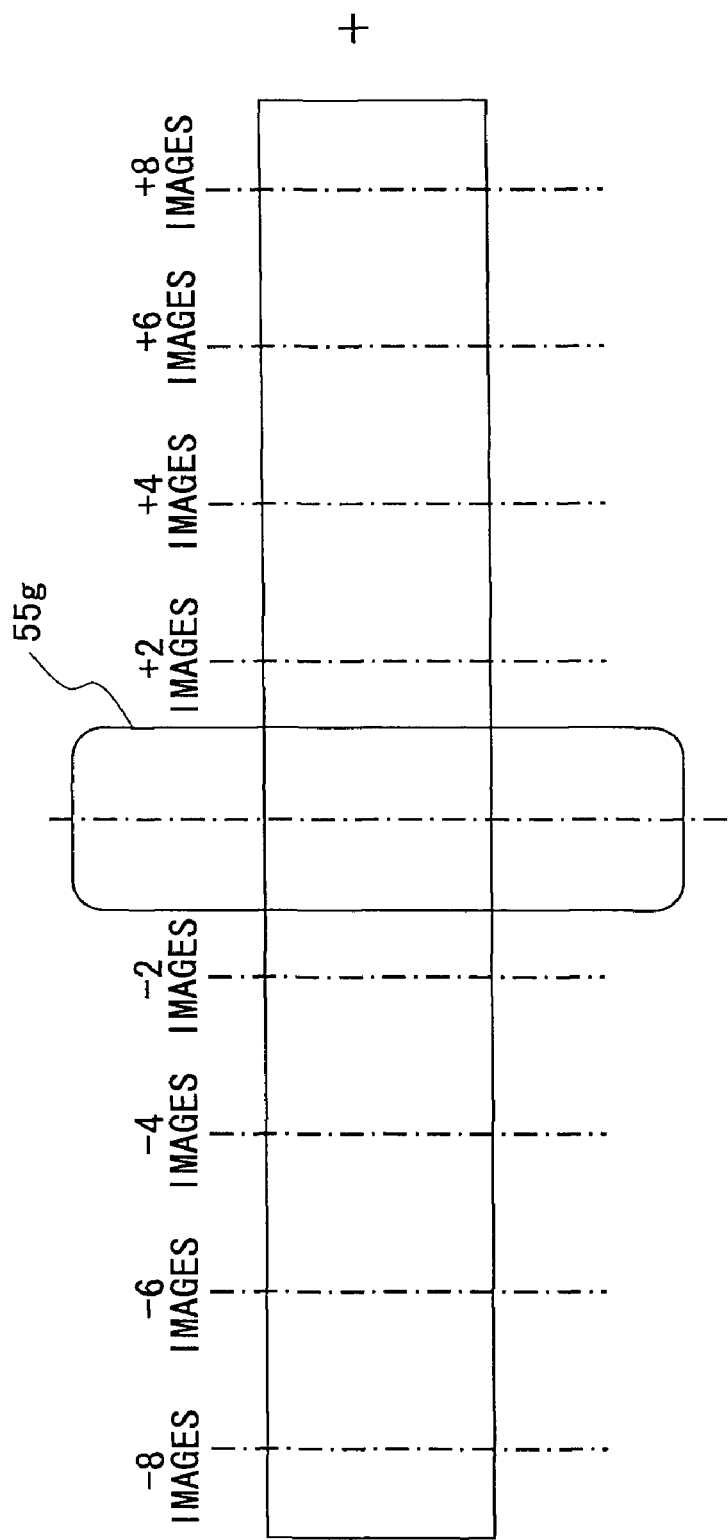

FIGS. 29A and 29B illustrate an example of the reproduction starting point adjusting interface 55f (slider control) according to the second embodiment of the present invention.

FIG. 29A illustrates an example of an interface for adjusting the reproduction starting point by changing the elapsed time which is the reproduction starting point information.

The user selects a tab 55g of the reproduction starting point adjusting interface 55f (slider control) as shown in FIG. 29A with a pointing device such as a mouse, and slides it sideways while selecting it to change the reproduction starting point that has been temporarily set. The maximum movement amount and the minimum movement amount of sliding this tab 55b is within a certain range, as shown in FIG. 29A. This range is set beforehand at the stage of implementing the reproduction starting point adjusting interface 55f (slider control) in consideration of the extent which is adjustable by sliding the tab 55g.

Furthermore, in the reproduction information display region 55d of the UI page 55 shown in FIG. 28, a frame image or a screen image which is selected/set as reproduction information is displayed. Based on information such as an attached time stamp, the displayed frame image or screen image changes in synchronization with the movement of the reproduction starting point adjusting interface 55f (slider control).

The changing unit 87 detects the movement direction/movement amount of the tab 55g of the reproduction starting point adjusting interface 55f (slider control) within a certain amount of time Δt (e.g., 0.5 seconds). Then, based on reproduction starting point information (reference value) which has been temporarily set by the acquiring unit 84, the changing unit 87 calculates the amount of change (change amount) from the reference value by performing an addition process with the following formula.

[Formula Used when Reproduction Starting Point Information is the Elapsed Time from when Recording Started]

$$T=T+s*\Delta t \quad \text{(formula 1)}$$

T: change amount (sec) from reference value

Δt: updating period (sec)

s: multiple of change amount with respect to updating period

A specific example of changing the reproduction starting point information with the use of formula 1 is described with reference to FIG. 29A.

When the reproduction starting point setting button 55a ([Copy] button shown in FIG. 27) included in the UI page 55 is pressed, the changing unit 87 sets the initial value of the change amount (T) from the reference value at 0 seconds.

When the tab 55g of the reproduction starting point adjusting interface 55f (slider control) slides, the changing unit 87 repeatedly performs the following processes (A) through (C) for every updating period Δt (sec).

(A) The changing unit 87 detects a position (coordinates) of the tab 55g in a coordinate space of the display page 51.

(B) The changing unit 87 obtains a multiple (s) of the time change amount corresponding to the detected position (coordinates). For example, when the position of the tab 55g slides by two scale marks toward the negative side as viewed in FIG. 29A, the changing unit 87 performs a calculation to obtain −4 seconds as the multiple (s) of the time change amount with respect to the updating period Δt (sec).

(C) The changing unit 87 assigns these values in formula 1 to calculate the change amount (T=0+(−4*0.5)) from the reference value, thereby obtaining −2 seconds.

Furthermore, for example, in a case where the tab 55g of the reproduction starting point adjusting interface 55f (slider control) slides from a position of two scale marks toward the negative side as viewed in FIG. 29A to a position of four scale marks toward the positive side as viewed in FIG. 29A, the changing unit 87 sets the initial value of the change amount (T) from the reference value at −2 seconds.

(A) The changing unit 87 detects a position (coordinates) of the tab 55g in a coordinate space of the display page 51.

(B) The changing unit 87 obtains a multiple (s) of the time change amount corresponding to the detected position (coordinates). For example, when the position of the tab 55g slides by four scale marks toward the positive side as viewed in FIG. 29A, the changing unit 87 performs a calculation to obtain +4 seconds as the multiple (s) of the time change amount with respect to the updating period Δt (sec).

(C) The changing unit 87 assigns these values in formula 1 to calculate the change amount (T=(−2)+(−4*0.5)) from the reference value, thereby obtaining 0 seconds.

As described above, the changing unit 87 uses a predetermined formula such as formula 1 to calculate the change amount from a reference value when the tab 55g of the reproduction starting point adjusting interface 55f (slider control) slides.

Next, the changing unit 87 adds the change amount from the reference value calculated with the use of formula 1 to the reproduction starting point information which is the reference value, to change the reproduction starting point information to the final value.

For example, when the tab 55g of the reproduction starting point adjusting interface 55f (slider control) slides by two scale marks toward the negative side as viewed in FIG. 29A, the change amount (T=−2 seconds) from the reference value calculated with formula 1 is added to the elapsed time information 600 seconds which is the reproduction starting point information acquired by the acquiring unit 84, thereby changing the reproduction starting point information to the final value, i.e., 598 seconds.

FIG. 29B illustrates an example of an interface for adjusting the reproduction starting point by changing the number of still images which are used as the reproduction starting point information.

In this case, the changing unit 87 can use formula 1 to calculate the reproduction starting point information of the reference value as a number of frames. For example, assuming that the tab 55g of the reproduction starting point adjusting interface 55f (slider control) moves by a certain number of screen images Δn, the reproduction starting point information of the reference value can be calculated by the same method as formula 1. As a result, with the use of the reproduction starting point adjusting interface 55f (slider control), the reproduction starting point information can be adjusted to the time of acquiring the ±T th image from the reference screen image, which reference screen image has been set when the reproduction starting point setting button 55a ([Copy] button shown in FIG. 27) was pressed.

While the tab 55g of the reproduction starting point adjusting interface 55f (slider control) is released from a pointing device such as a mouse, the changing unit 87 detects the movement amount of the tab 55g, and changes the reproduction starting point information by the above described calculation method.

Furthermore, the changing unit 87 temporarily stores, in the SDRAM 12 of the client PC (information processing device) 100, the changed reproduction starting point information, when the changing unit 87 has detected that the tab 55g has popped up upon being released.

In this manner, the changing unit 87 updates the reproduction starting point information based on the movement amount of the tab 55g of the reproduction starting point adjusting interface 55f (slider control), which movement amount is detected via the input I/F 15. Therefore, the changing unit 87 is included in the user operations input unit 72 shown in FIG. 13.

As described above, in the client PC (information processing device) 100, the changing unit 87 changes the reproduction staring point information, the generating unit 85 generates new link information with the use of the changed reproduction starting point information, and the storing unit 86 stores the generated link information in a predetermined storage region (clipboard) in the SDRAM 12.

As a result, in a predetermined storage region (clipboard) in the SDRAM 12 of the client PC (information processing device) 100 according to the present embodiment, the clipboard data 43 in the HTML format as shown in FIG. 30 are stored.

FIG. 30 illustrates a data structure of generated link information (when a screen image is associated) according to the second embodiment of the present invention.

FIG. 30 illustrates an example of link information including the elapsed time of 1140 seconds as the changed reproduction starting point information. This is obtained in a case where an elapsed time of 1200 seconds, which is the reproduction starting point information when the link information shown in FIG. 18B is generated, is used as a reference, and the change amount of the elapsed time calculated by the changing unit 87 is −60 seconds.

The contents management system 1 according to the present embodiment executes the above-described units of the client PC (information processing device) 100 according to the following procedures.

(Procedure 1) Acquire Reproduction Starting Point Information

In the client PC (information processing device) 100 according to the present embodiment, the acquiring unit 84 acquires reproduction starting point information of video data selected with the selecting unit 82 which the user desires to reproduce by making a reproduction request to the servlet that performs a reproduction process of the of the Web server program 32a included in the Web/video server (management server) 200, which request is made with the use of link information. Specifically, the acquiring unit 84 acquires this information at a timing when a pointing device such as a mouse presses the reproduction starting point setting button 55a ([Copy] button shown in FIG. 17) of the reproduction starting point information setting region of the UI page 55 shown in FIG. 17.

(Procedure 2) Change Reproduction Starting Point Information (Adjustment of Reproduction Starting Point)

In the client PC (information processing device) 100 according to the present embodiment, the changing unit 87 detects the movement amount of the tab 55g of the reproduction starting point adjusting interface 55f (slider control) in the UI page 55 shown in FIG. 28. Based on the detected movement amount and the reproduction starting point information (reference value) temporarily set by the acquiring unit 84, the changing unit 87 calculates the change amount from the reference value with a predetermined formula.

Next, the client PC (information processing device) 100 adds the change amount calculated by the changing unit 87 to the reference value, and changes the reproduction starting point information.

(Procedure 3) Generation of Link Information

In the client PC (information processing device) 100 according to the present embodiment, the generating unit 85 acquires the storage destination of the video data that are the target of the reproduction request, i.e., information regarding the destination to which the video data are supplied when a reproduction request is made.

Next, in the client PC (information processing device) 100, the generating unit 85 attaches, to the information regarding the storage destination of the acquired video data, the name of the servlet to perform a reproduction process among the group of servlets of the Web server program 32a included in the Web/video server (management server) 200, the recording ID 41a acquired by the display unit 81, and the reproduction starting point information of the video data changed by the changing unit 87. Accordingly, link information is generated, which is used for making a reproduction request to the servlet that performs the reproduction process of the Web server program 32a.

(Procedure 4) Store in Memory

In the client PC (information processing device) 100 according to the present embodiment, the storing unit 86 stores, in a predetermined storage region (clipboard) of the SDRAM 12, the link information generated by the generating unit 85 and content information indicating the content of the video data for which the user desires to make a reproduction request (video data accessed from link information), as the clipboard data 43 (CF_HTML data) in the HTML format.

The client PC (information processing device) 100 according to the present embodiment sets, via the UI page 55 as shown in FIG. 17, the content information indicating the content of the video data for which a reproduction request is given to a play servlet of the Web server program 32a included in the Web/video server (management server) 200. The client PC (information processing device) 100 temporarily stores, in a predetermined storage region (clipboard) in the SDRAM 12, the clipboard data 43 in which the set content information of the contents is associated with the link information for making the reproduction request. Accordingly, the link information for making a request to reproduce the video data can be easily pasted onto document data that are being edited with a document creating application which a user uses on a daily basis. Thus, the document data and the multimedia contents can be conveniently associated with each other.

By performing the above-described procedures (1) through (4) of the "link information generating function" of the client PC (information processing device) 100, the contents management system 1 according to the present embodiment realizes the function of "easily pasting, onto document data being edited, the link information for multimedia contents, which information includes reproduction starting point information for reproducing the video data from an appropriate scene which the user desires, and efficiently using multimedia contents from document data that are viewed/edited by the user on a daily basis".

<Processing Procedures of Recording Function of the Recording PC>

Figure 31:
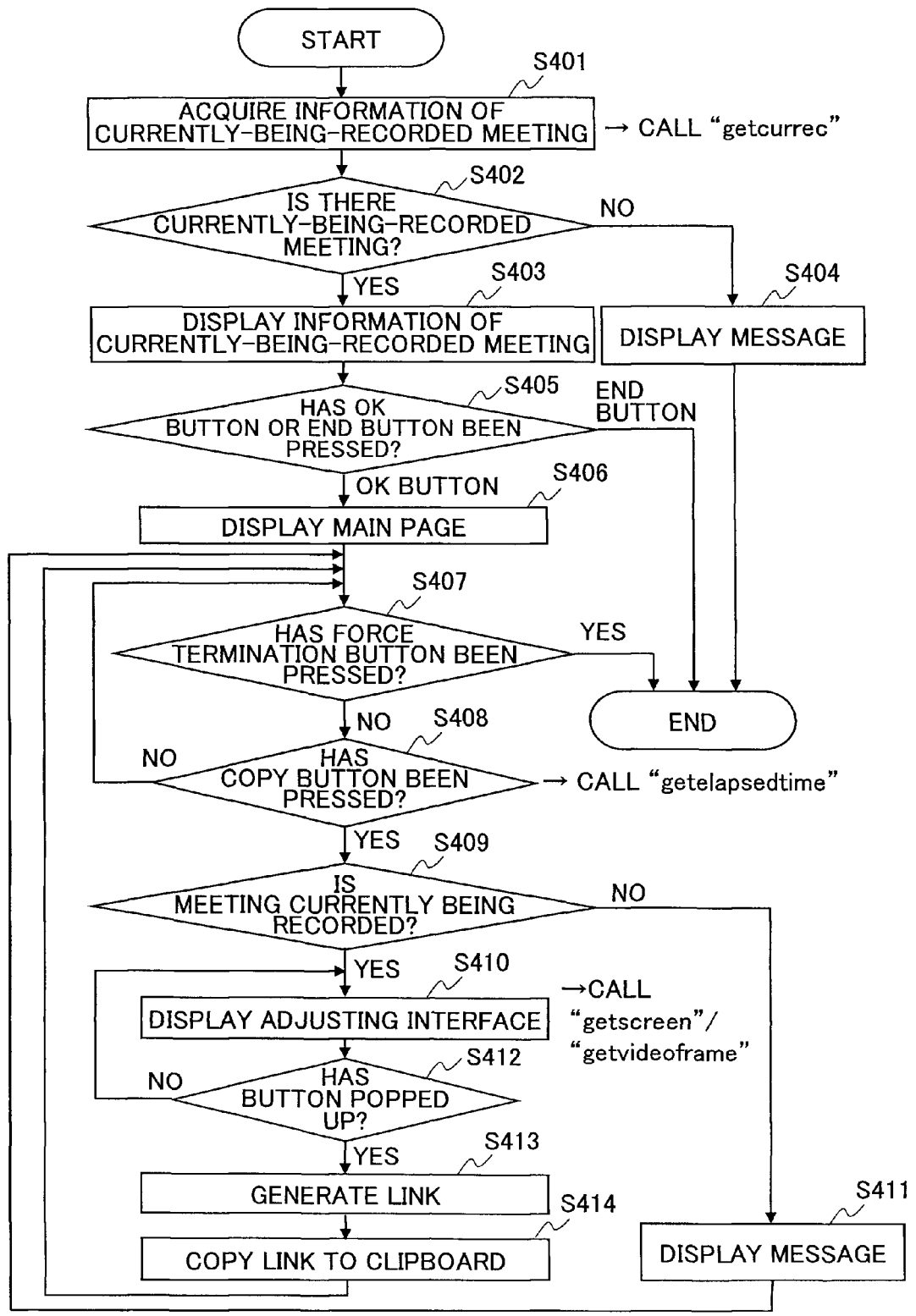
FIG. 31 is a flowchart of an example of processing procedures (performed during a meeting) of the link information generating function (function realized by the link information generating program) of the client PC (information processing device) according to the second embodiment of the present invention.
Figure 32:
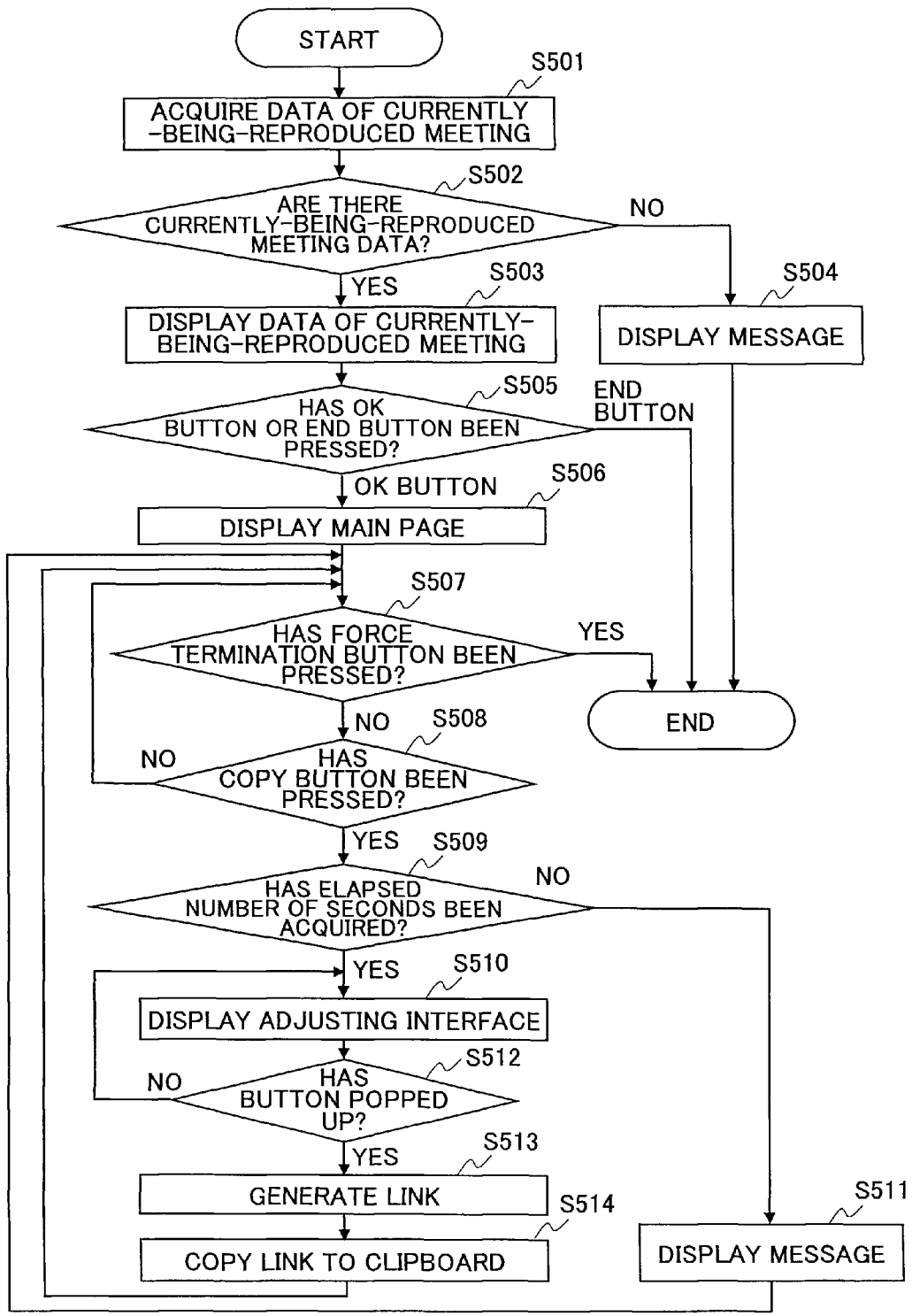
FIG. 32 is a flowchart of an example of processing procedures (performed when reproducing video data of a meeting held in the past) of the link information generating function (function realized by the link information generating program) of the client PC (information processing device) according to the second embodiment of the present invention.

Next, with reference to FIGS. 31 and 32, a description is given of processing procedures of the "link information generating function" of the client PC (information processing device) 100 according to the present embodiment.

FIG. 31 is a flowchart of an example of processing procedures (performed during a meeting) of the link information generating function (function realized by the link information generating program 33a) of the client PC (information processing device) 100 according to the second embodiment of the present invention.

In the client PC (information processing device) 100 according to the present embodiment, for example, the link information generating program 33a for performing a process of the "link information generating function" stored in the HDD 14 is loaded in a memory which is the SDRAM 12, and executed by the CPU 11. At this stage, the following processing procedures (steps S401 through S414) are executed.

The client PC (information processing device) 100 according to the present embodiment acquires information pertaining to a currently-being-recorded meeting from the Web/video server (management server) 200 (step S401).

In the client PC (information processing device) 100, according to a command from the application control unit 76, the Web client 74 acquires information pertaining to a currently-recorded meeting by calling the getcurrrec servlet of the Web server program 32*a* included in the Web/video server (management server) 200.

In the client PC (information processing device) 100, the application control unit 76 reads, via the file I/F 73, the value of a key (e.g., "sWebServerPath") of the setting file 42 shown in FIG. 14 stored in the HDD 14, thereby acquiring the host name (e.g., "videoserver.abc.com") of the Web server program 32*a* from which the getcurrec servlet is to be called. The application control unit 76 passes the acquired host name to the Web client 74.

In the client PC (information processing device) 100, the Web client 74 sends, to the Web server program 32*a* of the Web/video server (management server) 200, a request message such as "GET/getcurrec HTTP/1.1" based on the received host name.

As a result, for example, when a meeting indicated by the recording ID 41*a* corresponding to "1234" which is currently being recorded by the recording PC 300 corresponding to "recorder01", is being held since Mar. 27, 2006, 10:00:00, the getcurrec servlet sends a character string such as "host=recorder01&recid=1234&start=2006-03-27T10:00: 00", in response to a request from the Web client 74 which is the calling source.

Based on the information obtained from the response of the getcurrec servlet of the Web server program 32*a* included in the Web/video server (management server) 200, the client PC (information processing device) 100 determines whether there is a currently-being-recorded meeting (step S402).

In a case where the above meeting information is received as a response from the getcurrec servlet (Yes in step S402), the Web client 74 receives information of a currently-being-recorded meeting. Then, according to a command from the application control unit 76, the display unit 71 displays the UI page 53 for selecting a currently-being-recorded meeting as shown in FIG. 16A on a display device (e.g., CRT, LCD).

In a case where null characters are received as a response from the getcurrec servlet (No in step S402), according to a command from the application control unit 76, the display unit 71 displays the display page 54 for reporting that "there are no meetings currently being recorded" as shown in FIG. 16B on a display device (e.g., CRT, LCD) (step S404).

The client PC (information processing device) 100 determines, with the user operations input unit 72, whether the [OK] button or the [end] button which are the selection operation control buttons 53*b* of the UI page 53 shown in FIG. 16A has been pressed by a pointing device such as a mouse (step S405).

When the user operations input unit 72 detects that the [end] button has been pressed ("[end] button" in step S405), the detection result is passed from the user operations input unit 72 to the application control unit 76, and the application control unit 76 ends the link information generating process.

When the user operations input unit 72 detects that the [OK] button has been pressed ("[OK] button" in step S405), the detection result is passed from the user operations input unit 72 to the application control unit 76, and the application control unit 76 temporarily stores, in the SDRAM 12, the recording ID 41*a* and the starting time and date 41*b* of the meeting selected by the user.

In the client PC (information processing device) 100, according to a command from the application control unit 76, the display unit 71 displays the UI page 55 including the reproduction starting point information setting region and the content information setting region as shown in FIG. 17 on a display device (e.g., CRT, LCD) (step S406).

The client PC (information processing device) 100 determines, with the user operations input unit 72, whether the force termination button of the UI page 55 shown in FIG. 17 ([x] button shown in FIG. 17) has been pressed by a pointing device such as a mouse (step S407).

When the user operations input unit 72 detects that the force termination button ([x] button shown in FIG. 17) has been pressed (Yes in step S407), the detection result is passed from the user operations input unit 72 to the application control unit 76, and the application control unit 76 ends the information generating process.

When the user operations input unit 72 has not yet detected that the force termination button ([x] button shown in FIG. 17) has been pressed (No in step S407), the user operations input unit 72 receives, via the selection/setting space 55*b* for selecting/setting information indicating the contents of the content information setting region, information indicating the content of the video data of the meeting selected by the user which has been selected/set with the use of a pointing device such as a mouse and a keyboard. The user operations input unit 72 passes the received content information of the contents to the application control unit 76, and the application control unit 76 temporarily stores the content information in the SDRAM 12.

Next, the client PC (information processing device) 100 determines, with the user operations input unit 72, whether the reproduction starting point setting button 55*a* of the UI page 55 shown in FIG. 17 ([Copy] button shown in FIG. 17) has been pressed by a pointing device such as a mouse (step S408).

When the user operations input unit 72 has not yet detected that the reproduction starting point setting button 55*a* ([Copy] button shown in FIG. 17) has been pressed (No in step S408), the process control returns to step S207, and the user operations input unit 72 waits until it detects that the reproduction starting point setting button 55*a* ([Copy] button shown in FIG. 17) has been pressed. Thus, during this time, it is possible to select/set/change, via the UI page 55, the information indicating the content of the video data of the meeting selected by the user.

When the client PC (information processing device) 100 detects, with the user operations input unit 72, that the reproduction starting point setting button 55*a* ([Copy] button shown in FIG. 17) has been pressed (Yes in step S408), according to a command from the application control unit 76 that has received the detection result from the user operations input unit 72, the Web client 74 calls a getelapsedtime servlet of the Web server program 32*a* included in the Web/video server (management server) 200. Accordingly, the Web client 74 acquires the elapsed time from the starting time of recording the meeting selected by the user corresponding to the recording ID 41*a* that has been temporarily stored in the SDRAM 12 in step S405.

The client PC (information processing device) 100 sends, with the Web client 74, a request message such as "GET/ getelapsedtime?recid=1234 HTTP/1.1" to the Web server program 32a included in the Web/video server (management server) 200 based on the recording ID 41a temporarily stored in the SDRAM 12.

As a result, for example, when the time and date of calling the getelapsedtime servlet is Mar. 27, 2006, 10:10:00, the getelapsedtime servlet returns a character string such as "sec=600" as a response to the request to the Web client 74 which is the calling source.

At this time, the client PC (information processing device) 100 determines whether the meeting selected by the user is currently being recorded based on the information of the response from the getelapsedtime servlet of the Web server program 32a included in the Web/video server (management server) 200 (step S409).

When the above elapsed time information is received as a response from the getelapsedtime servlet (Yes in step S409), processing procedures are performed for displaying the reproduction starting point adjusting interface 55f (slider control).

In the client PC (information processing device) 100, the display unit 71 displays the UI page 55 as shown in FIG. 28 on a display device (e.g., CRT, LCD). In consideration of the operability for the user, the pointing device such as a mouse is moved to and displayed at a position of the tab 55g of the slider control bar which is the reproduction starting point adjusting interface 55f of the UI page 55 (step S410).

The client PC (information processing device) 100 determines, with the user operations input unit 72, whether the tab 55g of the slider control bar has been released (popped up) from the pointing device such as a mouse (step S412).

When the tab 55g of the slider control bar has not yet been released (No in step S412), it is determined that the user is currently adjusting the reproduction starting point, and step S410 is repeated.

When the user operations input unit 72 detects that the tab 55g of the slider control bar has been released (Yes in step S412), the user operations input unit 72 detects the movement direction/movement amount of the tab 55g, for the change amount of each scale mark of the slider control bar. Then, the change amount from the reference value is calculated with a predetermined formula, using the reproduction starting point information temporarily set in step S408 as the reference value.

A description is given of processing procedures for obtaining the change amount from the reference value by using the predetermined formula below.

[Formula Used when Reproduction Starting Point Information is the Elapsed Time from when Recording Started]

$$T = T + s * \Delta t \quad \text{(formula 1)}$$

T: change amount (sec) from reference value
$\Delta t$: updating period (sec)
s: multiple of time change amount with respect to updating period

[Initialization]

In the client PC (information processing device) 100, the user operations input unit 72 initializes the change amount (T) from the reference value when step S408 is performed.

[Calculation of Change Amount from Reference Value]

In the client PC (information processing device) 100, the user operations input unit 72 detects the coordinate position of the tab 55g of the slider control bar, and calculates, based on the coordinate position of the tab 55g, the multiple (s) of the time change amount corresponding to the coordinate position.

Next, in the client PC (information processing device) 100, the user operations input unit 72 assigns the multiple (s) of the time change amount corresponding to the coordinate position and the updating period $\Delta t$ in formula 1 to calculate the change amount (T) from the reference value.

In the client PC (information processing device) 100, every time the user operations input unit 72 calculates the change amount (T) from the reference value, the application control unit 76 adds the calculated change amount (T) to the elapsed time of the reproduction starting point information which is the reference value, and calculates the elapsed time information indicating the reproduction starting point which is being adjusted by the user.

In the client PC (information processing device) 100, according to a command from the application control unit 76, the Web client 74 sends a request message of "GET/getscreen?recid=1234&sec=(calculated elapsed time) HTTP/1.1" to the Web/video server (management server) 200.

As a result, in the client PC (information processing device) 100, the Web client 74 receives a screen image corresponding to the calculated elapsed time from the Web/video server (management server) 200.

In the client PC (information processing device) 100, according to a command from the application control unit 76, the display unit 71 displays the screen image received from the Web/video server (management server) 200 in the reproduction information display region 55d of the UI page 55 shown in FIG. 28.

Accordingly, the client PC (information processing device) 100 changes the image information displayed in the reproduction information display region 55d in synchronization with the movement of the tab 55g of the reproduction starting point adjusting interface 55f (slider control).

Next, in the client PC (information processing device) 100, when the user operations input unit 72 detects that the tab 55g of the reproduction starting point adjusting interface 55f (slider control) has been released and that it has popped up, the user operations input unit 72 passes, to the to the application control unit 76, elapsed time information which is the changed reproduction starting point information.

In the client PC (information processing device) 100, according to a command from the application control unit 76, the link generating unit 75 adds, to the information (e.g., "http://videoserver.abc.com") regarding the storage destination of the video data of a recorded meeting read in step S401, the servlet name (e.g., "play") for performing the reproduction process among a group of servlets of the Web server program 32a included in the Web/video server (management server) 200, the recording ID 41a acquired in step S405, and the elapsed time information which is the reproduction starting point information of the video data acquired in step S408. Accordingly, the link generating unit 75 generates link information for making a reproduction request to the servlet for performing the reproduction process of the Web server program 32a included in the Web/video server (management server) 200, and passes the generated link information to the application control unit 76 (step S413).

In the client PC (information processing device) 100, in accordance with a HTML clipboard format (CF_HTML), the application control unit 76 generates the clipboard data 43. Specifically, in the clipboard data 43, the link information received from the link generating unit 75 is associated with content information indicating the contents, which content information corresponds to text data or image data set with the selection/setting space 55b and the setting space 55c of the content information setting region of the UI page 55 shown in FIG. 17. Then, the application control unit 76 stores the clipboard data 43 in a predetermined storage region (clipboard) of the SDRAM 12 (step S414). The process control returns to step S407, and the processing procedures of the link information generating process from step S407 onward are repeated.

When null characters are returned from the getelapsedtime servlet (No in step S409), according to a command from the application control unit 76, the display unit 71 displays the display page 56 for reporting that "the meeting has ended" as shown in FIG. 20 on a display device (e.g., CRT, LCD) (step S411).

In the client PC (information processing device) 100, when the user confirms the contents displayed in the display page 56 shown in FIG. 20, and presses the [OK] button 56*a* of the display page 56 with a pointing device such as a mouse, the process control returns to step S407, and the processing procedures of the link information generating process from step S407 onward are repeated.

FIG. 32 is a flowchart of an example of processing procedures (performed when reproducing video data of a meeting held in the past) of the link information generating function (function realized by the link information generating program 33*a*) of the client PC (information processing device) 100 according to the second embodiment of the present invention.

In the client PC (information processing device) 100 according to the present embodiment, for example, the link information generating program 33*a* for performing a process of the "link information generating function" stored in the HDD 14 is loaded in a memory which is the SDRAM 12, and executed by the CPU 11. At this stage, the following processing procedures (steps S501 through S514) are executed.

The client PC (information processing device) 100 according to the present embodiment acquires information pertaining to video data of a currently-being-reproduced meeting from the Web/video server (management server) 200 (step S501).

In the client PC (information processing device) 100, according to a command from the application control unit 76, the Web page I/F 77 identifies the Internet Explorer (registered trademark) currently being activated in the client PC (information processing device) 100 with the use of an API of Microsoft based on a window name called "IEFrame". Then, from the specified Internet Explorer (registered trademark), the Web page I/F 77 finds the display page 51 in which the video data of the meeting are reproduced from a URL specified in the address space. Accordingly, the Web page I/F 77 acquires information pertaining to video data of the currently-being-reproduced meeting. The event sink of Internet Explorer (registered trademark) and the control values and setting values of the HTML elements are acquired at this stage with the use of DCOM.

The client PC (information processing device) 100 determines whether there are any currently-being-reproduced video data based on the information pertaining to the currently-being-reproduced video data of the meeting acquired by the above method (step S502).

When information pertaining to the currently-being-reproduced video data of the meeting has been acquired (Yes in step S502), the Web page I/F 77 receives the information of the currently-being-reproduced video data, and according to a command from the application control unit 76, the display unit 71 displays, on a display device (e.g., CRT, LCD), the UI page 57 for selecting currently-being-reproduced video data of a meeting that has been held in the past, as shown in FIG. 24A (step S503).

When information pertaining to currently-being-reproduced video data of a meeting has not been acquired (No in step S502), according to a command from the application control unit 76, the display unit 71 displays, on a display device (e.g., CRT, LCD), the display page 58 as shown in FIG. 24B, reporting that "there are no meeting video data currently being reproduced" (step S504).

The client PC (information processing device) 100 determines, with the user operations input unit 72, whether the [OK] button or the [end] button which are the selection operation control buttons 57*b* of the UI page 57 shown in FIG. 24A has been pressed by a pointing device such as a mouse (step S505).

When the user operations input unit 72 detects that the [end] button has been pressed ("[end] button" in step S505), the detection result is passed from the user operations input unit 72 to the application control unit 76, and the application control unit 76 ends the link information generating process.

When the user operations input unit 72 detects that the [OK] button has been pressed ("[OK] button" in step S505), the detection result is passed from the user operations input unit 72 to the application control unit 76, and according to a command from the application control unit 76, the Web page I/F 77 starts the event sink and control operations of the reproduction page 51 for reproducing the video data of the meeting selected by the user.

Next, in the client PC (information processing device) 100, according to a command from the application control unit 76, the display unit 71 displays, on a display device (e.g., CRT, LCD), the UI page 55 having the reproduction starting point information setting region and the content information setting region as shown in FIG. 17 (step S506).

The client PC (information processing device) 100 determines, with the user operations input unit 72, whether the force termination button (the [x] button in FIG. 17) in the UI page 55 shown in FIG. 17 has been pressed with a pointing device such as a mouse (step S507).

When the user operations input unit 72 detects that the force termination button (the [x] button in FIG. 17) has been pressed (Yes in step S507), the user operations input unit 72 passes the detection result to the application control unit 76, and the application control unit 76 ends the link information generating process.

When the user operations input unit 72 has not yet detected that the force termination button (the [x] button in FIG. 17) has been pressed (No in step S507), the user operations input unit 72 receives, via the selection/setting space 55*b* for selecting/setting information indicating the content of the contents in the content information setting region, information indicating the content of the video data of a meeting selected by the user, which has been selected/set with the use of a pointing device such as a mouse and a keyboard. The received content information of the contents is passed to the application control unit 76, and the application control unit 76 temporarily stores the content information in the SDRAM 12.

Next, the client PC (information processing device) 100 determines, with the user operations input unit 72, whether the reproduction starting point setting button 55*a* ([Copy] button shown in FIG. 17) of the UI page 55 shown in FIG. 17 has been pressed by a pointing device such as a mouse (step S508).

When the user operations input unit 72 has not yet detected that the reproduction starting point setting button 55*a* ([Copy] button shown in FIG. 17) has been pressed (No in step S508), the process control returns to step S507, and the user operations input unit 72 waits until it detects that the reproduction starting point setting button 55*a* ([Copy] button shown in FIG. 17) has been pressed. Thus, during this time, it is possible to select/set/change, via the UI page 55, the information indicating the content of the video data of the meeting selected by the user.

When the client PC (information processing device) 100 detects, with the user operations input unit 72, that the reproduction starting point setting button 55a ([Copy] button shown in FIG. 17) has been pressed (Yes in step S508), the Web page I/F 77 performs the following. That is, according to a command from the application control unit 76 that has received the detection result from the user operations input unit 72, the Web page I/F 77 acquires, from the display page 51 reproducing the video data for which the event sink and the control operation are executed, the elapsed time from when recording started for the meeting of the recording ID 41a selected by the user.

The client PC (information processing device) 100 acquires, with the Web page I/F 77, the currently-being-reproduced position of the video reproduction program 33c operating in the video data reproduction page 51, by using DCOM.

The client PC (information processing device) 100 determines whether the video data of the meeting selected by the user are still being reproduced, based on the elapsed time information acquired by the Web page I/F 77 (step S509).

When the Web page I/F 77 has acquired the elapsed time information by the above method (Yes in step S509), processing procedures are performed for displaying the reproduction starting point adjusting interface 55f (slider control).

In the client PC (information processing device) 100, the display unit 71 displays the UI page 55 as shown in FIG. 28 on a display device (e.g., CRT, LCD). In consideration of the operability for the user, the pointing device such as a mouse is moved to and displayed at a position of the tab 55g of the slider control bar which is the reproduction starting point adjusting interface 55f of the UI page 55 (step S510).

The client PC (information processing device) 100 determines, with the user operations input unit 72, whether the tab 55g of the slider control bar has been released (popped up) from the pointing device such as a mouse (step S512).

When the tab 55g of the slider control bar has not yet been released (No in step S512), it is determined that the user is currently adjusting the reproduction starting point, and step S510 is repeated.

When the user operations input unit 72 detects that the tab 55g of the slider control bar has been released (Yes in step S512), the user operations input unit 72 detects the movement direction/movement amount of the tab 55g, for the change amount of each scale mark of the slider control bar. Then, the change amount from the reference value is calculated with a predetermined formula, using the reproduction starting point information temporarily set in step S508 as the reference value.

A description is given of processing procedures for obtaining the change amount from the reference value by using the predetermined formula below.

[Formula Used when Reproduction Starting Point Information is the Elapsed Time from when Recording Started]

$$T = T + s * \Delta t \quad \text{(formula 1)}$$

T: change amount (sec) from reference value
Δt: updating period (sec)
s: multiple of time change amount with respect to updating period

[Initialization]

In the client PC (information processing device) 100, the user operations input unit 72 initializes the change amount (T) from the reference value when step S408 is performed.

[Calculation of Change Amount from Reference Value]

In the client PC (information processing device) 100, the user operations input unit 72 detects the coordinate position of the tab 55g of the slider control bar, and calculates, based on the coordinate position of the tab 55g, the multiple (s) of the time change amount corresponding to the coordinate position.

Next, in the client PC (information processing device) 100, the user operations input unit 72 assigns the multiple (s) of the time change amount corresponding to the coordinate position and the updating period Δt in formula 1 to calculate the change amount (T) from the reference value.

In the client PC (information processing device) 100, every time the user operations input unit 72 calculates the change amount (T) from the reference value, the application control unit 76 adds the calculated change amount (T) to the elapsed time of the reproduction starting point information which is the reference value, and calculates the elapsed time information indicating the reproduction starting point which is being adjusted by the user.

In the client PC (information processing device) 100, according to a command from the application control unit 76, the Web client 74 sends a request message of "GET/getscreen?recid=1234&sec=(calculated elapsed time) HTTP/1.1" to the Web/video server (management server) 200.

As a result, in the client PC (information processing device) 100, the Web client 74 receives a screen image corresponding to the calculated elapsed time from the Web/video server (management server) 200.

In the client PC (information processing device) 100, according to a command from the application control unit 76, the display unit 71 displays the screen image received from the Web/video server (management server) 200 in the reproduction information display region 55d of the UI page 55 shown in FIG. 28.

Accordingly, the client PC (information processing device) 100 changes the image information displayed in the reproduction information display region 55d in synchronization with the movement of the tab 55g of the reproduction starting point adjusting interface 55f (slider control).

Next, in the client PC (information processing device) 100, when the user operations input unit 72 detects that the tab 55g of the reproduction starting point adjusting interface 55f (slider control) has been released and that it has popped up, the user operations input unit 72 passes, to the application control unit 76, elapsed time information which is the changed reproduction starting point information.

In the client PC (information processing device) 100, when the Web page I/F 77 receives the elapsed time information, according to a command from the application control unit 76, the link generating unit 75 adds, to the information (e.g., "http://videoserver.abc.com") regarding the storage destination of the video data of a reproduced meeting read in step S501, the servlet name (e.g., "play") for performing the reproduction process among a group of servlets of the Web server program 32a included in the Web/video server (management server) 200, the recording ID 41a acquired in step S501, and the elapsed time information which is the reproduction starting point information of the video data acquired in step S508. Accordingly, the link generating unit 75 generates link information for making a reproduction request to the servlet for performing the reproduction process of the Web server program 32a included in the Web/video server (management server) 200, and passes the generated link information to the application control unit 76 (step S513).

In the client PC (information processing device) 100, in accordance with a HTML clipboard format (CF_HTML), the application control unit 76 generates the clipboard data 43. Specifically, in the clipboard data 43, the link information received from the link generating unit 75 is associated with content information indicating the contents, which content information corresponds to text data or image data set with the selection/setting space 55*b* and the setting space 55*c* of the content information setting region of the UI page 55 shown in FIG. 17. Then, the application control unit 76 stores the clipboard data 43 in a predetermined storage region (clipboard) of the SDRAM 12 (step S514). The process control returns to step S507, and the processing procedures of the link information generating process from step S507 onward are repeated.

When the Web page I/F 77 has not acquired the elapsed time information by the above method (No in step S509), according to a command from the application control unit 76, the display unit 71 displays the display page 59 reporting "failed to acquire elapsed time information" as shown in FIG. 25, on a display device (e.g., CRT, LCD) (step S511).

In the client PC (information processing device) 100, after the user confirms the displayed contents of the display page 59 shown in FIG. 25, and the user presses the [OK] button 59*a* of the display page 59 with a pointing device such as a mouse, the process control returns to step S507, and the processing procedures of the link information generating process from step S507 onward are repeated.

In this manner, by performing the processing procedures of steps S401 through S414 shown in FIG. 31 and/or the processing procedures of steps S501 through S514 shown in FIG. 32, the client PC (information processing device) 100 according to the present embodiment realizes the process in which "link information for accessing multimedia contents such as audio/video data managed as recorded data is generated based on reproduction starting point information (e.g., the elapsed time and the number of frames from when recording started) indicating the reproduction starting point of the multimedia contents adjusted by the user with the use of the reproduction starting point adjusting interface 55*f* (slider control); and when pasting the generated link information onto document data being edited with a document creating application used by the user on a daily basis, the link information is stored in a predetermined region (clipboard) in a memory used for temporarily storing information to be pasted onto the document data".

<Summary>

As described above, according to the second embodiment of the present invention, the contents management system 1 realizes the "link information generating function" according to the following procedures.

(Procedure 1) Acquire Reproduction Starting Point Information

In the client PC (information processing device) 100 according to the present embodiment, the acquiring unit 84 acquires reproduction starting point information of video data selected with the selecting unit 82 which the user desires to reproduce by making a reproduction request to the servlet that performs a reproduction process of the of the Web server program 32*a* included in the Web/video server (management server) 200, which request is made with the use of link information. Specifically, the acquiring unit 84 acquires this information at a timing when a pointing device such as a mouse presses the reproduction starting point setting button 55*a* ([Copy] button shown in FIG. 17) of the reproduction starting point information setting region of the UI page 55 shown in FIG. 17.

(Procedure 2) Change Reproduction Starting Point Information (Adjustment of Reproduction Starting Point)

In the client PC (information processing device) 100 according to the present embodiment, the changing unit 87 detects the movement amount of the tab 55*g* of the reproduction starting point adjusting interface 55*f* (slider control) in the UI page 55 shown in FIG. 28. Based on the detected movement amount and the reproduction starting point information (reference value) temporarily set by the acquiring unit 84, the changing unit 87 calculates the change amount from the reference value with a predetermined formula.

Next, the client PC (information processing device) 100 adds the change amount calculated by the changing unit 87 to the reference value, and changes the reproduction starting point information.

(Procedure 3) Generation of Link Information

In the client PC (information processing device) 100 according to the present embodiment, the generating unit 85 acquires the storage destination of the video data that are the target of the reproduction request, i.e., information regarding the destination to which the video data are supplied when a reproduction request is made.

Next, in the client PC (information processing device) 100, the generating unit 85 attaches, to the information regarding the storage destination of the acquired video data, the name of the servlet to perform a reproduction process among the group of servlets of the Web server program 32*a* included in the Web/video server (management server) 200, the recording ID 41*a* acquired by the display unit 81, and the reproduction starting point information of the video data changed by the changing unit 87. Accordingly, link information is generated, which is used for making a reproduction request to the servlet that performs the reproduction process of the Web server program 32*a*.

(Procedure 4) Store in Memory

In the client PC (information processing device) 100 according to the present embodiment, the storing unit 86 stores, in a predetermined storage region (clipboard) of the SDRAM 12, the link information generated by the generating unit 85 and content information indicating the content of the video data for which the user desires to make a reproduction request (video data accessed from link information), as the clipboard data 43 (CF_HTML data) in the HTML format.

The client PC (information processing device) 100 according to the present embodiment sets, via the UI page 55 as shown in FIG. 17, the content information indicating the content of the video data for which a reproduction request is given to a play servlet of the Web server program 32*a* included in the Web/video server (management server) 200. The client PC (information processing device) 100 temporarily stores the clipboard data 43 in which the set content information of the contents is associated with the link information for making the reproduction request, in a predetermined storage region (clipboard) in the SDRAM 12. Accordingly, the link information for making a request to reproduce the video data can be easily pasted onto document data that are being edited with a document creating application which a user uses on a daily basis. Thus, the document data and the multimedia contents can be conveniently associated with each other.

In this manner, by performing the procedures (1) through (4), the contents management system 1 generates link information for accessing multimedia contents such as audio/video data managed as recorded data based on reproduction starting point information (e.g., the elapsed time and the number of frames from when recording started) indicating the reproduction starting point of the multimedia contents adjusted by the user with the use of the reproduction starting point adjusting interface 55f (slider control). Additionally, when pasting the generated link information onto document data being edited with a document creating application used by the user on a daily basis, the contents management system 1 stores the link information in a predetermined region (clipboard) in a memory used for temporarily storing information to be pasted onto the document data. Accordingly, the link information of the multimedia contents including the reproduction starting point information can be easily pasted onto the document data 61 that are being edited. Thus, the user's document data 61 and the multimedia contents managed by the Web/video server (management server) 200 can be conveniently associated with each other.

Thus, in the contents management system 1 according to the present embodiment, link information of multimedia contents, which information includes reproduction starting point information for reproducing the video from an appropriate scene which the user desires, can be easily pasted onto document data that are being edited. Furthermore, it is possible to efficiently utilize multimedia contents from the document data 61, such as sharing the multimedia contents with a third party via the document data 61 that are viewed/edited by a user on a daily basis.

<Installation of Link Information Generating Program>

The functions of the contents management system 1 according to the first and second embodiments of the present embodiment can be realized by encoding the processing procedures of the functions of the client PC (information processing device) 100, the Web/video server (management server) 200, and the recording PC 300 described in the first and second embodiments, in a programming language that matches each operation environment (platform). The encoded programs are installed in a computer by methods described with reference to FIGS. 33A and 33B, and are executed, to thereby realize the functions of the contents management system 1.

Figure 33B:
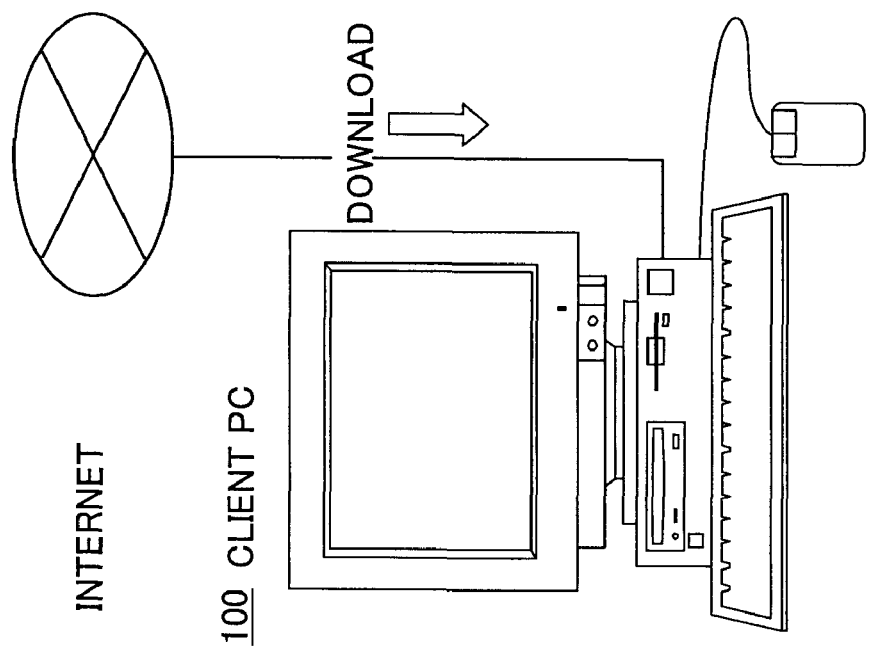
FIGS. 33A and 33B illustrate methods of installing the link information generating function in the client PC (information processing device) according to an embodiment of the present invention.
Figure 33A:
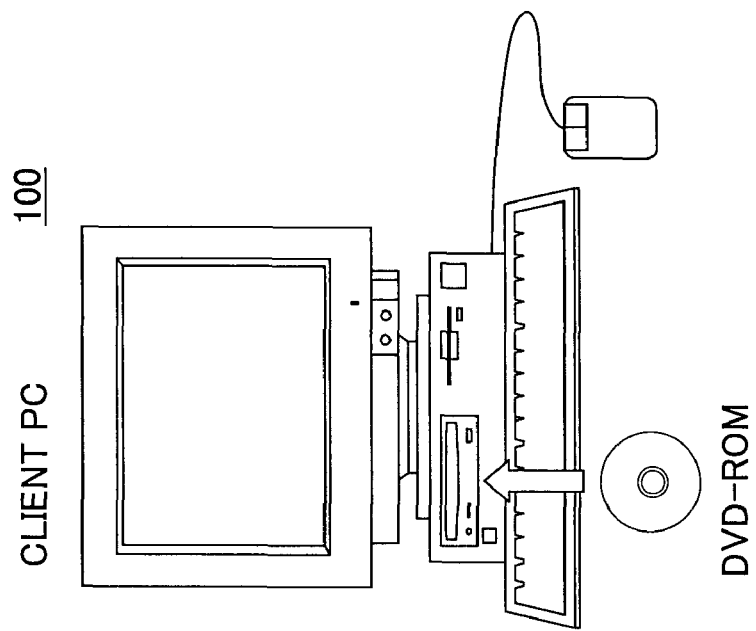

FIGS. 33A and 33B illustrate methods of installing the link information generating function in the client PC (information processing device) 100 according to an embodiment of the present invention.

In the example illustrated in FIG. 33A, the link information generating program 33a is downloaded to the client PC (information processing device) 100 via the Internet. The functions can be realized by appropriately executing the installed program.

The programs for realizing the functions of the contents management system 1 according to the first and second embodiments of the present invention (e.g., a recording program and a link information generating program) can be stored in a computer-readable recording medium.

In the example illustrated in FIG. 33B, a DVD-ROM including the link information generating program 33a is read with the DVD-ROM drive 18 included in the client PC (information processing device) 100. The functions can be realized by appropriately executing the installed program.

The software configuration of the contents management system 1 according to the first and second embodiments of the present invention is described above with reference to FIG. 5. However, the present invention is not limited thereto. For example, the Web server program 32a and the video delivery program 32b can be operated in a different PC. Furthermore, the recording program 31b, the Web server program 32a, and the video delivery program 32b can be operated in the same PC.

Furthermore, in the above description of the contents management system 1 according to the first and second embodiments of the present invention, a servlet is used for realizing a process which is requested from the client PC (information processing device) 100 to the Web/video server (management server) 200. However, the present invention is not limited thereto. For example, the Web server can be realized with the use of a transferring technology such as CGI (Common Gateway Interface) or ASP (Active Server Pages).

The link information generating function of the contents management system 1 according to the first and second embodiments of the present invention can be realized by the following methods (1) through (5) that are different to those described above.

(1) In the above description, the reproduction page 51 for reproducing video data and the link information generating program 33a are activated separately. However, the reproduction page 51 and the link information generating program 33a can be combined as a single function by installing the link information generating program 33a as a Windows (registered trademark) application including an Internet Explorer (registered trademark) component.

(2) In the content information setting region of the UI page 55 (e.g., shown in FIG. 17) for setting information necessary for generating link information, image data sent from another input device such as a whiteboard with a screen capturing function or a digital camera can be set as information indicating the content of the contents. Furthermore, in the content information setting region of the UI page 55 (e.g., shown in FIG. 28) for setting information necessary for generating link information, audio information can be set as content information of the contents. In this case, according to the operation of the reproduction starting point adjusting interface 55f (slider control), audio information of the corresponding reproduction starting point is output.

Figure 34:
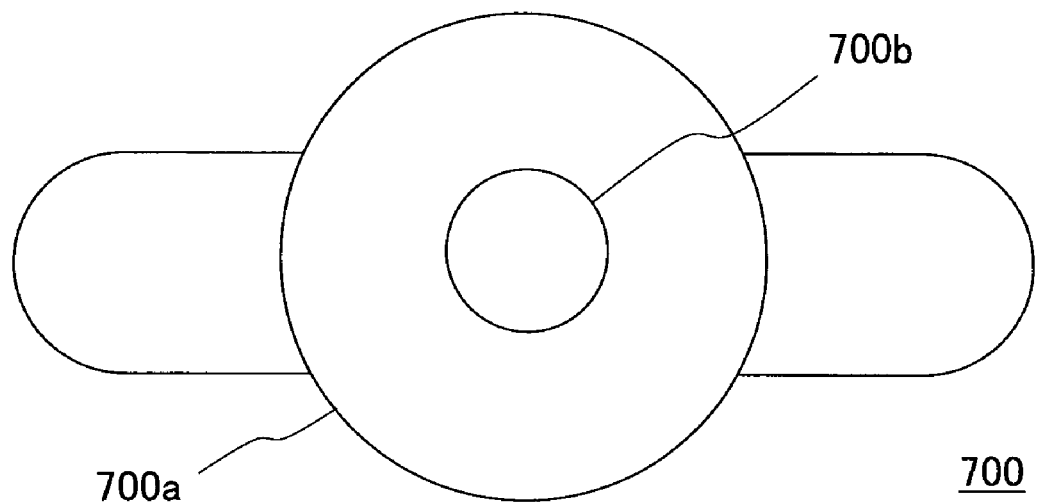
FIG. 34 illustrates an example of an interface for determining and changing a reproduction starting point according to an embodiment of the present invention.

(3) In the above description, in the example of the operation for generating link information, after the [Copy] button shown in FIG. 27 is pressed, a pointing device such as a mouse operates the reproduction starting point adjusting interface 55f (slider control) shown in FIG. 28. However, it is possible to use as the input I/F 15, a joy stick 700 having a button as shown in FIG. 34, which is commercially available. The link information generating program 33a can be configured in such a manner that pressing a center button 700a is equal to pressing the [Copy] button according to the first and second embodiments, turning a dial 700b of the joy stick 700 to the right and left while pressing the center button 700a is equal to horizontally sliding the tab 55g of the reproduction starting point adjusting interface 55f (slider control) according to the second embodiment, and releasing the center button 700a is equal to releasing the left button of a mouse on the reproduction starting point adjusting interface 55f (slider control).

(4) The text indicating the elapsed time in the association data 43a in the clipboard data 43 shown in FIG. 18 can be expressed in other ways such as "yyyy/mm/dd hh:mm:ss" including information on the date, or "hh hours mm minutes ss seconds" in units of "hours", "minutes", and "seconds". A UI for allowing the user to select the expression format can be provided in the UI page shown in FIG. 17.

(5) In the above description, either one of a text (elapsed time information or an arbitrary character string) or an image (screen image or arbitrary image data) can be selected as content information of the contents. The selected content information is copied together with a URL onto a clipboard. However, for example, it is possible to simultaneously copy plural sets of content information, such as copying the association data 43a in the HTML format (data associating the elapsed time information and the display page 51 of the video data of the meeting) as shown in FIG. 18A, and to also copying a screen image corresponding to the elapsed number of seconds in a CF_BITMAP format.

According to one embodiment of the present invention, a contents management system includes a management server configured to manage contents; and an information processing device configured to perform a predetermined process on the contents, wherein the management server and the information processing device are connected to a network; the management server includes a supplying unit configured to supply the contents managed by the management server to the information processing device according to a request from the information processing device to access the contents; the information processing device includes an acquiring unit configured to acquire reproduction starting point information of the contents according to an instruction to acquire the reproduction starting point information indicating a reproduction starting point of the contents, a generating unit configured to generate, based on the reproduction starting point information acquired by the acquiring unit, link information for accessing the contents, and a storing unit configured to store, in a predetermined region of a memory included in the information processing device used for temporarily storing information to be pasted onto document data, the link information generated by the generating unit in association with contents content information indicating content of the contents to be accessed from the link information, when a pasting unit performs a pasting operation of pasting the link information onto the document data being edited; and the contents managed by the management server are accessed based on the link information pasted onto the document data by the pasting unit.

Accordingly, in the contents management system according to an embodiment of the present invention, link information for accessing multimedia contents such as audio/video data managed as recorded data is generated based on reproduction starting point information (e.g., the elapsed time and the number of frames from when recording started) indicating the reproduction starting point of the multimedia contents specified by the user; and when pasting the generated link information onto document data being edited, the link information is stored in a predetermined region in a memory used for temporarily storing information to be pasted onto the document data. Accordingly, the link information of multimedia contents including reproduction starting point information can be pasted onto document data that are being edited. Thus, the user's document data and the multimedia contents managed by the management server can be conveniently associated with each other.

Accordingly, the contents management system according to the present invention makes it possible to efficiently utilize multimedia contents from the document data, such as sharing the multimedia contents with a third party via the document data that are viewed/edited by a user on a daily basis.

Additionally, in the contents management system according to an embodiment of the present invention, the generating unit generates the link information by adding the reproduction starting point information acquired by the acquiring unit to contents storage destination information regarding a storage destination of the contents.

Additionally, in the contents management system according to an embodiment of the present invention, the information processing device further includes a changing unit configured to change the reproduction starting point information of the contents that comprise time information or frame information, by changing, within a predetermined range, elapsed time or a number of frames from the beginning of the contents; and the generating unit generates the link information, by using as a reference the reproduction starting point information acquired by the acquiring unit comprising the elapsed time or the number of frames from the beginning of the contents, and adding the elapsed time or the number of frames changed by the changing unit as the changed reproduction starting point information to contents storage destination information regarding a storage destination of the contents.

Accordingly, in the contents management system according to an embodiment of the present invention, when the user accesses the multimedia contents from the link information, the audio/video data can be reproduced from the reproduction starting point desired (specified) by the user.

Additionally, in the contents management system according to an embodiment of the present invention, the contents include time information or frame information; and the storing unit stores, as the contents content information, the reproduction starting point information comprising data corresponding to elapsed time or a number of frames from the beginning of the contents, in association with the link information, in the predetermined region of the memory.

Additionally, in the contents management system according to an embodiment of the present invention, the information processing device further comprises a setting unit configured to set the contents content information of the contents to be accessed from the link information generated by the generating unit; and the storing unit stores, in the predetermined region of the memory, the link information in association with the content contents information set by the setting unit.

Accordingly, in the contents management system according to an embodiment of the present invention, when the link information is pasted onto the document data, information requesting reproduction of multimedia contents can be embedded in the document in such a manner as to clearly and directly indicate the content of the contents without changing the document layout. This is more advantageous compared to the case of simply pasting information for requesting reproduction of multimedia contents (i.e., simply pasting the character string of a URL).

Additionally, in the contents management system according to an embodiment of the present invention, the information processing device further includes a selecting unit configured to select the contents to be reproduced from among a plurality of contents sets managed by the management server; and the acquiring unit acquires the reproduction starting point information of the contents selected by the selecting unit.

Accordingly, in the contents management system according to an embodiment of the present invention, it is possible to select any contents item that the user desires to reproduce from among plural recorded multimedia contents items.

Additionally, in the contents management system according to an embodiment of the present invention, the information processing device further comprises a display unit configured to display the contents selected by the selecting unit.

Accordingly, in the contents management system according to an embodiment of the present invention, the user can determine the reproduction starting point corresponding to a scene from which reproduction is to start, while the user is confirming the displayed contents. According to one embodiment of the present invention, an information processing device includes a pasting unit configured to perform a pasting operation of pasting, onto document data being edited, link information for accessing contents managed by a management server; an acquiring unit configured to acquire reproduction starting point information of the contents according to an instruction to acquire the reproduction starting point information indicating a reproduction starting point of the contents; a generating unit configured to generate the link information based on the reproduction starting point information acquired by the acquiring unit; and a storing unit configured to store, in a predetermined region of a memory included in the information processing device used for temporarily storing information to be pasted onto the document data, the link information generated by the generating unit in association with contents content information indicating content of the contents to be accessed from the link information, when the pasting unit performs the pasting operation of pasting the link information onto the document data being edited.

Accordingly, in the information processing device according to an embodiment of the present invention, link information for accessing multimedia contents such as audio/video data managed as recorded data is generated based on reproduction starting point information (e.g., the elapsed time and the number of frames from when recording started) indicating the reproduction starting point of the multimedia contents; and when pasting the generated link information onto document data being edited, the link information is stored in a predetermined region in a memory used for temporarily storing information to be pasted onto the document data. Accordingly, the link information of multimedia contents including reproduction starting point information can be pasted onto document data that are being edited. Thus, the user's document data and the multimedia contents managed by the management server can be conveniently associated with each other.

Accordingly, the information processing device according to the present invention makes it possible to efficiently utilize multimedia contents from the document data, such as sharing the multimedia contents with a third party via the document data that are viewed/edited by a user on a daily basis.

Additionally, in the information processing device according to an embodiment of the present invention, the generating unit generates the link information by adding the reproduction starting point information acquired by the acquiring unit to contents storage destination information regarding a storage destination of the contents.

Additionally, the information processing device according to an embodiment of the present invention further includes a changing unit configured to change the reproduction starting point information of the contents that comprise time information or frame information, by changing, within a predetermined range, elapsed time or a number of frames from the beginning of the contents, wherein the generating unit generates the link information by using as a reference the reproduction starting point information acquired by the acquiring unit comprising the elapsed time or the number of frames from the beginning of the contents, and adding the elapsed time or the number of frames changed by the changing unit as the changed reproduction starting point information to contents storage destination information regarding a storage destination of the contents.

Accordingly, in the information processing device according to an embodiment of the present invention, when the user accesses the multimedia contents from the link information, the audio/video data can be reproduced from the reproduction starting point desired (specified) by the user.

Additionally, in the information processing device according to an embodiment of the present invention, the contents include time information or frame information; and the storing unit stores, as the contents content information, the reproduction starting point information comprising data corresponding to elapsed time or a number of frames from the beginning of the contents, in association with the link information, in the predetermined region of the memory.

Additionally, the information processing device according to an embodiment of the present invention further includes a setting unit configured to set the contents content information of the contents to be accessed from the link information generated by the generating unit, wherein the storing unit stores, in the predetermined region of the memory, the link information in association with the content contents information set by the setting unit.

Accordingly, in the information processing device according to an embodiment of the present invention, when the link information is pasted onto the document data, information requesting reproduction of multimedia contents can be embedded in the document in such a manner as to clearly and directly indicate the content of the contents without changing the document layout. This is more advantageous compared to the case of simply pasting information for requesting reproduction of multimedia contents (i.e., simply pasting the character string of a URL).

Additionally, the information processing device according to an embodiment of the present invention further comprises a selecting unit configured to select the contents to be reproduced from among a plurality of contents sets managed by the management server, wherein the acquiring unit acquires the reproduction starting point information of the contents selected by the selecting unit.

Accordingly, in the information processing device according to an embodiment of the present invention, it is possible to select any contents item that the user desires to reproduce from among plural recorded multimedia contents items.

Additionally, the information processing device according to an embodiment of the present invention further includes a display unit configured to display the contents selected by the selecting unit.

Accordingly, in the information processing device according to an embodiment of the present invention, the user can determine the reproduction starting point corresponding to a scene from which reproduction is to start, while the user is confirming the displayed contents.

According to one embodiment of the present invention, a link information generating method is performed in an information processing device configured to paste, onto document data being edited, link information for accessing contents managed by a management server, and access the contents managed by the management server based on the pasted link information, wherein the link information generating method includes an acquiring step of acquiring reproduction starting point information of the contents according to an instruction to acquire the reproduction starting point information indicating a reproduction starting point of the contents; a generating step of generating the link information for accessing the contents based on the reproduction starting point information acquired in the acquiring step; and a storing step of storing, in a predetermined region of a memory included in the information processing device used for temporarily storing information to be pasted onto the document data, the link information generated in the generating step in association with contents content information indicating content of the contents to be accessed from the link information, when pasting the link information onto the document data being edited.

Accordingly, with the link information generating method according to an embodiment of the present invention, link information for accessing multimedia contents such as audio/ video data managed as recorded data is generated based on reproduction starting point information (e.g., the elapsed time and the number of frames from when recording started) indicating the reproduction starting point of the multimedia contents specified by the user; and when pasting the generated link information onto document data being edited, the link information is stored in a predetermined region in a memory used for temporarily storing information to be pasted onto the document data. Accordingly, the link information of multimedia contents including reproduction starting point information can be pasted onto document data that are being edited. Thus, the user's document data and the multimedia contents managed by the management server can be conveniently associated with each other.

Accordingly, the link information generating method according to an embodiment of the present invention makes it possible to efficiently utilize multimedia contents from the document data, such as sharing the multimedia contents with a third party via the document data that are viewed/edited by a user on a daily basis.

According to one embodiment of the present invention, a link information generating program product is executed in an information processing device configured to paste, onto document data being edited, link information for accessing contents managed by a management server, and access the contents managed by the management server based on the pasted link information, and the link information generating program product includes instructions for causing a computer to perform an acquiring step of acquiring reproduction starting point information of the contents according to an instruction to acquire the reproduction starting point information indicating a reproduction starting point of the contents; a generating step of generating the link information for accessing the contents based on the reproduction starting point information acquired in the acquiring step; and a storing step of storing, in a predetermined region of a memory included in the information processing device used for temporarily storing information to be pasted onto the document data, the link information generated in the generating step in association with contents content information indicating content of the contents to be accessed from the link information, when pasting the link information onto the document data being edited.

Accordingly, link information generating program product according to an embodiment of the present invention causes a computer to generate link information for accessing multimedia contents such as audio/video data managed as recorded data, based on reproduction starting point information (e.g., the elapsed time and the number of frames from when recording started) indicating the reproduction starting point of the multimedia contents specified by the user; and when the generated link information is pasted onto document data being edited, the computer is caused to store the link information in a predetermined region in a memory used for temporarily storing information to be pasted onto the document data.

Accordingly, the link information generating program product causes the computer to paste the link information of multimedia contents including reproduction starting point information onto document data that are being edited. Thus, the user's document data and the multimedia contents managed by the management server can be conveniently associated with each other. Furthermore, it is possible to efficiently utilize multimedia contents from the document data, such as sharing the multimedia contents with a third party via the document data that are viewed/edited by a user on a daily basis.

The present invention is not limited to the specifically disclosed embodiment, and variations and modifications may be made without departing from the scope of the present invention.

The present application is based on Japanese Priority Patent Application No. 2007-137221, filed on May 23, 2007, the entire contents of which are hereby incorporated herein by reference.

What is claimed is:

1. A contents management system comprising:
a management server configured to manage video data; and
an information processing device configured to perform a predetermined process on the video data, wherein:
the management server and the information processing device are connected to a network;
the management server comprises a supplying unit configured to supply the video data managed by the management server to the information processing device according to a request to access the video data, which request is received from the information processing device;
the information processing device comprises an acquiring unit configured to acquire reproduction starting point information of the video data according to an instruction to acquire the reproduction starting point information indicating a reproduction starting point of the video data, the reproduction starting point information being a time point at which an elapsed time has passed after starting to record the video data,
the information processing device further comprises a generating unit configured to generate, based on the reproduction starting point information acquired by the acquiring unit, link information for accessing the video data, and
the information processing device further comprises a storing unit configured to store, in memory used for temporarily storing the link information to be pasted onto document data, the link information generated by the generating unit in association with contents content information descriptively indicating content of the video data to be accessed from the link information, when the link information is pasted onto the document data being edited, the contents content information being selected and set by a user via a user interface; and
the video data is accessed based on the link information which is based on the reproduction starting point information so that the video data is reproduced from the time point at which the elapsed time has passed after starting to record the video data.

2. The contents management system according to claim 1, wherein:
the generating unit generates the link information by adding the reproduction starting point information acquired by the acquiring unit to contents storage destination information regarding a storage destination of the video data.

3. The contents management system according to claim 1, wherein:
the information processing device further comprises a changing unit configured to change the reproduction starting point information of the video data that comprise time information or frame information, by changing, within a predetermined range, elapsed time or a number of frames from the beginning of the video data; and
the generating unit generates the link information, by using as a reference the reproduction starting point information acquired by the acquiring unit comprising the elapsed time or the number of frames from the beginning of the video data, and adding the elapsed time or the number of frames changed by the changing unit as the changed reproduction starting point information to contents storage destination information regarding a storage destination of the video data.

4. The contents management system according to claim 1, wherein:
the video data comprise time information or frame information; and
the storing unit stores, as the contents content information, the reproduction starting point information comprising data corresponding to elapsed time or a number of frames from the beginning of the video data, in association with the link information, in the predetermined region of the memory.

5. The contents management system according to claim 1, wherein:
the information processing device further comprises a setting unit configured to set the contents content information of the video data to be accessed from the link information generated by the generating unit; and
the storing unit stores, in the predetermined region of the memory, the link information in association with the content contents information set by the setting unit.

6. The contents management system according to claim 1, wherein:
the information processing device further comprises a selecting unit configured to select the video data to be reproduced from among a plurality of contents sets managed by the management server; and
the acquiring unit acquires the reproduction starting point information of the video data selected by the selecting unit.

7. The contents management system according to claim 6, wherein:
the information processing device further comprises a display unit configured to display the video data selected by the selecting unit.

8. An information processing device comprising:
a pasting unit configured to perform a pasting operation of pasting, onto document data being edited, link information for accessing contents managed by a management server;
an acquiring unit configured to acquire reproduction starting point information of the video data according to an instruction to acquire the reproduction starting point information indicating a reproduction starting point of the video data, the reproduction starting point information being a time point at which an elapsed time has sassed after starting to record the video data;
a generating unit configured to generate the link information based on the reproduction starting point information acquired by the acquiring unit; and
a storing unit configured to store, in memory used for temporarily storing the link information to be pasted onto the document data, the link information generated by the generating unit in association with contents content information descriptively indicating content of the video data to be accessed from the link information, when the link information is pasted onto the document data being edited, the contents content information being selected and set by a user via a user interface; and
the video data is accessed based on the link information which is based on the reproduction starting point information so that the video data is reproduced from the time point at which the elapsed time has passed after starting to record the video data.

9. The information processing device according to claim 8, wherein:
the generating unit generates the link information by adding the reproduction starting point information acquired by the acquiring unit to contents storage destination information regarding a storage destination of the video data.

10. The information processing device according to claim 8, further comprising:
a changing unit configured to change the reproduction starting point information of the video data that comprise time information or frame information, by changing, within a predetermined range, elapsed time or a number of frames from the beginning of the video data, wherein:
the generating unit generates the link information by using as a reference the reproduction starting point information acquired by the acquiring unit comprising the elapsed time or the number of frames from the beginning of the video data, and adding the elapsed time or the number of frames changed by the changing unit as the changed reproduction starting point information to contents storage destination information regarding a storage destination of the video data.

11. The information processing device according to claim 8, wherein:
the video data comprise time information or frame information; and
the storing unit stores, as the contents content information, the reproduction starting point information comprising data corresponding to elapsed time or a number of frames from the beginning of the video data, in association with the link information, in the predetermined region of the memory.

12. The information processing device according to claim 8, further comprising:
a setting unit configured to set the contents content information of the video data to be accessed from the link information generated by the generating unit, wherein:
the storing unit stores, in the predetermined region of the memory, the link information in association with the content contents information set by the setting unit.

13. The information processing device according to claim 8, further comprising:
a selecting unit configured to select the video data to be reproduced from among a plurality of contents sets managed by the management server, wherein:
the acquiring unit acquires the reproduction starting point information of the video data selected by the selecting unit.

14. The information processing device according to claim 13, further comprising:
a display unit configured to display the video data selected by the selecting unit.

15. A link information generating method performed in an information processing device configured to paste, onto document data being edited, link information for accessing contents managed by a management server, and access the video data managed by the management server based on the pasted link information, the information processing device including an acquiring unit, a generating unit and a storing unit, the link information generating method comprising:
an acquiring step of acquiring, by the acquiring unit of the information processing device, reproduction starting point information of the video data according to an instruction to acquire the reproduction starting point information indicating a reproduction starting point of the video data, the reproduction starting point information being a time point at which an elapsed time has passed after starting to record the video data;

a generating step of generating, by the generating unit of the information processing device, the link information for accessing the video data based on the reproduction starting point information acquired in the acquiring step; and a storing step of storing, by the storing unit of the information processing device, in memory used for temporarily storing the link information to be pasted onto the document data, the link information generated in the generating step in association with contents content information descriptively indicating content of the video data to be accessed from the link information, when the link information is pasted onto the document data being edited, the contents content information being selected and set by a user via a user interface; and the video data is accessed based on the link information which is based on the reproduction starting point information so that the video data is reproduced from the time point at which the elapsed time has passed after starting to record the video data.

* * * * *